(12) United States Patent
McGrane et al.

(10) Patent No.: US 12,207,673 B2
(45) Date of Patent: Jan. 28, 2025

(54) COMPOUNDS THAT MODULATE FATTY ACID RECEPTOR ACTIVITY AND PET FOOD PRODUCTS CONTAINING THE SAME

(71) Applicant: MARS, INCORPORATED, McLean, VA (US)

(72) Inventors: Scott Joseph McGrane, Leicestershire (GB); Matthew Ronald Gibbs, Leicestershire (GB); Richard Masten Fine, Oradell, NJ (US); Jerry Wallace Skiles, Oradell, NJ (US)

(73) Assignee: MARS, INCORPORATED, McLean, VA (US)

( * ) Notice: Subject to any disclaimer, the term of this patent is extended or adjusted under 35 U.S.C. 154(b) by 1178 days.

(21) Appl. No.: 17/013,919

(22) Filed: Sep. 8, 2020

(65) Prior Publication Data
US 2020/0397030 A1      Dec. 24, 2020

Related U.S. Application Data

(63) Continuation of application No. 15/534,421, filed as application No. PCT/US2015/065106 on Dec. 10, 2015, now Pat. No. 10,827,772.
(Continued)

(51) Int. Cl.
| | | |
|---|---|---|
| *A23K 50/42* | (2016.01) | |
| *A23K 20/111* | (2016.01) | |
| *A23K 20/132* | (2016.01) | |
| *A23K 20/142* | (2016.01) | |
| *A23K 20/153* | (2016.01) | |

(Continued)

(52) U.S. Cl.
CPC ............. *A23L 27/23* (2016.08); *A23K 20/111* (2016.05); *A23K 20/132* (2016.05); *A23K 20/142* (2016.05); *A23K 20/153* (2016.05); *A23K 50/42* (2016.05); *A23K 50/48* (2016.05); *A23L 27/204* (2016.08); *A23L 27/21* (2016.08);
(Continued)

(58) Field of Classification Search
CPC ...... A23K 20/111; A23K 50/42; A23K 50/48; A23K 50/40; A23L 27/204; A23L 27/88; A23V 2002/00
See application file for complete search history.

(56) References Cited

U.S. PATENT DOCUMENTS

| | | |
|---|---|---|
| 3,759,933 A | 9/1973 | Robison et al. |
| 3,832,471 A | 8/1974 | Siregar |

(Continued)

FOREIGN PATENT DOCUMENTS

| | | | | |
|---|---|---|---|---|
| EP | 488682 A1 | * | 6/1992 | ........... C07D 307/33 |
| EP | 1344459 A1 | | 9/2003 | |

(Continued)

OTHER PUBLICATIONS

U.S. Appl. No. 15/534,440, Oct. 2, 2023 Non-Final Office Action.
(Continued)

*Primary Examiner* — Deborah D Carr
(74) *Attorney, Agent, or Firm* — Baker Botts L.L.P.

(57) ABSTRACT

A flavor composition comprising at least one compound that modulates, increases and/or enhances the activity of a GPR120 fatty acid receptor that can be used to enhance the fatty acid taste and/or palatability of pet food products is described herein. Also disclosed herein are methods for identifying said compounds.

10 Claims, 88 Drawing Sheets
Specification includes a Sequence Listing.

Related U.S. Application Data

(60) Provisional application No. 62/090,138, filed on Dec. 10, 2014.

(51) Int. Cl.
| | |
|---|---|
| *A23K 50/48* | (2016.01) |
| *A23L 27/00* | (2016.01) |
| *A23L 27/20* | (2016.01) |
| *A23L 27/21* | (2016.01) |
| *A23L 27/22* | (2016.01) |
| *A23L 27/23* | (2016.01) |

(52) U.S. Cl.
CPC .............. *A23L 27/22* (2016.08); *A23L 27/235* (2016.08); *A23L 27/88* (2016.08); *A23V 2002/00* (2013.01)

(56) References Cited

U.S. PATENT DOCUMENTS

| | | |
|---|---|---|
| 4,267,195 A | 5/1981 | Boudreau et al. |
| 4,597,970 A | 7/1986 | Sharma et al. |
| 4,722,845 A | 2/1988 | Cherukuri et al. |
| 4,804,549 A | 2/1989 | Howley et al. |
| 4,826,824 A | 5/1989 | Schiffman |
| 5,256,330 A | 10/1993 | Koyama et al. |
| 6,166,076 A | 12/2000 | Gilbertson |
| 7,368,285 B2 | 5/2008 | Zoller et al. |
| 7,527,944 B2 | 5/2009 | Li et al. |
| 7,867,540 B2 | 1/2011 | Didzbalis et al. |
| 8,008,525 B2 | 8/2011 | Fukatsu et al. |
| 8,399,204 B2 | 3/2013 | Sekiya et al. |
| 2003/0199566 A1 | 10/2003 | Bok et al. |
| 2005/0084506 A1 | 4/2005 | Tachdjian et al. |
| 2005/0124053 A1 | 6/2005 | Moen et al. |
| 2005/0142169 A1 | 6/2005 | Imafidon et al. |
| 2006/0045953 A1 | 3/2006 | Tachdjian et al. |
| 2006/0052345 A1 | 3/2006 | Shcherbakova et al. |
| 2006/0263411 A1 | 11/2006 | Tachdjian et al. |
| 2008/0066195 A1 | 3/2008 | Li et al. |
| 2010/0009986 A1 | 1/2010 | Zemolka et al. |
| 2011/0027346 A1 | 2/2011 | Weiner et al. |
| 2011/0143002 A1 | 6/2011 | Yamaguchi et al. |
| 2011/0224210 A1 | 9/2011 | Aissaoui et al. |
| 2011/0311459 A1 | 12/2011 | Amari et al. |
| 2012/0315223 A1 | 12/2012 | Ramirez |
| 2013/0071547 A1 | 3/2013 | Damak et al. |
| 2013/0209625 A1 | 8/2013 | Brand et al. |
| 2015/0250210 A1 | 9/2015 | Taylor et al. |
| 2015/0257412 A1 | 9/2015 | McGrane et al. |
| 2015/0257415 A1 | 9/2015 | McGrane et al. |
| 2015/0282506 A1 | 10/2015 | Taylor et al. |
| 2016/0209430 A1 | 7/2016 | McGrane et al. |
| 2018/0255813 A1 | 9/2018 | McGrane et al. |
| 2019/0021380 A1 | 1/2019 | McGrane et al. |

FOREIGN PATENT DOCUMENTS

| | | |
|---|---|---|
| EP | 2 042 043 A1 | 4/2009 |
| EP | 2 119 372 A1 | 11/2009 |
| EP | 2 622 970 A1 | 8/2013 |
| JP | H 03-206853 A | 9/1991 |
| JP | 2001-163842 A | 6/2001 |
| JP | 4642932 B2 | 3/2011 |
| JP | 2013-512664 A | 4/2013 |
| JP | 2015-105826 A | 6/2015 |
| RU | 2410383 C2 | 1/2011 |
| WO | WO 01/060178 A1 | 8/2001 |
| WO | WO 2005/041684 A2 | 5/2005 |
| WO | WO 2007/047988 A2 | 4/2007 |
| WO | WO 2007/121604 A2 | 11/2007 |
| WO | WO 2007/124152 A2 | 11/2007 |
| WO | WO 2007/134613 A1 | 11/2007 |
| WO | WO 2009/007424 A1 | 1/2009 |
| WO | WO 2010/108542 A1 | 9/2010 |
| WO | WO 2010/129665 A2 | 11/2010 |
| WO | WO 2011/067202 | 6/2011 |
| WO | WO 2011/069958 A2 | 6/2011 |
| WO | WO 2012/013480 A1 | 2/2012 |
| WO | WO 2012/039275 A1 | 3/2012 |
| WO | WO 2013/010991 A1 | 1/2013 |
| WO | WO 2013/139341 A | 9/2013 |
| WO | WO 2013/149012 A1 | 10/2013 |
| WO | WO 2014/068043 A1 | 5/2014 |
| WO | WO 2014/068044 A1 | 5/2014 |
| WO | WO 2014/068045 A1 | 5/2014 |
| WO | WO 2014/068047 A1 | 5/2014 |
| WO | WO 2016094682 A2 | 6/2016 |
| WO | WO 2016094690 A1 | 6/2016 |

OTHER PUBLICATIONS

Machine translation of Noritake et al., JP 2001163842, Jun. 2001.
U.S. Appl. No. 15/534,413 (US 2018/0168208), filed Jun. 8, 2017 (Jun. 21, 2018).
U.S. Appl. No. 15/534,434 (US 2018/0255813), filed Jun. 8, 2017 (Sep. 13, 2018).
U.S. Appl. No. 15/534,440 (US 2019/0021380), filed Jun. 8, 2017 (Jan. 24, 2019).
U.S. Appl. No. 15/534,440, Feb. 4, 2020 Non-Final Office Action.
U.S. Appl. No. 15/534,440, Sep. 24, 2019 Response to Restriction Requirement.
U.S. Appl. No. 15/534,440, Aug. 21, 2019 Restriction Requirement.
U.S. Appl. No. 15/534,434, Mar. 4, 2020 Notice of Allowance.
U.S. Appl. No. 15/534,434, Feb. 21, 2020 Amendment and Request for Continued Examination (RCE).
U.S. Appl. No. 15/534,434, Nov. 27, 2019 Final Office Action.
U.S. Appl. No. 15/534,434, Nov. 19, 2019 Response to Non-Final Office Action.
U.S. Appl. No. 15/534,434, Sep. 26, 2019 Non-Final Office Action.
U.S. Appl. No. 15/534,434, Aug. 29, 2019 Request for Continued Examination (RCE).
U.S. Appl. No. 15/534,434, Jul. 12, 2019 Notice of Allowance.
U.S. Appl. No. 15/534,434, Jun. 19, 2019 Response to Non-Final Office Action.
U.S. Appl. No. 15/534,434, Mar. 19, 2019 Non-Final Office Action.
U.S. Appl. No. 15/534,434, Feb. 21, 2019 Response to Restriction Requirement.
U.S. Appl. No. 15/534,434, Jan. 7, 2019 Restriction Requirement.
U.S. Appl. No. 15/534,413, Mar. 18, 2020 Non-Final Office Action.
U.S. Appl. No. 15/534,413, Oct. 14, 2019 Response to Restriction Requirement.
U.S. Appl. No. 15/534,413, Aug. 21, 2019 Restriction Requirement.
Arnold et al., "The Swiss Model Workspace: A Web-Based Environment for Protein Structure Homology Modelling," Bioinformatics, vol. 22, pp. 195-201 (Aug. 2005).
Berman et al., "The Protein Data Bank," Nucleic Acids Research, vol. 28, p. 235-242 (Jan. 2000).
Briscoe et al., "The orphan G Protein-coupled Receptor GPR40 is Activated by Medium and Long Chain Fatty A 1 cids," Journal of Biological Chemistry, American Society for Biochemistry and Molecular Biology, vol. 278, No. 13, pp. 11303-11311 (Mar. 28, 2003).
Cairoli et al., "Studies on Umami Taste. Synthesis of New Guanosine 5"-Phosphate Derivatives and Their Synergistic Effect with Monosodium Glutamate," J. Agric. Food Chem, vol. 56, Jan. 2008, pp. 1043-1050.
Cartoni et al., "Taste Preference for Fatty Acids is Mediated by GPR40 and GPRI20," Journal of Neuroscience, vol. 30, No. 25, pp. 8376-8382 (Jun. 23, 2010).
Cline, "Perspectives for Gene Therapy: Inserting New Genetic Information into Mammalian Cells by Physical Techniques and Viral Vectors," Pharmac. Ther., vol. 29, pp. 69-92, 1985.
Cotten, et al., "Receptor-Mediated Transport of DNA into Eurkaryotic Cells," Methods in Enzymology, vol. 217 (1993), pp. 618-644, available on-line Jan. 9, 2004.
Database UniProt [online], Accession No. M3VV68, May 1, 2013, Internet: URL: https://www.uniprot.org/uniprot/M3VV68.txt?version=1, 2 pgs).

(56) References Cited

OTHER PUBLICATIONS

Dore et al., "Structure of class C GPCR metabotropic Glutamate receptor 5 transmembrane domain," Nature Jul. 2014. 31; 511(7511):557-62, Epub, Abstract Only (2 pgs.).
Erlanger et al., "Improved Synthesis of Amino Acid Benzyl Esters," J. Am. Chem. Soc 76(22):5781-5782 (1954).
Eswar et al., "Comparative Protein Structure Modeling Using Modeller," Cuff Protoc Bioinformatics, Supplement 15, 5.6.1-5.6.30,47 pages (Oct. 2006).
Festring et al., "Systematic Studies on the Chemical Structure and Umami Enhancing Activity of Maillard-Modified Guanosine 5'-Monophostates," J. Agric. Food Chem., 59 665-676 (2011).
Festring et al., "Stereoselective Synthesis of Amides Sharing the Guanosine 5'-Monophosphate Scaffold and Umami Enhancement Studies Using Human Sensory and hT1R1/rTIR3 Receptor Assays," J. Agric. Food Chem., vol. 59, Jul. 2011, pp. 8875-8885.
Godinot et al., "Activation of tongue-expressed GPR40 and GPR120 by non-caloric agonists is not sufficient to drive preference in mice," Neuroscience, vol. 250, pp. 20-30 (Jul. 2013).
Horng-Yih Ou et al., "Activation of free fatty acid receptor 1 improves hepatic steatosis through a p38-dependent pathway," Journal of Molecular Endocrinology 53:165-174, 2014.
Hudson et al., "The Molecular Basis of Ligand Interaction at Free Fatty Acid Receptor 4 (FFA4/GPRI20)," The Journal of Biological Chemistry, vol. 289, pp. 20345-20358, Jul. 2014.
International Search Report mailed Apr. 5, 2016 in International Application No. PCT/US2015/065046.
International Search Report mailed Aug. 2, 2016 in International Application No. PCT/US2015/065036.
International Search Report mailed Jul. 19, 2016 in International Application No. PCT/US2015/065106.
International Search Report mailed Jun. 30, 2016 in International Application No. PCT/US2015/065067.
Jovanovic et al., "Substituent and Solvent Effects on Tautomeric Equilibria of Barbituric Acid Derivatives and Isoterically Related Compounds," Journal of Heterocyclic Chemistry, 24:191-204 (1987).
Kawai, "Taste Enhancements Between Various Amino Acids and IMP," Chemical Senses and Flavor, 27(8):739-745 (2002).
Kunishima et al., "Structural Basis of Glutamate Recognition by a Dimeric Metabotropic Glutamate Receptor," Nature, vol. 407, p. 971-977 (Oct. 2000).
Kurihara et al., "Introductory Remarks on Umami Taste," Annals of the New York Academy of Sciences, vol. 855, Nov. 1998, pp. 393-397.
Li et al., "Cats Lack a Sweet Taste Receptor," The Journal of Nutrition, 136(7Suppl):19325-19345, Jul. 2006.
Loeffler et al., "Gene Transfer into Primary and Established Mammalian Cell Lines with Lipopolyamine-Coated DNA," Methods in Enzymology, vol. 217 (Mar. 1993), 599-618.
Lopez Cascales et al., "Binding of glutamate to the umami receptor," Biophysical Chemistry 152(1-3):139-144 (2010).
Machine Translation of Chlorella Ind Co, JP4642932 B, Dec. 1971, 2 pages.
Martin et al., "The Lipid Sensor Candidates CD36 and GPRI20 are Differentially Regulated by Dietary Lipids in Mouse Taste Buds: Impact on Sponganeous Fat Preference," PLoS one, Aug. 2011, 6(8), e24014, 9 pages.
Masataka et al., "Characterization of umami receptor and coupling G protein in mouse taste cells," Neuroreport, 19(12), Aug. 2008, pp. 1169-1173.
Rajabi et al., "Structure-activity relationship of 2,4,5-trioxoimidazolidines as inhibitors of thymidine phosphorylase," European Journal of Medicinal Chemistry, 46:1165-1171 (2011).
Rasmussen et al., "Crystal Structure of the Beta Adrenergic Receptor-Gs Protein Complex," Nature (Jul. 2011) 177:549-555.
Reed et al., "Diverse tastes: Genetics of sweet and bitter perception," Physiology and Behavior, 88(3):215-226 (2006).
"Sarcosine—Wikipedia", Oct. 23, 2014, https://en.wikipedia.orglw/index.php?titile=Sarcosine&oldid=630844266, 8 pgs.

Shimpukade et al., "Discovery of a Potent and Selective GPR120 Agonist," Journal of Medicinal Chemistry, vol. 55, No. 9, pp. 4511-4515 (Apr. 23, 2012).
Sigel et al., "Comparison of the Metal Ion Coordinating Properties of Tubercidin 5'-Monophosphate (7-Deaza-AMP) with Those of Adenosine 5'-Monophosphate (AMP) and 1, N6-Ethenoadenosine 5'-Monophosphate (e-AMP). Definite Evidence for Metal Ion-Base Backbinding to N-7 and Extent of Macrochelate Formulation in M(AMP) and M (e-AMP)," J. Am. Chem. Soc 110:6857-6865 (1988).
Suess et al., "Human Taste and Umami Receptor Responses to Chemosensorica Generated by Maillard-type N2-4Jky 1- and N2-Arylthiomethylation of Guanosine 5'-Monophosphates," J. Agric. Food Chem., vol. 62, Nov. 2014, pp. 11429-11440.
Toda et al., "Two Distinct Determinants of Ligand Specificity in TIR1/T1R3 (the Umami Taste Receptor)," Journal of Biological Chemistry, 288(52):36863-36877 (2013).
Wang Fang et al., "Condiment Production Process," pp. 340-341, Yanbian People's Press Mar. 31, 2003) (with English translation).
Wu et al., "Structure of the Human Kappa Opioid Receptor in Complex with JDTic," Nature, (Mar. 2012) 185:327-332.
Wu et al., "Structure of a Class C GPCR Metabotropic Glutamate Receptor I Bound to an Allosteric Modulator," Science, Apr. 4, 2014; vol. 344, p. 58-64.
Wu et al., "Structures of the CXC4 Chemokine Receptor in Compex with Small Molecule and cyclic Peptide Antagonists," Science, (Nov. 2010), 330:1066-1071.
Xu et al., "Different Functional Roles of TiR Subunits in the Heteromeric Taste Receptors," PNAS, 101(39):14258-14263 (2004).
Yang et al., "The I-TASSER Suite: Protein Structure and Function Prediction," Nat. Methods vol. 12:7-8 (Jan. 2015).
Yoshii et al., "Synergistic effects of 5'-nucleotides on rat taste responses to various amino acids," Brain Research, 367(1-2):45-51 (1986).
Zhang et al., "Molecular mechanism for the umami taste synergism," PNAS 105(52):20930-20934 (2008).
Zhang et al., "GPCR-1-TASSER: A Hybrid Approach to G Protein Coupled Receptor Structure Modeling and the Application to the Human Genome," Structure, Aug. 2015, 23(8):1538-1549.
Nelson et al., "An amino-acid taste receptor," Nature, 416, 199-202 (2002).
U.S. Appl. No. 15/534,421 (U.S. Pat. No. 10,827,772), filed Jun. 8, 2017 (Nov. 10, 2020).
U.S. Appl. No. 15/534,440, Dec. 2, 2020 Supplemental Response.
U.S. Appl. No. 15/534,440, Nov. 30, 2020 Notice of Non-Compliant Amendment.
U.S. Appl. No. 15/534,440, Sep. 22, 2020 Amendment and Request for Continued Examination (RCE).
U.S. Appl. No. 15/534,440, Aug. 7, 2020 Final Office Action.
U.S. Appl. No. 15/534,440, May 1, 2020 Response to Non-Final Office Action.
U.S. Appl. No. 15/534,434, Dec. 7, 2020 Final Office Action.
U.S. Appl. No. 15/534,434, Nov. 24, 2020 Response to Non-Final Office Action.
U.S. Appl. No. 15/534,434, Oct. 9, 2020 Non-Final Office Action.
U.S. Appl. No. 15/534,434, Sep. 15, 2020 Amendment and Request for Continued Examination (RCE).
U.S. Appl. No. 15/534,434, Aug. 21, 2020 Advisory Action.
U.S. Appl. No. 15/534,434, Aug. 11, 2020 Response after Final Action.
U.S. Appl. No. 15/534,434, Jun. 22, 2020 Final Office Action.
U.S. Appl. No. 15/534,434, Jun. 8, 2020 Response to Non-Final Office Action.
U.S. Appl. No. 15/534,434, May 12, 2020 Non-Final Office Action.
U.S. Appl. No. 15/534,434, Apr. 29, 2020 Request for Continued Examination (RCE).
U.S. Appl. No. 15/534,434, Apr. 14, 2020 Notice of Allowance.
U.S. Appl. No. 15/534,434, Mar. 24, 2020 Request for Continued Examination (RCE).
U.S. Appl. No. 15/534,413, Oct. 26, 2020 Response to Non-Final Office Action
U.S. Appl. No. 15/534,413, May 14, 2020 Response to Non-Final Office Action

(56) References Cited

OTHER PUBLICATIONS

U.S. Appl. No. 15/534,421, Sep. 8, 2020 Issue Fee Payment
U.S. Appl. No. 15/534,421, Aug. 25, 2020 Notice of Allowance.
U.S. Appl. No. 15/534,421, Jul. 28, 2020 Request for Continued Examination (RCE).
U.S. Appl. No. 15/534,421, Jun. 18, 2020 Notice of Allowance.
U.S. Appl. No. 15/534,421, Mar. 23, 2020 Request for Continued Examination (RCE).
U.S. Appl. No. 15/534,421, Feb. 10, 2020 Notice of Allowance.
U.S. Appl. No. 15/534,421, Jan. 7, 2020 Request for Continued Examination (RCE).
U.S. Appl. No. 15/534,421, Oct. 7, 2019 Notice of Allowance.
U.S. Appl. No. 15/534,421, Aug. 20, 2019 Amendment and Request for Continued Examination (RCE).
U.S. Appl. No. 15/534,421, May 31, 2019 Final Office Action.
U.S. Appl. No. 15/534,421, Feb. 22, 2019 Response to Non-Final Office Action.
U.S. Appl. No. 15/534,421, Nov. 8, 2018 Non-Final Office Action.
Dang et al., "Interaction Between Umami Peptide and Taste Receptor T1R1/T1R3," Cell Biochem Biophys 70:1841-1848 (2014).
U.S. Appl. No. 15/534,440, Nov. 25, 2022 Non-Final Office Action.

\* cited by examiner

FIG. 2F

| Compound Name | Activity Determination Results | | Curve Fitting results on Target cell line | | |
|---|---|---|---|---|---|
| | Overlay Dose Response curves Target/Mock [Activity_vs_ATP%] values are plotted | Overlay Dose response curve in Activity Determination and three point in Primary Profiling on target [Activity%] values are plotted | SE Log EC50 | EC50 [M] | Signal at Max. Concentration |
| dodecanoic acid | | | 0.01745 970547 19925 5932126 | 0.00000 1331059 | 36.40743 63708496 |

FIG. 3A

| Original Compound Name | Chemical Structure | L | S |
|---|---|---|---|
| TUG891 3-(4-((4'-fluoro-4'-methylbiphenyl-2-yl)methoxy)phenyl)propanoic acid | | | |
| GW 9508 | | | |
| (9Z)-tetradec-9-enoic acid | | 14 | 1 |
| tridec-12-enoic acid | | 13 | 1 |
| (10Z)-pentadec-10-enoic acid | | 15 | 1 |

FIG. 3B

| Original Compound Name | Chemical Structure | L | S |
|---|---|---|---|
| dodecanoic acid | | 12 | 1 |
| (9E)-tetradec-9-enoic acid | | 14 | 1 |
| tridecanoic acid | | 13 | 1 |
| (10E)-pentadec-10-enoic acid | | 15 | 1 |
| Pinolenic Acid | | 18 | 3 |

FIG. 3C

| Original Compound Name | Chemical Structure | L | S |
|---|---|---|---|
| S-Farnesyl Thioacetic Acid | | 15 | 2 |
| (9Z,12Z,15Z)-octadeca-9,12,15-trienoic acid | | 18 | 3 |
| tetradecanoic acid | | 14 | 0 |
| (9Z)-hexadec-9-enoic acid | | 16 | 1 |
| (9Z,12Z)-octadeca-9,12-dienoic acid | | 18 | 2 |

FIG. 3D

| Original Compound Name | Chemical Structure | L | S |
|---|---|---|---|
| (9Z,11E)-octadeca-9,11-dienoic acid | | 18 | 2 |
| (6Z,9Z,12Z)-octadeca-6,9,12-trienoic acid | | 18 | 3 |
| (10Z)-heptadec-10-enoic acid | | 17 | 1 |
| 12-methoxydodecanoic acid | | 14 | 0 |
| 4-[4-(heptyloxy)phenyl]-4-oxobutanoic acid | | 16 | 2 |

FIG. 3E

| Original Compound Name | Chemical Structure | L | S |
|---|---|---|---|
| (11Z,14Z,17Z)-icosa-11,14,17-trienoic acid | | 20 | 3 |
| (6Z,9Z,12Z,15Z)-octadeca-6,9,12,15-tetraenoic acid | | 18 | 4 |
| (9Z)-octadec-9-enoic acid | | 18 | 1 |
| (8Z,11Z,14Z)-icosa-8,11,14-trienoic acid | | 20 | 3 |
| (9E)-hexadec-9-enoic acid | | 16 | 1 |

FIG. 3F

| Original Compound Name | Chemical Structure | L | S |
|---|---|---|---|
| 10(E),12(Z)-Conjugated Linoleic Acid | | 18 | 2 |
| (11Z,14Z)-icosa-11,14-dienoic acid | | 20 | 2 |
| (5Z,8Z,11Z,14Z,17Z)-icosa-5,8,11,14,17-pentaenoic acid | | 20 | 5 |
| (11Z)-octadec-11-enoic acid | | 18 | 1 |
| (5Z,8Z,11Z,14Z)-icosa-5,8,11,14-tetraenoic acid | | 20 | 4 |

FIG. 3G

| Original Compound Name | Chemical Structure | L | S |
|---|---|---|---|
| (5Z,8Z)-icosa-5,8-dienoic acid | | 20 | 2 |
| cis-7-Hexadecenoic Acid | | 16 | 1 |
| (10Z,13Z)-nonadeca-10,13-dienoic acid | | 19 | 2 |
| (5Z,8Z,11Z)-icosa-5,8,11-trienoic acid | | 20 | 3 |

3-(4-((4-fluoro-4'-methylbiphenyl-2-yl)methoxy)phenyl)propanoic acid

4-[4-(heptyloxy)phenyl]-4-oxobutanoic acid eicosapentanoic acid

Overlay of eicosapentanoic acid; 3-(4-((4-fluoro-4'-methylbiphenyl-2-yl)methoxy)phenyl)propanoic acid; and 4-[4-(heptyloxy)phenyl]-4-oxobutanoic acid showing position of fGPR120:Arg99 to the compounds when bound to the receptor.

FIG. 8A
Oleic Acid
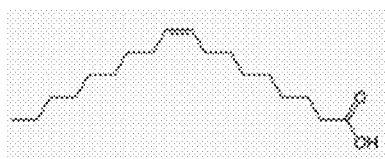
FIG. 8B
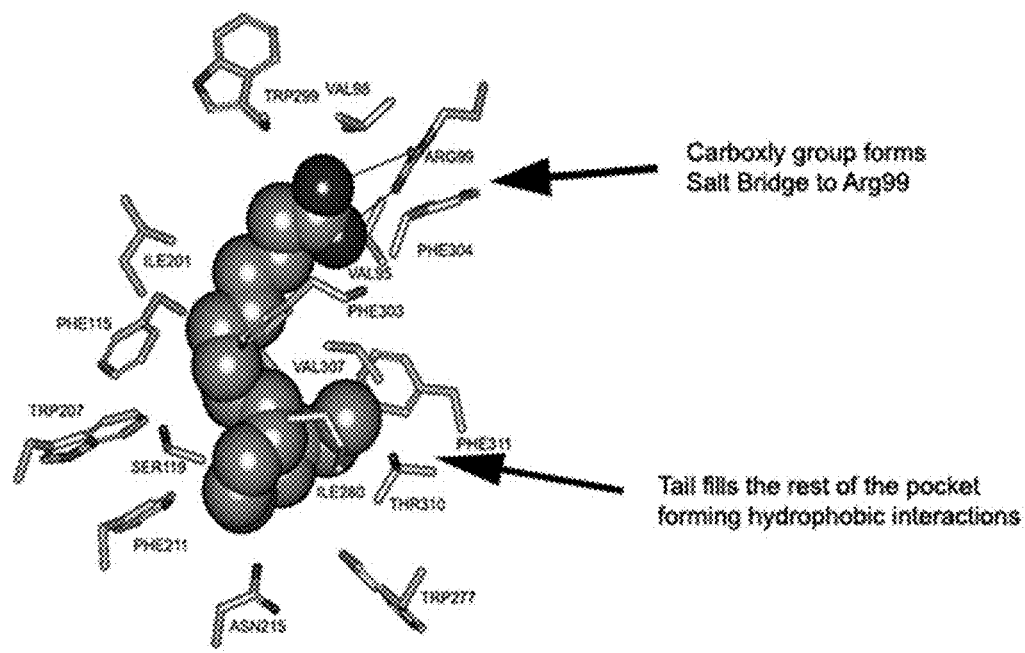
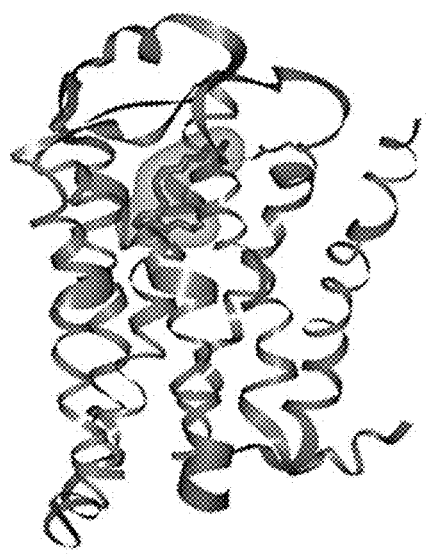

Linoleic Acid

FIG. 10 fGPR120 Protein Sequence (361aa) (SEQ ID NO:1)

MSPECAQAAGTGSPRSLERANRTRFPFFSDVKGDHRLVLTAVETVVLALIFAVSLLGNVC
ALVLVARRRRRGTTACLVLNLFCADLLFTSAIPPVLAVRWTEAWLLGPVACHLLFYVMSL
SGSVTILTLAAVSLERMVCIVRLQRGVRGLGRRARAALLALIWGYSALAALPLCVFFQVV
PQRLSGRDQEIPICTLSWPSIAGEISWDVSFVTLNFLMPGLLIVISYSKILQITKASRKR
LTVNLASSESHHIRVSQQDFRLFRTLFLLMISFFIMWSPIIITILLILIQNFKQDLVIWP
SLFFWVVAFTFANSALNPILYNMSLFRNEWRKIFHCFFYPEKGAMFTDTSVRRNDLSVIS
N

SEQUENCE LISTING

<160> NUMBER OF SEQ ID NOS: 1

<210> SEQ ID NO 1
<211> LENGTH: 361
<212> TYPE: PRT
<213> ORGANISM: Felis catus

<400> SEQUENCE: 1

Met Ser Pro Glu Cys Ala Gln Ala Ala Gly Thr Gly Ser Pro Arg Ser
1               5                   10                  15

Leu Glu Arg Ala Asn Arg Thr Arg Phe Pro Phe Phe Ser Asp Val Lys
            20                  25                  30

Gly Asp His Arg Leu Val Leu Thr Ala Val Glu Thr Val Val Leu Ala
        35                  40                  45

Leu Ile Phe Ala Val Ser Leu Leu Gly Asn Val Cys Ala Leu Val Leu
    50                  55                  60

Val Ala Arg Arg Arg Arg Gly Thr Thr Ala Cys Leu Val Leu Asn
65                  70                  75                  80

Leu Phe Cys Ala Asp Leu Leu Phe Thr Ser Ala Ile Pro Pro Val Leu
                85                  90                  95

Ala Val Arg Trp Thr Glu Ala Trp Leu Leu Gly Pro Val Ala Cys His
            100                 105                 110

Leu Leu Phe Tyr Val Met Ser Leu Ser Gly Ser Val Thr Ile Leu Thr
        115                 120                 125

Leu Ala Ala Val Ser Leu Glu Arg Met Val Cys Ile Val Arg Leu Gln
    130                 135                 140

Arg Gly Val Arg Gly Leu Gly Arg Arg Ala Arg Ala Ala Leu Leu Ala
145                 150                 155                 160

Leu Ile Trp Gly Tyr Ser Ala Leu Ala Ala Leu Pro Leu Cys Val Phe
                165                 170                 175

Phe Gln Val Val Pro Gln Arg Leu Ser Gly Arg Asp Gln Glu Ile Pro
            180                 185                 190

Ile Cys Thr Leu Ser Trp Pro Ser Ile Ala Gly Glu Ile Ser Trp Asp
        195                 200                 205

Val Ser Phe Val Thr Leu Asn Phe Leu Met Pro Gly Leu Leu Ile Val
    210                 215                 220

Ile Ser Tyr Ser Lys Ile Leu Gln Ile Thr Lys Ala Ser Arg Lys Arg
225                 230                 235                 240

Leu Thr Val Asn Leu Ala Ser Ser Glu Ser His His Ile Arg Val Ser
                245                 250                 255

Gln Gln Asp Phe Arg Leu Phe Arg Thr Leu Phe Leu Leu Met Ile Ser
            260                 265                 270

```
Phe Phe Ile Met Trp Ser Pro Ile Ile Ile Thr Ile Leu Leu Ile Leu
        275             280             285

Ile Gln Asn Phe Lys Gln Asp Leu Val Ile Trp Pro Ser Leu Phe Phe
    290             295             300

Trp Val Val Ala Phe Thr Phe Ala Asn Ser Ala Leu Asn Pro Ile Leu
305             310             315                     320

Tyr Asn Met Ser Leu Phe Arg Asn Glu Trp Arg Lys Ile Phe His Cys
            325             330             335

Phe Phe Tyr Pro Glu Lys Gly Ala Met Phe Thr Asp Thr Ser Val Arg
            340             345             350

Arg Asn Asp Leu Ser Val Ile Ser Asn
        355             360
```

COMPOUNDS THAT MODULATE FATTY ACID RECEPTOR ACTIVITY AND PET FOOD PRODUCTS CONTAINING THE SAME

CROSS-REFERENCE TO RELATED APPLICATIONS

This application is a continuation of U.S. patent application Ser. No. 15/534,421, filed on Jun. 8, 2017, which is a U.S. National Stage Patent Application under 35 U.S.C. § 371 of International Application No. PCT/US2015/065106, filed on Dec. 10, 2015, which claims priority to U.S. Provisional Application No. 62/090,138, filed on Dec. 10, 2014, the contents of each of which are hereby incorporated by reference in their entireties, and to which priority is claimed.

SEQUENCE LISTING

The specification incorporates by reference the Sequence Listing submitted herewith via EFS on Sep. 8, 2020. Pursuant to 37 C.F.R. § 1.52(e)(5), the Sequence Listing text file, identified as 069269_0370_Sequence_Listing.txt, is 3,532 bytes and was created on Sep. 4, 2020. The Sequence Listing, electronically filed herewith, does not extend beyond the scope of the specification and thus does not contain new matter.

FIELD

The presently disclosed subject matter relates to compounds and flavor compositions that include at least one compound that interacts with a fatty acid receptor. The flavor compositions can be used to enhance or modify the palatability, taste and/or flavor of pet food products. The flavor compositions can include combinations of compounds, and can be added to pet food products in various delivery system formats.

BACKGROUND

Taste profiles for edible compositions include basic tastes such as sweet, salt, bitter, sour, umami and kokumi. Taste profiles have also been described as including free fatty acid tastes. Chemical compounds that elicit these tastes are often referred to as tastants. It is hypothesized that tastants are sensed by taste receptors in the mouth and throat which transmit signals to the brain where the tastants and resulting taste profiles are registered. Taste receptors include the GPR120 (also known as GPR129, O3FAR1, PGR4, FFAR4) taste receptor, which is predicted to be a G-protein coupled cell surface receptor, containing seven transmembrane domains involved in the detection of specific fatty acids, and the G-protein associated intracellular portion involved in signal transduction. GPR120 is thought to bind medium to long-chain fatty acids, such as oleic acid and linoleic acid, in their free form. It has been predicted that two isoforms (splice variants) of the GPR120 receptor exists in humans, GPR120L and GPR120S, on colonic endocrine cells. It has been suggested that the long isoform does not signal functionally in the perception of taste.

GPR120 is expressed in various mammalian tissues and is a known receptor for unsaturated long chain fatty acids. GPR120 has been known to be involved in the stimulation of cholecystokinin (CCK) secretion from STC-1, an intestinal secretory cell line, and it has been reported that GPR120 has stimulatory effects on the secretion of glucogon like peptide (GLP 1). Although the potential involvement of GPR120 in stress regulation and insulin sensitization has been explored, as well as its potential anti-inflammatory and anti-obesity effects (see, e.g., Cartoni et al., J Neurosci. 2010 Jun. 23; 30(25):8376-82; Céline et al., PLoS One. 2011; 6(8):e24014; International Publication No. WO/2007/134613, published Nov. 29, 2007; European Publication No. EP1932920A1, published Jun. 18, 2008; and European Publication No. EP1688138A1, published Aug. 9, 2006), GPR120 has not been suggested to be involved in modulating the palatability of pet food, and cat and dog food in particular.

Pet food manufacturers have a long-standing desire to provide pet food products that have high nutritional value. In addition, and with particular regard to cat and dog foods, pet food manufacturers desire a high degree of palatability so that pets can receive the full nutritional benefit from their food. Domestic animals, especially cats, are notoriously fickle in their food preferences, and often refuse to eat a pet food product that it has accepted over some time or refuse to eat any more than a minimal amount of a pet food product. As a result, pet owners frequently change types and brands of pet food in order to maintain their pets in a healthy and contented condition.

While there have been recent advances in taste and flavor technologies, there remains a need for compounds that can enhance or modify the palatability of pet food products by enhancing or modifying the taste, texture and/or flavor profiles of the pet food product. The enhancement or modification can be to increase the intensity of a desirable attribute, to replace a desirable attribute that is not present or somehow lost in the pet food product, or to decrease the intensity of an undesirable attribute. In particular, it is desirable to increase the intensity of a tastant in a pet food product. Therefore, there remains a need in the art for compositions to enhance the palatability and taste of pet food products, which is separate from any attempts to control obesity or control fatty acid uptake.

SUMMARY OF THE INVENTION

The presently disclosed subject matter is directed to flavor compositions and methods for making and modifying such compositions across a variety of pet food products.

Specifically, the present disclosure is directed to compositions comprising one or more compounds that enhance, increase and/or modulate the activity of the fatty acid receptor, GPR120.

In certain embodiments of the present disclosure, the flavor composition comprises one or more compound selected from the group consisting of (5Z,8Z,11Z,14Z)-icosa-5,8,11,14-tetraenoic acid (also known as Arachidonic Acid);

(5Z,8Z)-icosa-5,8-dienoic acid;

4-[4-(heptyloxy)phenyl]-4-oxobutanoic acid;

(11Z)-octadec-11-enoic acid (also known as cis-Vaccenic acid);

(9E)-hexadec-9-enoic acid (also known as Palmitelaidic acid);

tridec-12-enoic acid (also known as 12-Tridecenoic acid);

S-Farnesyl Thioacetic Acid;

(10Z)-pentadec-10-enoic acid (also known as (10Z)-10-Pentadecenoic acid);

10(E),12(Z)-Conjugated Linoleic Acid (also known as (10Z,12Z)-10,12-Octadecadienoic acid);

(10Z,13Z)-nonadeca-10,13-dienoic acid;

(9Z,11E)-octadeca-9,11-dienoic acid;

cis-7-Hexadecenoic Acid;
dodecanoic acid (also known as Lauric acid);
(9Z)-tetradec-9-enoic acid (also known as Myristoleic acid);
(11Z,14Z,17Z)-icosa-11,14,17-trienoic acid (also known as Dihomo-α-linolenic acid (20:3(n-3)));
(6Z,9Z,12Z)-octadeca-6,9,12-trienoic acid (also known as γ-Linolenic acid);
(11Z,14Z)-icosa-11,14-dienoic acid (also known as Dihomolinoleic acid (20:2(n-6)));
(9Z)-hexadec-9-enoic acid (also known as palmitoleate, (Z)-Palmitoleic acid);
12-methoxydodecanoic acid;
(8Z,11Z,14Z)-icosa-8,11,14-trienoic acid;
(9Z,12Z)-octadeca-9,12-dienoic acid (also known as Linoleic acid);
(10Z)-heptadec-10-enoic acid;
Pinolenic Acid;
(9Z,12Z,15Z)-octadeca-9,12,15-trienoic acid (also known as α-Linolenic acid);
tridecanoic acid (also known as Tridecylic acid);
tetradecanoic acid (also known as Myristic acid);
(9Z)-octadec-9-enoic acid (also known as Oleic acid);
GW 9508 (also known as 4-[[(3-Phenoxyphenyl)methyl] amino]benzenepropanoic acid);
(5Z,8Z,11Z,14Z,17Z)-icosa-5,8,11,14,17-pentaenoic acid (also known as Eicosapentanoic acid);
3-(4-((4-fluoro-4'-methylbiphenyl-2-yl)methoxy)phenyl) propanoic acid (also known as TUG 891 and 4-[(4-Fluoro-4'-methyl[1,1'-biphenyl]-2-yl)methoxy]-benzenepropanoic acid);
(10E)-pentadec-10-enoic acid;
(9E)-tetradec-9-enoic acid (also known as Myristoleate);
(6Z,9Z,12Z,15Z)-octadeca-6,9,12,15-tetraenoic acid;
(5Z,8Z,11Z)-icosa-5,8,11-trienoic acid (also known as Mead acid); and
Dodecyl dihydrogen phosphate.

In certain embodiments of the present disclosure, the flavor composition comprises a compound of Formula I comprising the structure:

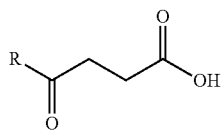

wherein R is a substituted or unsubstituted hydrocarbon chain.

In certain embodiments of the present disclosure, the flavor composition comprises a compound of Formula II comprising the structure:

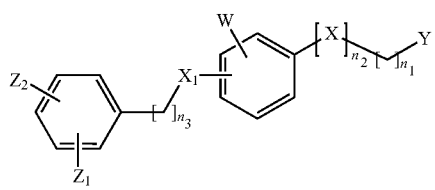

wherein X, $X_1$, Y, W, $Z_1$, $Z_2$, $n_1$, $n_2$, and $n_3$ are as described herein.

In certain embodiments of the present disclosure, the flavor composition comprises a compound of Formula III comprising the structure:

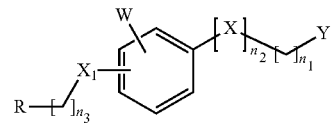

wherein X, $X_1$, Y, W, R, $n_1$, $n_2$, and $n_3$ are as described herein.

In certain embodiments of the present disclosure, the flavor composition comprises a compound having the structure, R—X, wherein X is a carboxyl group or a bioisosteric replacement for a caboxylate, and R is a substituted or unsubstituted hydrocarbon chain.

The present disclosure also provides for salts and stereoisomers of the compounds described herein.

In certain embodiments, the flavor composition further comprises at least one, two, three, four, five or more first amino acids and/or at least one, two, three, four, five or more second amino acids. Non-limiting examples of a first amino acid include tryptophan, phenylalanine, histidine, glycine, cysteine, alanine, tyrosine, serine, methionine, asparagine and leucine. Non-limiting examples of a second amino acid include threonine, isoleucine, proline, glutamic acid, aspartic acid, hydroxyl proline, arginine, cystine, glutamine, lysine, valine, orthinine, monosodium glutamate (MSG) and taurine.

In certain embodiments, the flavor composition can further comprise at least one standard nucleotide. Non-limiting examples of a standard nucleotide includes guanosine monophosphate (GMP), adenosine monophosphate (AMP), cytidine monophosphate (CMP), inosine monophosphate (IMP), uridine monophosphate (UMP), thymidine monophosphate (TMP) and xanthosine monophosphate (XMP). In certain embodiments, the flavor composition can further comprise at least one nucleotide derivative, as described herein.

In certain embodiments, the flavor composition can further comprise at least one transmembrane compound, as described herein.

In certain embodiments, the present disclosure provides pet food products including a flavor composition, comprising a compound, wherein the flavor composition is present in an amount effective to increase a fatty acid taste of the food products, as determined by a panel of taste testers.

In certain embodiments, the present disclosure provides pet food products including a flavor composition, comprising a compound, wherein the flavor composition is present at a concentration of about 0.001 weight % to about 10 weight % (% w/w), or about 0.01% to about 1% w/w of the pet food product. In certain embodiments, the pet food product is a feline pet food product.

In certain embodiments, the present disclosure provides pet food products including a flavor composition, comprising a compound. In certain embodiments, the flavor composition is present at a concentration of about 0.01 ppm to about 1,000 ppm of the pet food product. Alternatively or additionally, the compound can be present at a concentration of about 10 pM to about 1 M in the pet food product.

The present disclosure further provides methods for increasing the palatability of a pet food product. In certain embodiments, the method comprises admixing the pet food product with a flavor composition. In certain embodiments, the flavor composition is present at a concentration of about 0.001 weight % to about 10 weight % of the admixture.

In certain embodiments of the present disclosure, a method for increasing the palatability of a pet food product comprises admixing the pet food product with a flavor composition. In certain embodiments, the flavor composition is present at a concentration of about 0.01 ppm to about 1,000 ppm of the admixture. Alternatively or additionally, the at least one compound is present at a concentration of about 10 pM to about 1 M in the admixture.

In certain embodiments of the present disclosure, a flavor composition is admixed with a pet food product in an amount effective to increase the palatability of the pet food product.

The presently disclosed subject matter also provides for methods of modulating the activity of a fatty acid receptor, comprising contacting a composition with a fatty acid receptor, for example, a feline fatty acid receptor comprising an amino acid sequence of SEQ ID NO: 1, wherein the composition interacts with one or more amino acids in an interacting site of the fatty acid receptor selected from the group consisting of PHE88, VAL95, VAL98 and ARG99 on Helix 2; PHE115, MET118, SER19, GLY122, SER123 on Helix 3; TRP207, PHE211, VAL212, ASN215 on Helix 5; TRP277, ILE280, ILE281, ILE284 on Helix 6; and TRP299, PHE303, PHE304, VAL307, THR310, PHE311 on Helix 7; and combinations thereof.

The presently disclosed subject matter also provides for methods for identifying a composition that modulates the activity of a fatty acid receptor comprising contacting a test agent with a fatty acid receptor and detecting an interaction between the test agent and one or more amino acids in an interacting site of the fatty acid receptor as described herein.

The foregoing has outlined rather broadly the features and technical advantages of the present application in order that the detailed description that follows may be better understood. Additional features and advantages of the application will be described hereinafter which form the subject of the claims of the application. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of the application, both as to its organization and method of operation, together with further objects and advantages will be better understood from the following description.

BRIEF DESCRIPTION OF THE DRAWINGS

FIGS. 3A-3G show the chemical structures of the compounds described by Example 1, and FIGS. 1A-1AH and 2A-2AH, that increase fGPR120 activity. The number of carbon atoms in each compound is indicated in the column labeled "L," and the number of double bonds in each compound is indicated in the column labeled "S."

FIG. 4A shows the structure of the binding compound, FIG. 4B shows a model of the compound binding to the fGPR120, and FIG. 4C shows the putative fGPR120 amino acid residues that interact with the binding compound.

FIG. 5A shows the structure of the binding compound, FIG. 5B shows a model of the compound binding to the fGPR120, and FIG. 5C shows the putative fGPR120 amino acid residues that interact with the binding compound.

FIG. 6A shows the structure of the binding compound, FIG. 6B shows a model of the compound binding to the fGPR120, and FIG. 6C shows the putative fGPR120 amino acid residues that interact with the binding compound.

FIGS. 8A and 8B show the in silico modeling of the binding of the compound oleic acid to fGPR120, wherein a salt bridge is formed between the carboxyl group of oleic acid and Arg99 of fGPR120. FIG. 8A shows the structure of the binding compound, and FIG. 8B shows a model of the compound binding to the fGPR120, wherein putative fGPR120 amino acid residues that interact with the binding compound are shown.

FIG. 9A shows the structure of the binding compound, FIG. 9B shows a model of the compound binding to the fGPR120, and FIG. 9C shows the putative fGPR120 amino acid residues that interact with the binding compound.

DETAILED DESCRIPTION

Figure 1A:
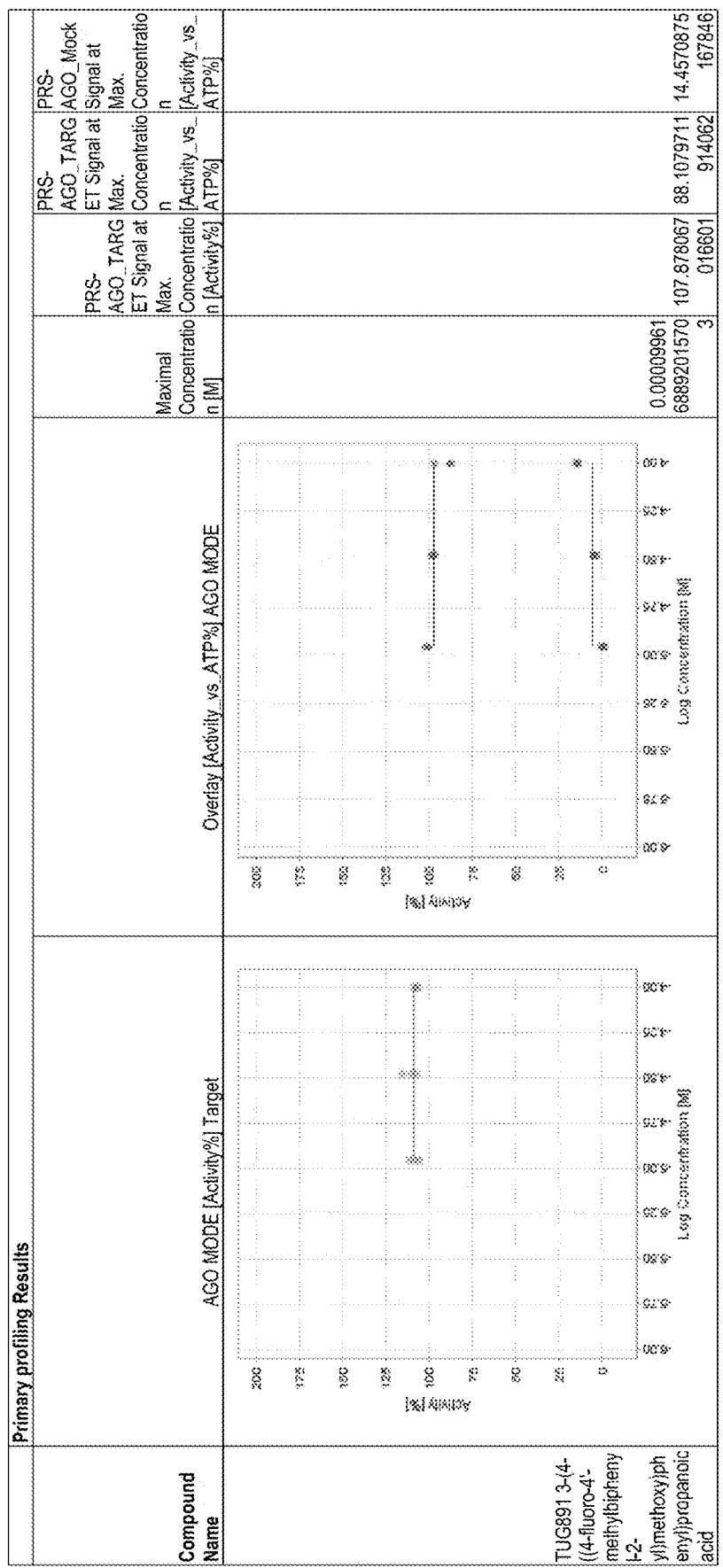
FIGS. 1A-1AH show in vitro fGPR120 receptor activity levels for three different doses of various compounds, as described by Example 1.
Figure 1B:
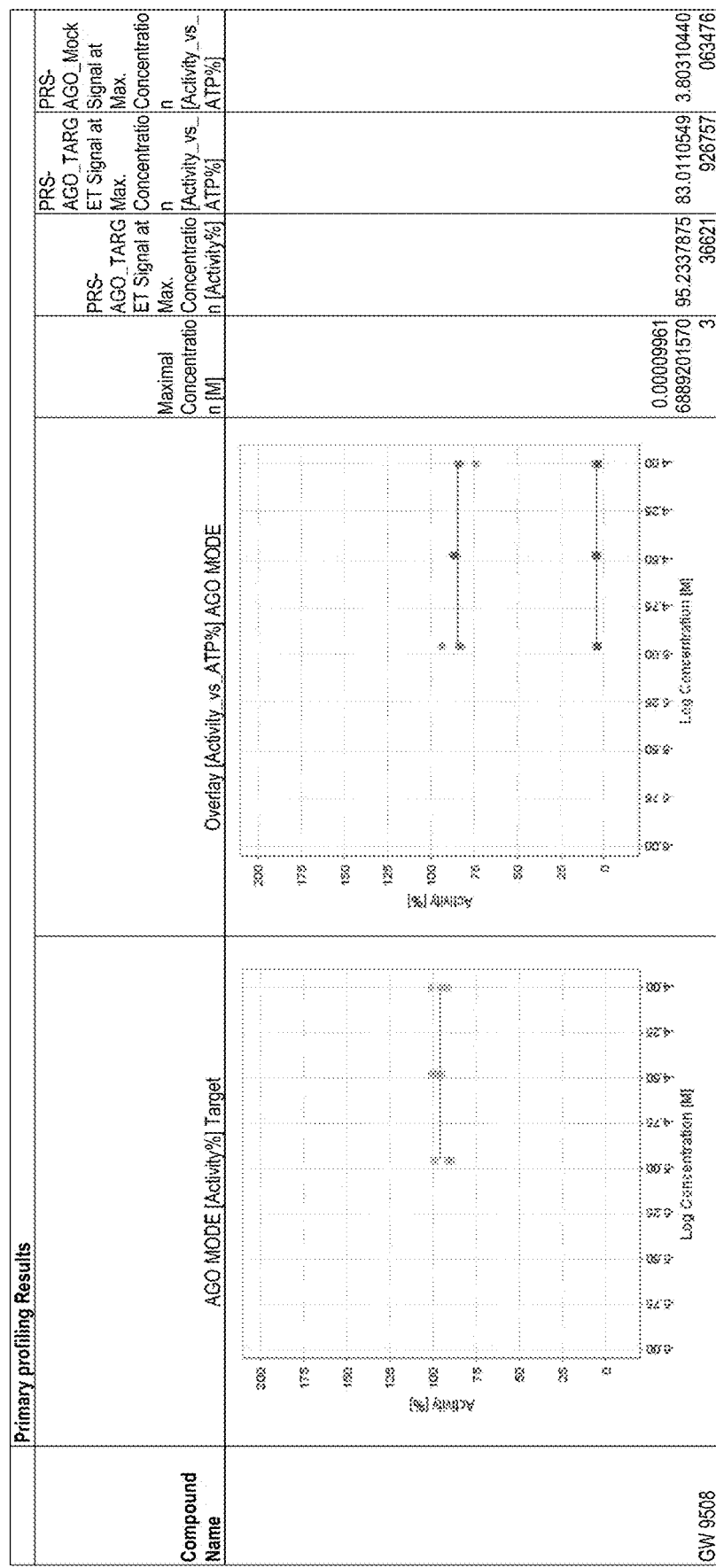
Figure 1C:
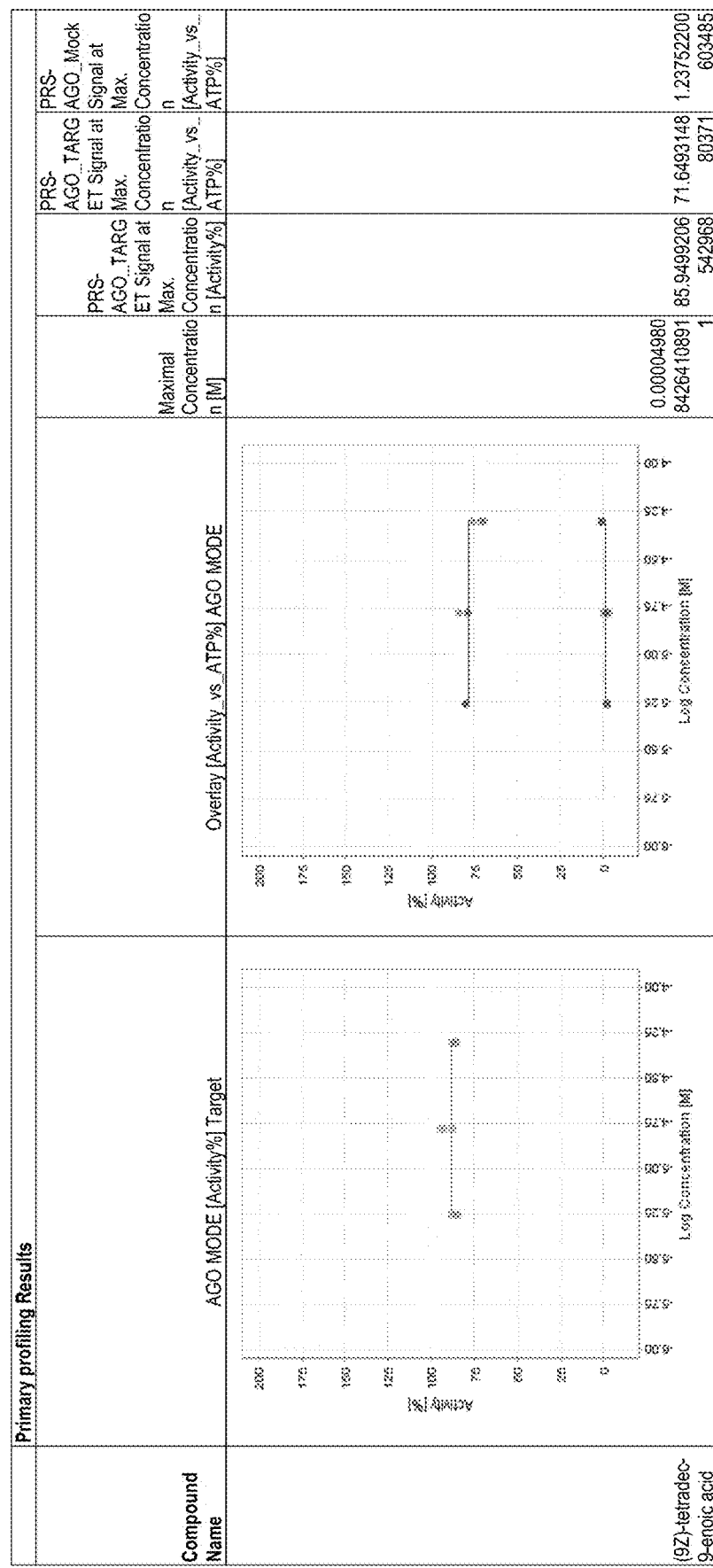
Figure 1D:
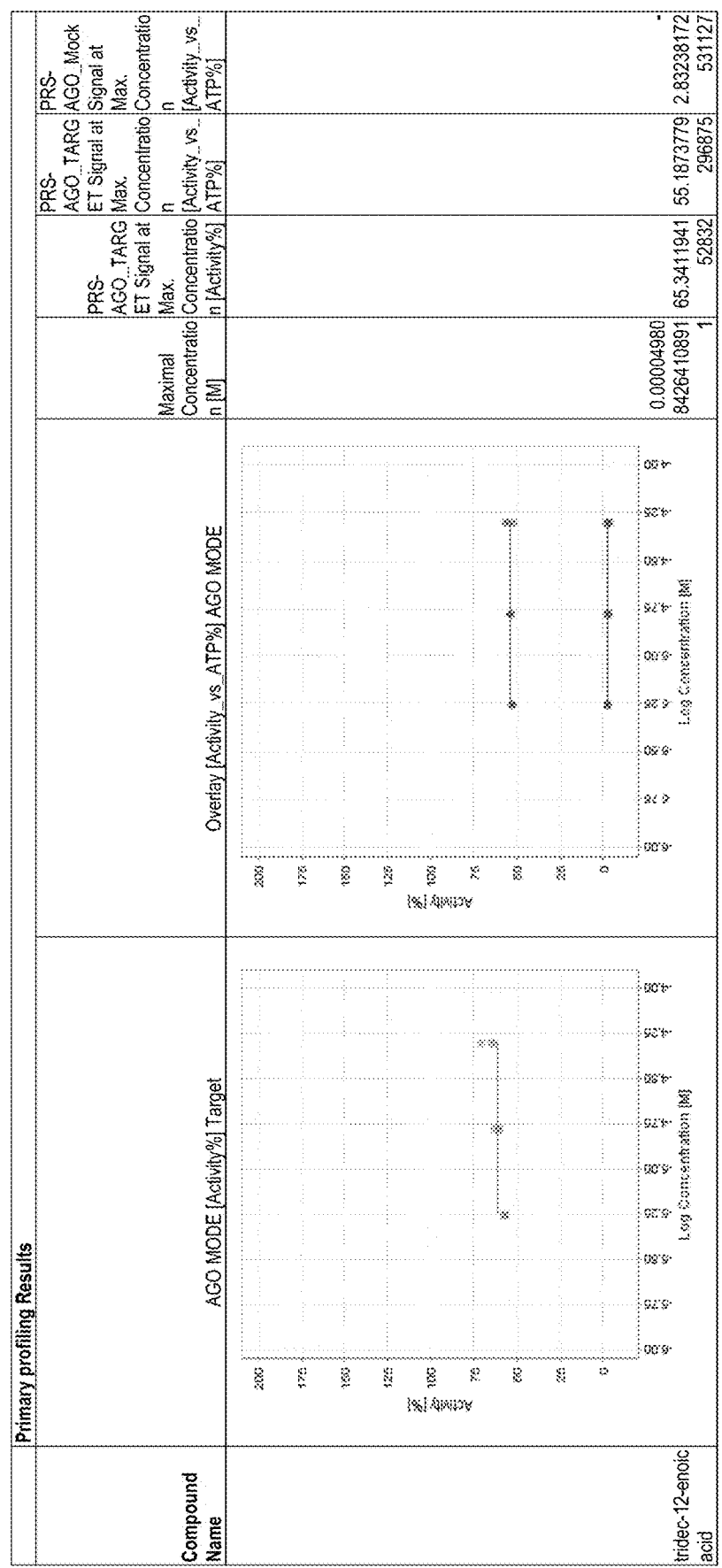
Figure 1E:
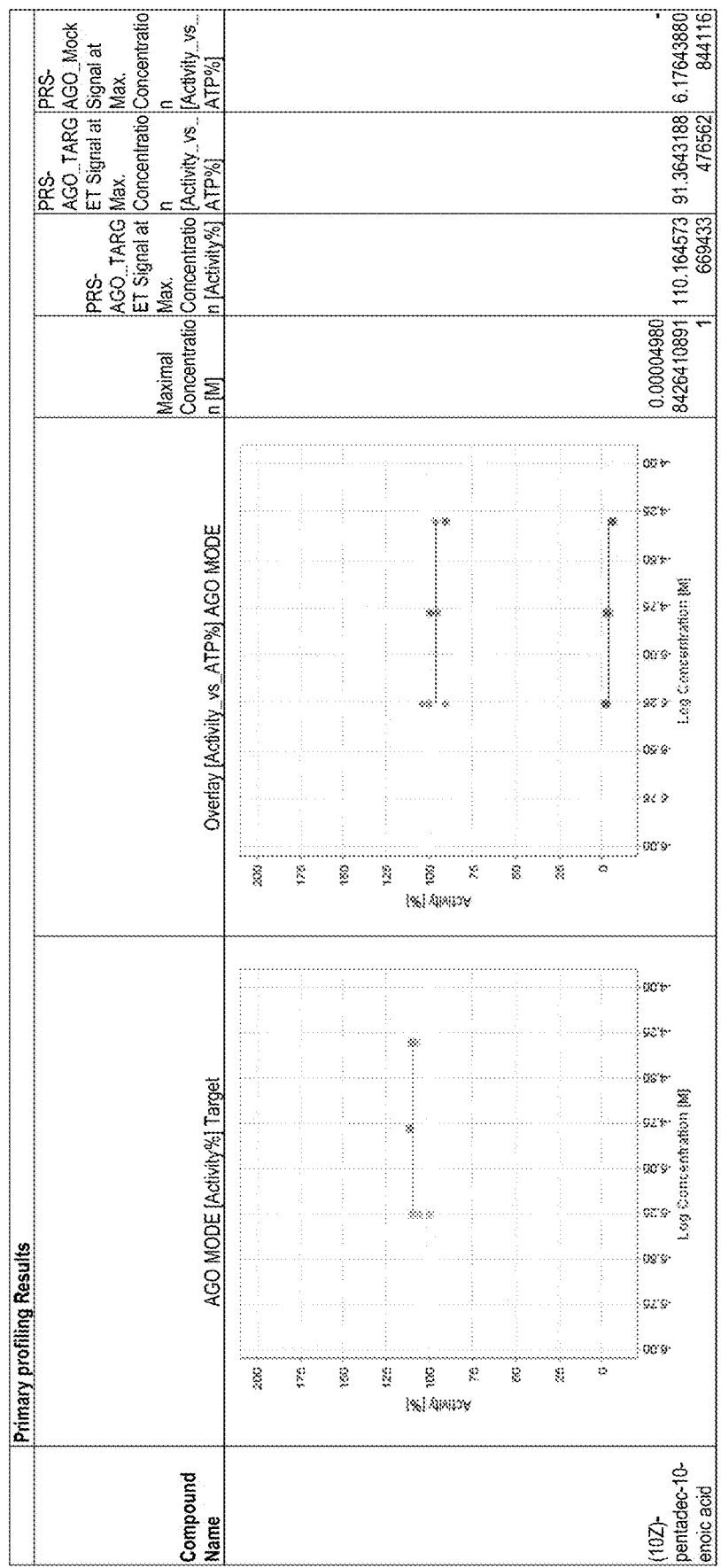
Figure 1F:
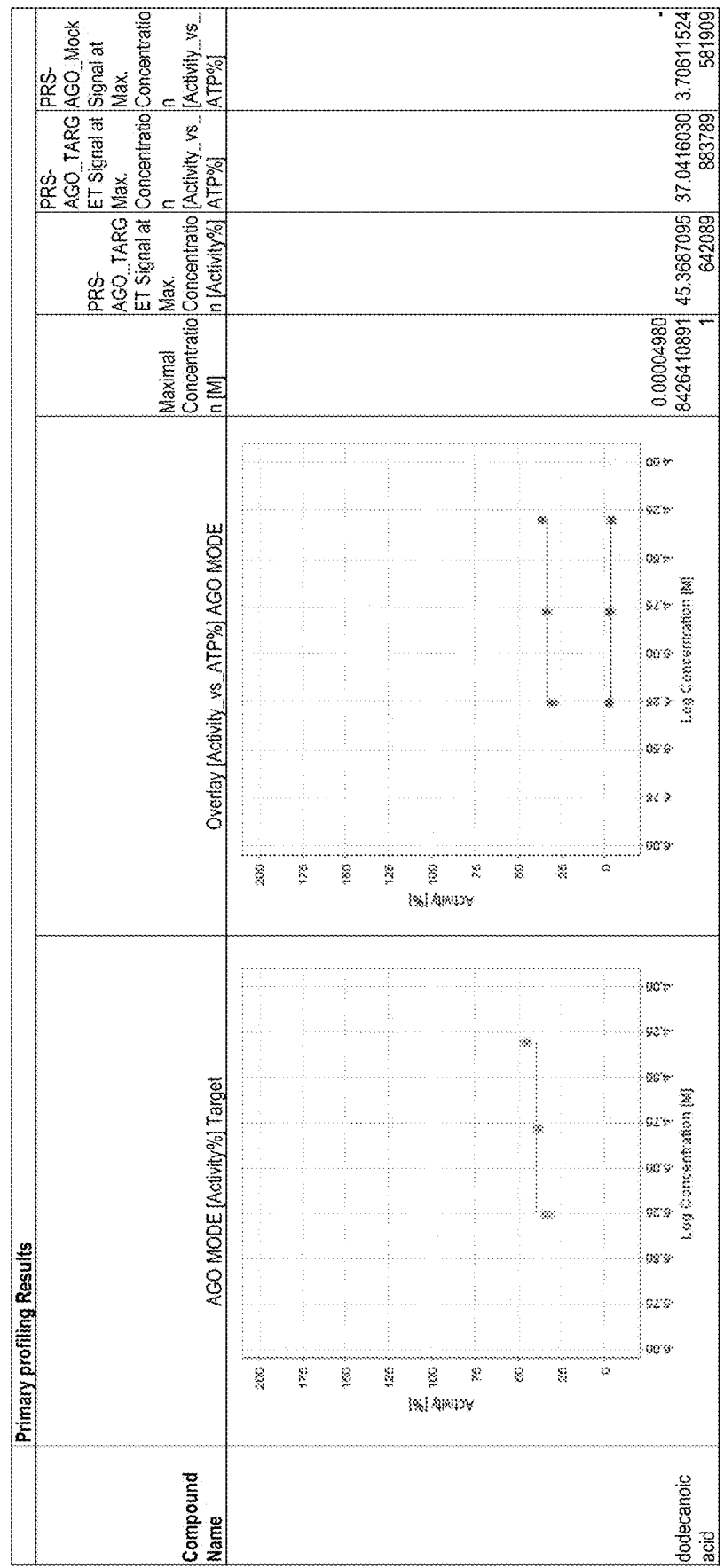
Figure 1G:
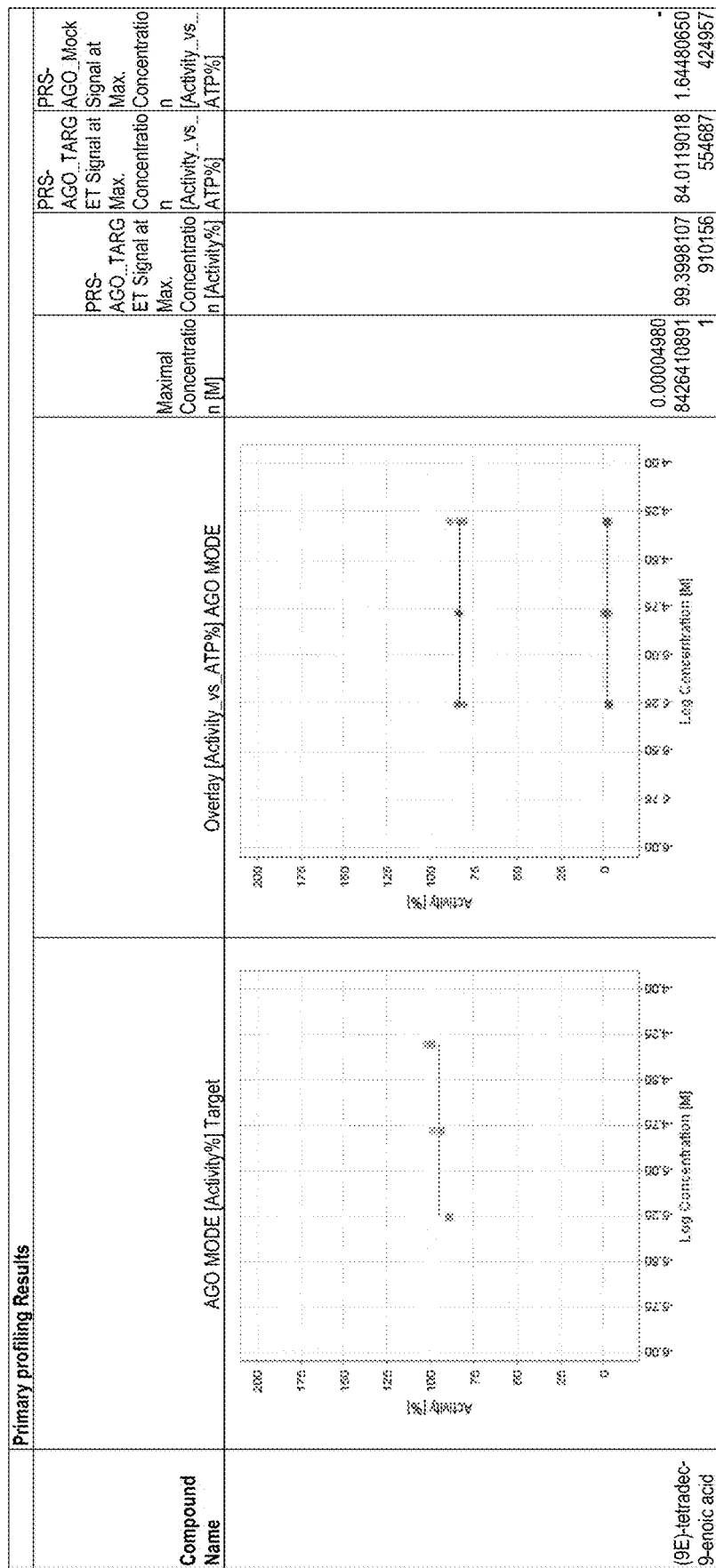
Figure 1H:
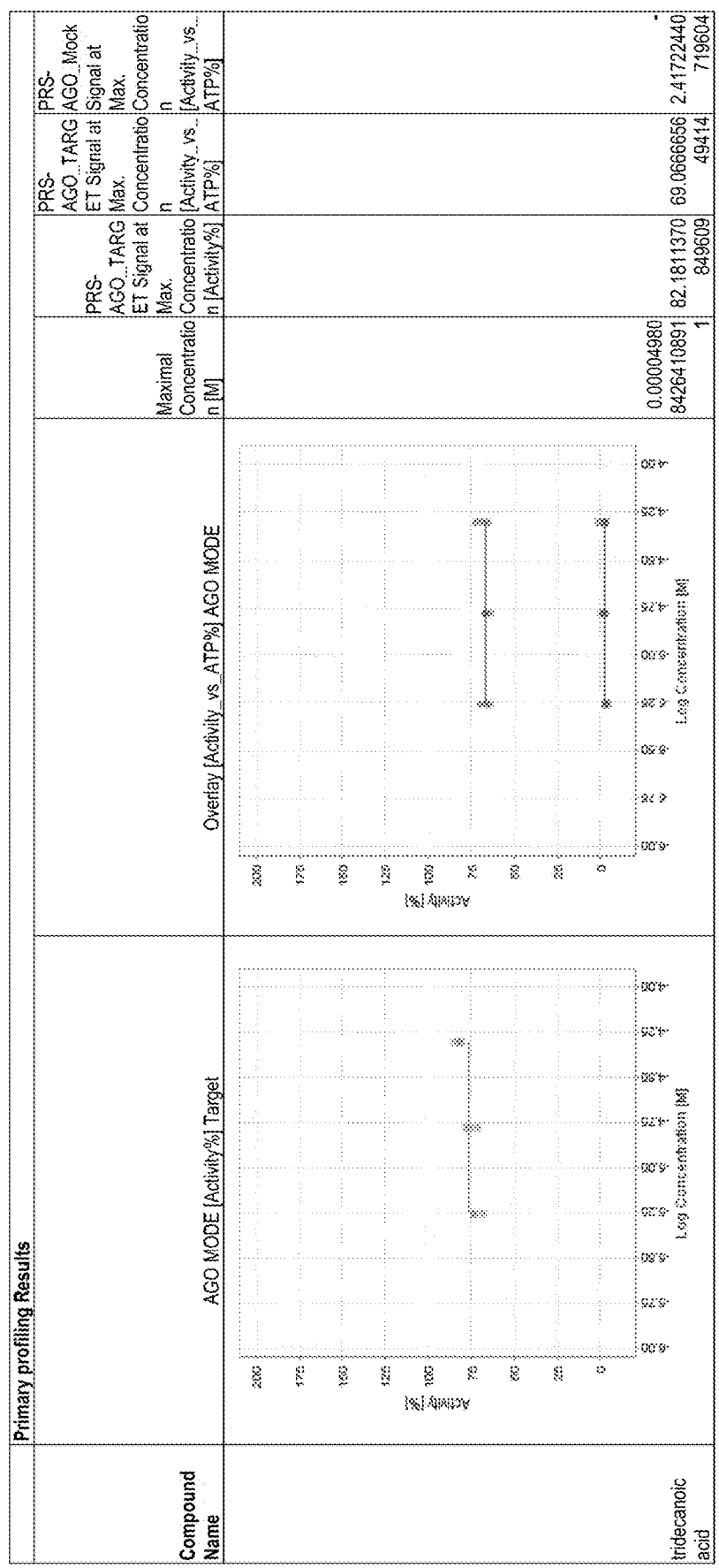
Figure 1I:
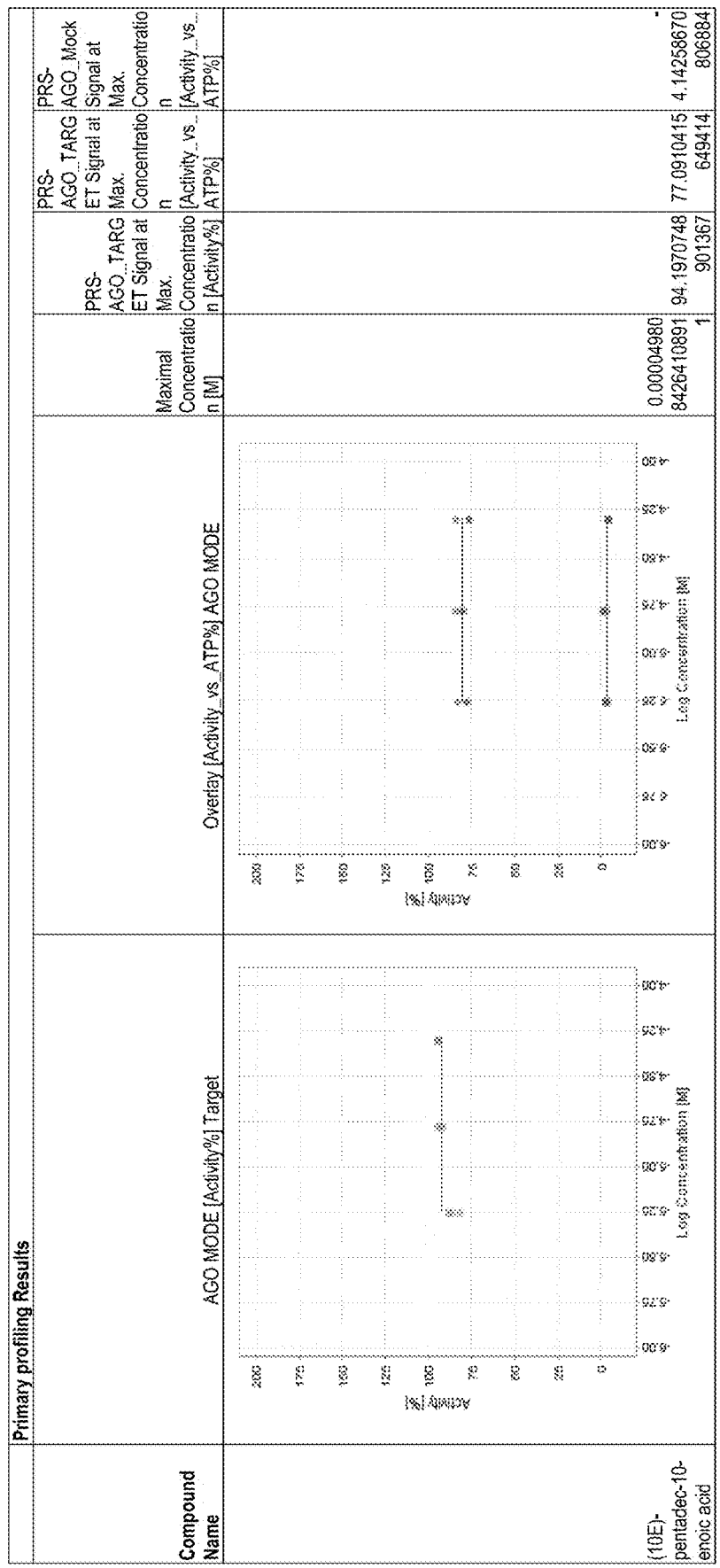
Figure 1J:
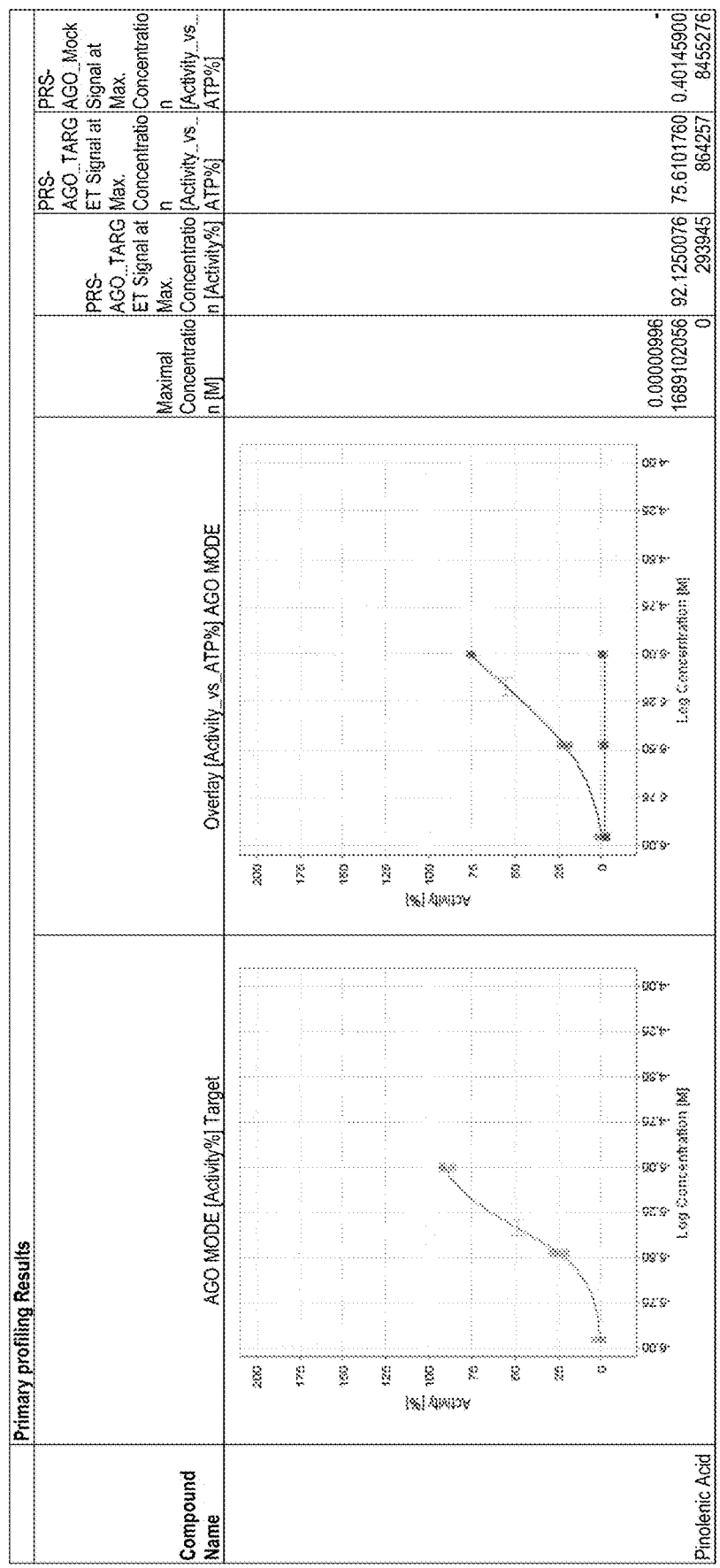
Figure 1K:
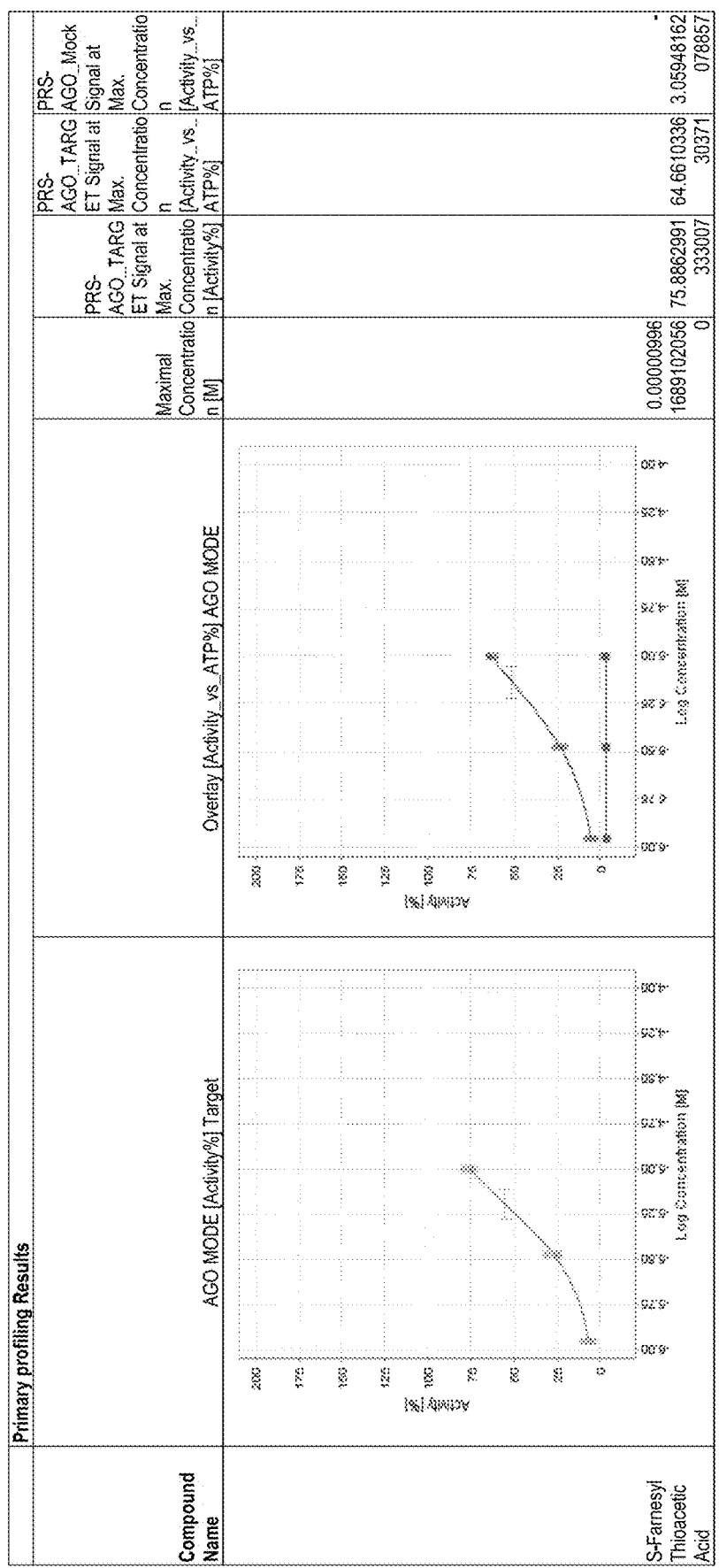
Figure 1L:
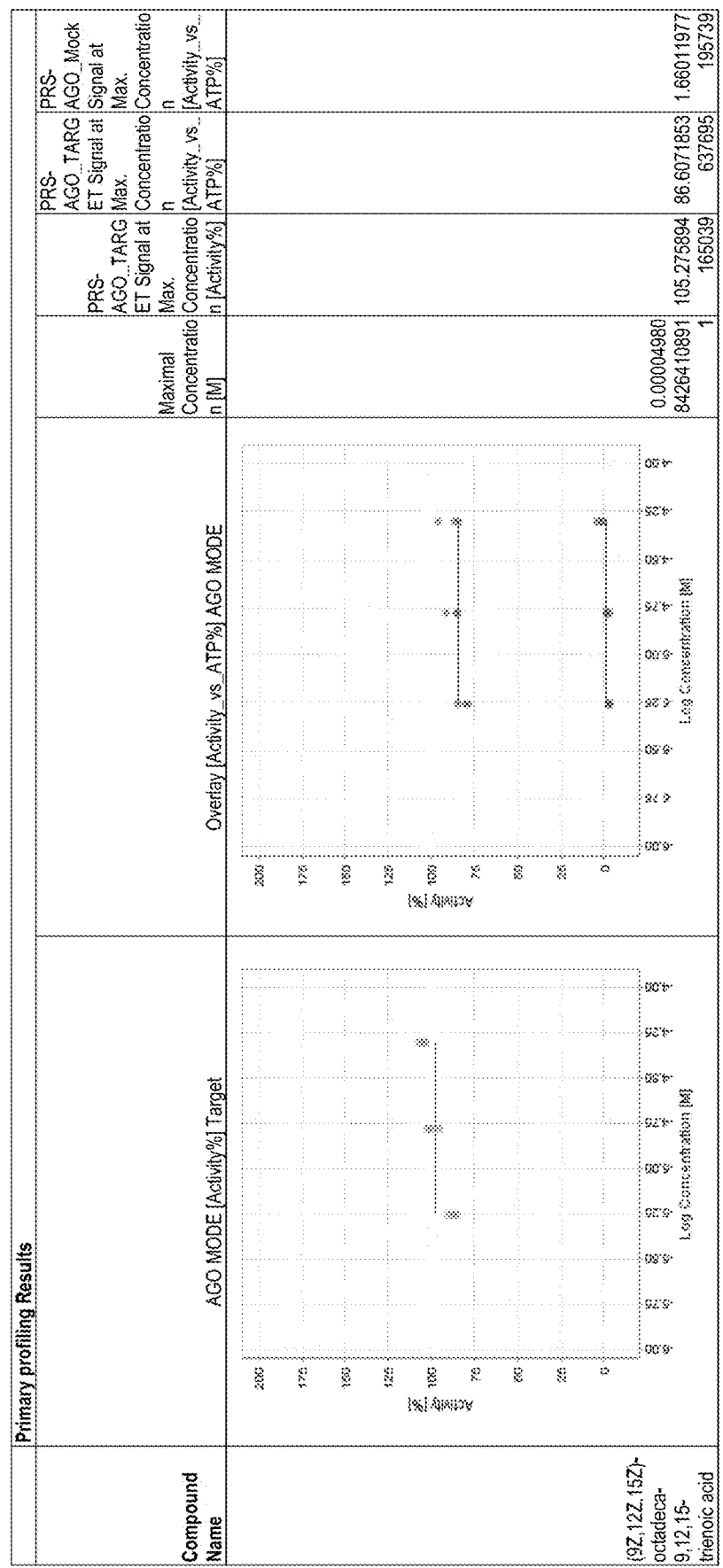
Figure 1M:
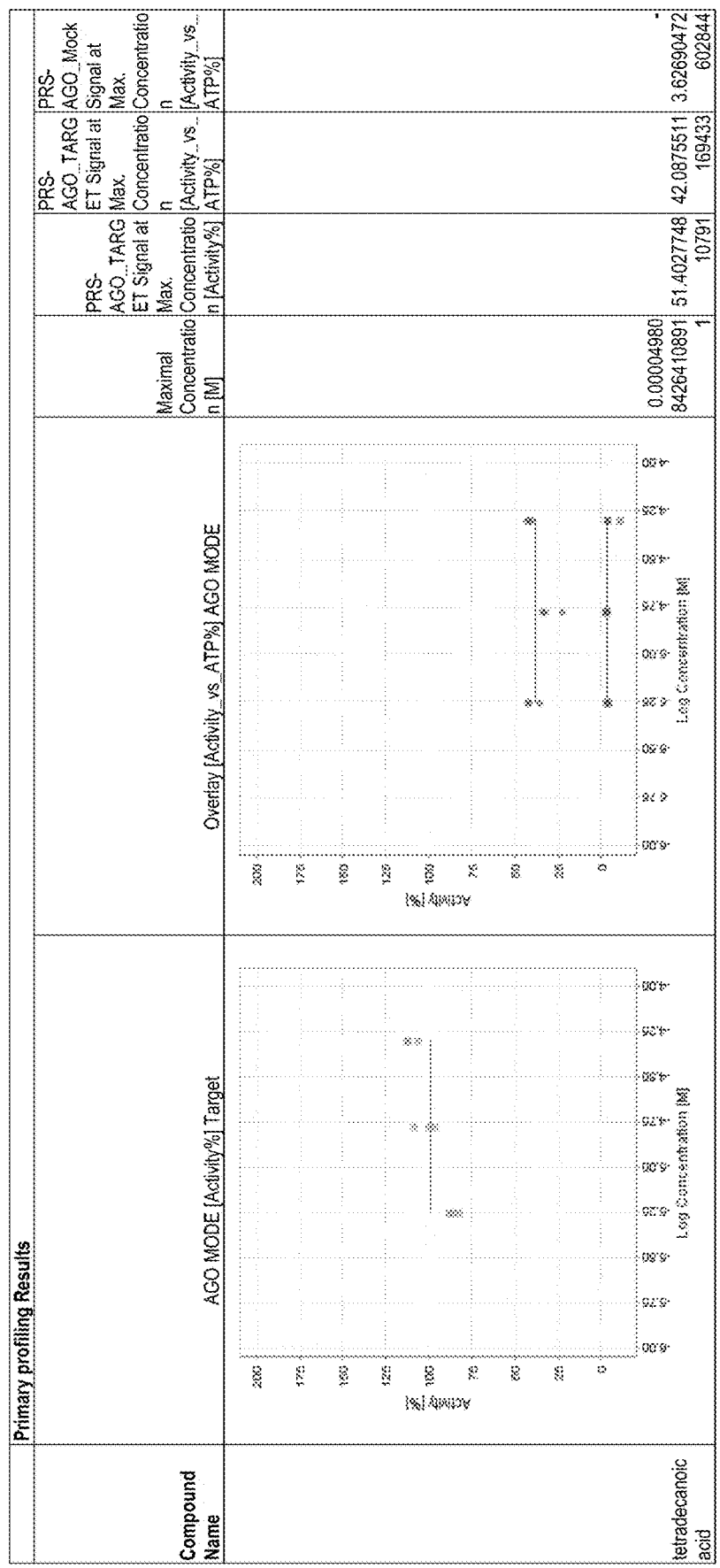
Figure 1N:
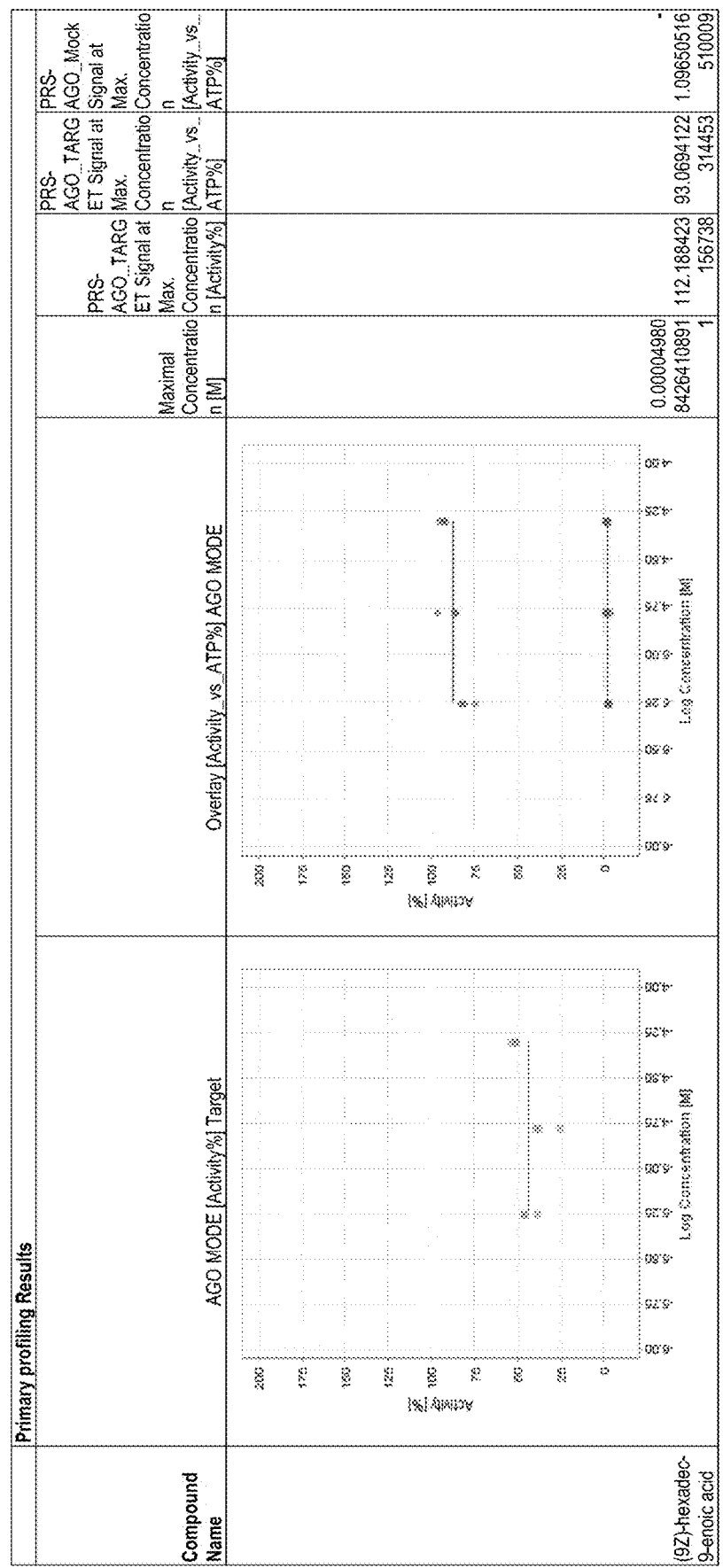
Figure 10:
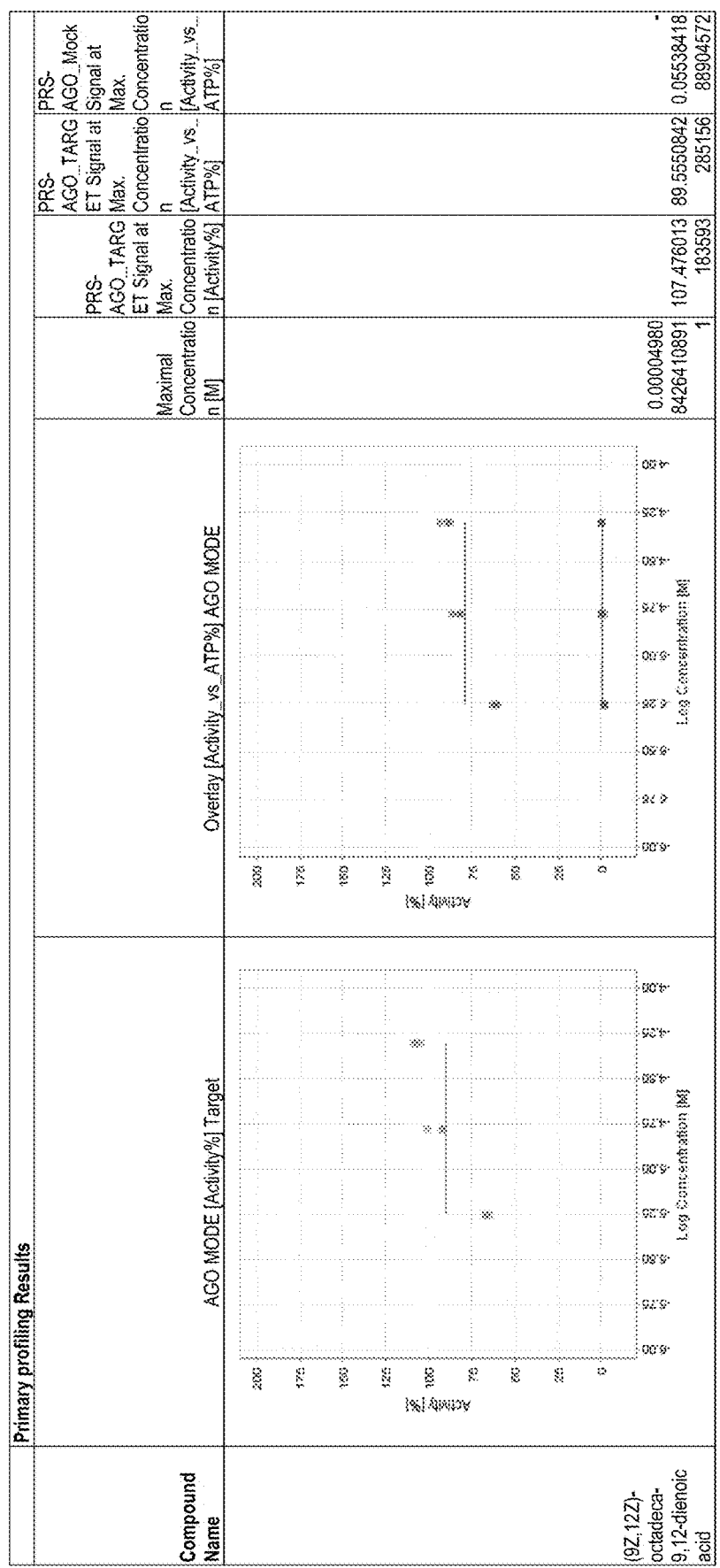
FIG. 10 show the amino acid sequence of the fGPR120 receptor, identified as SEQ ID NO:1.
Figure 1P:
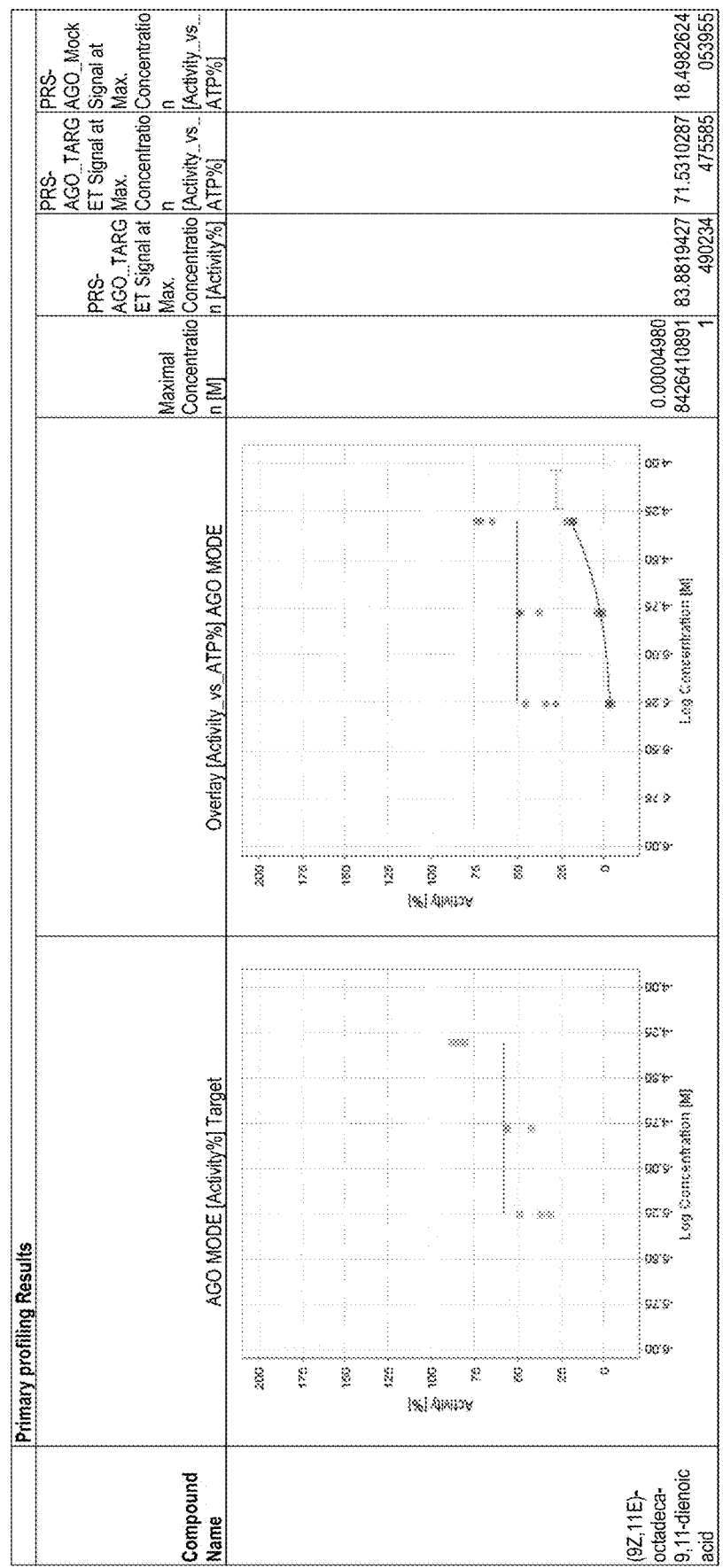
Figure 1Q:
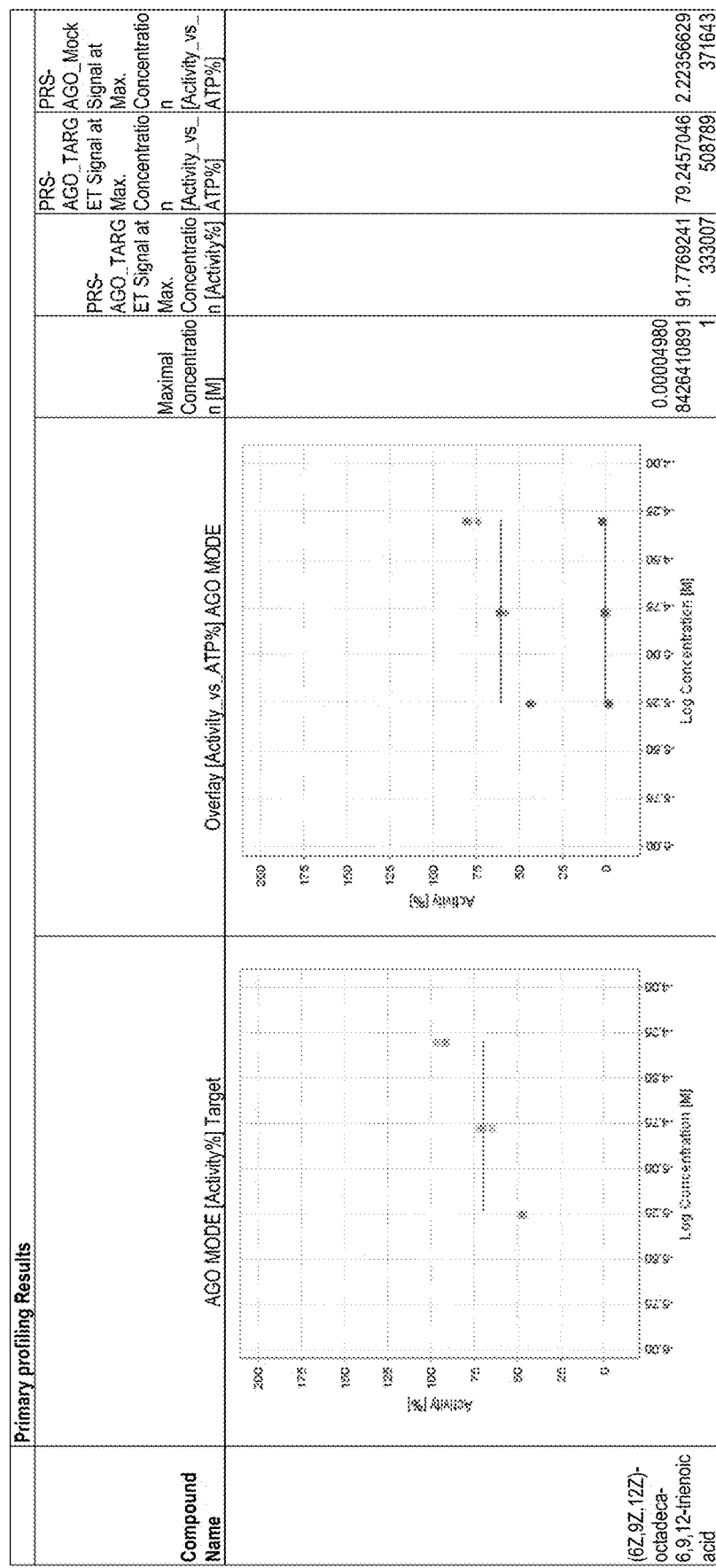
Figure 1R:
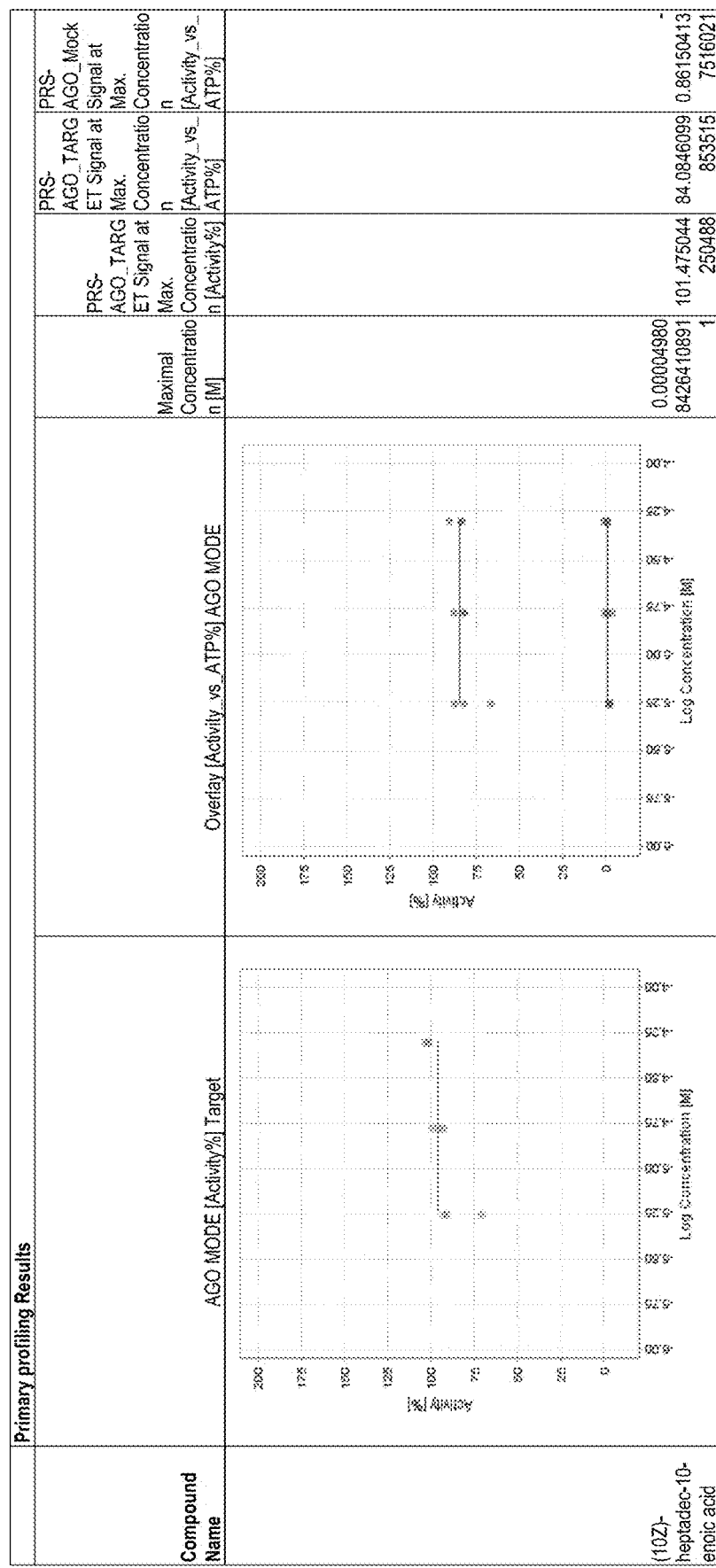
Figure 1S:
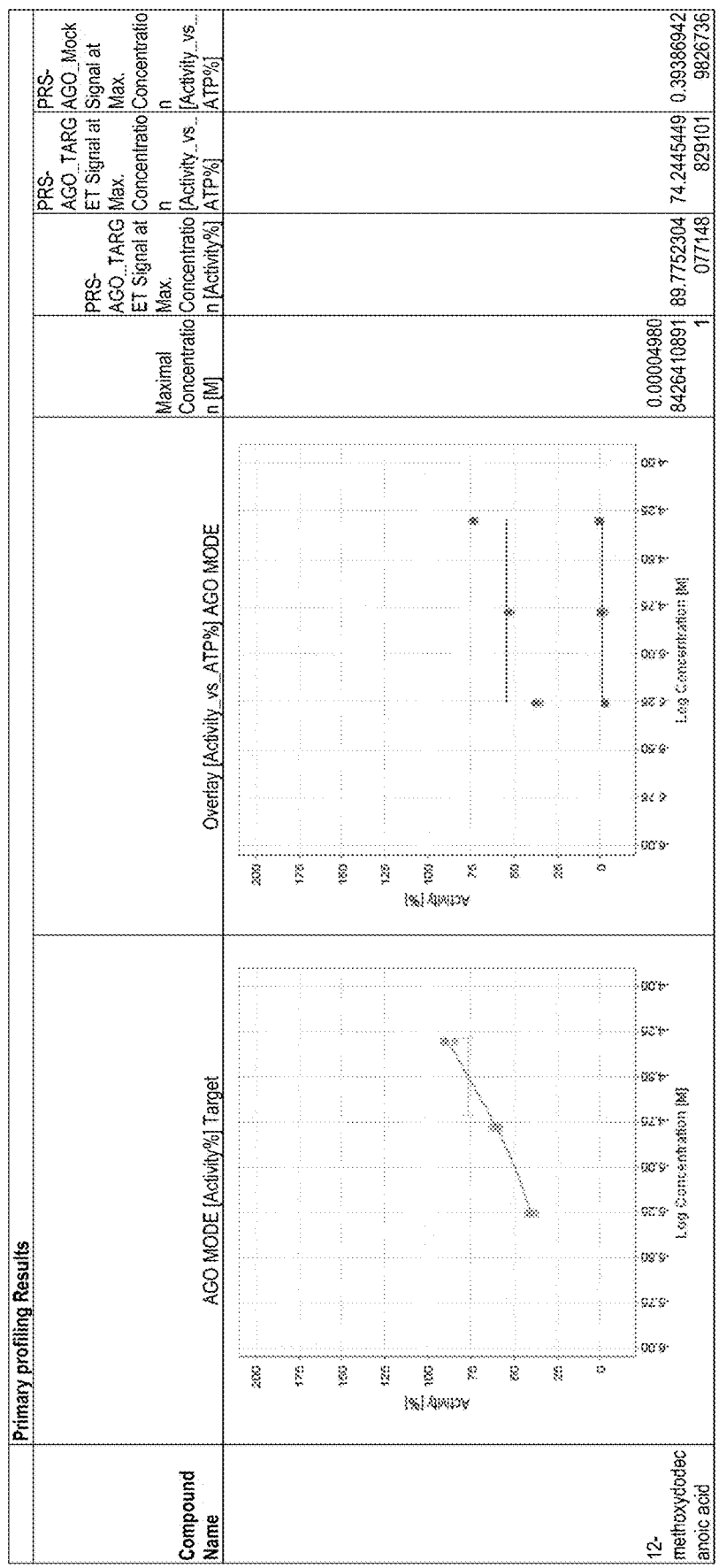
Figure 1T:
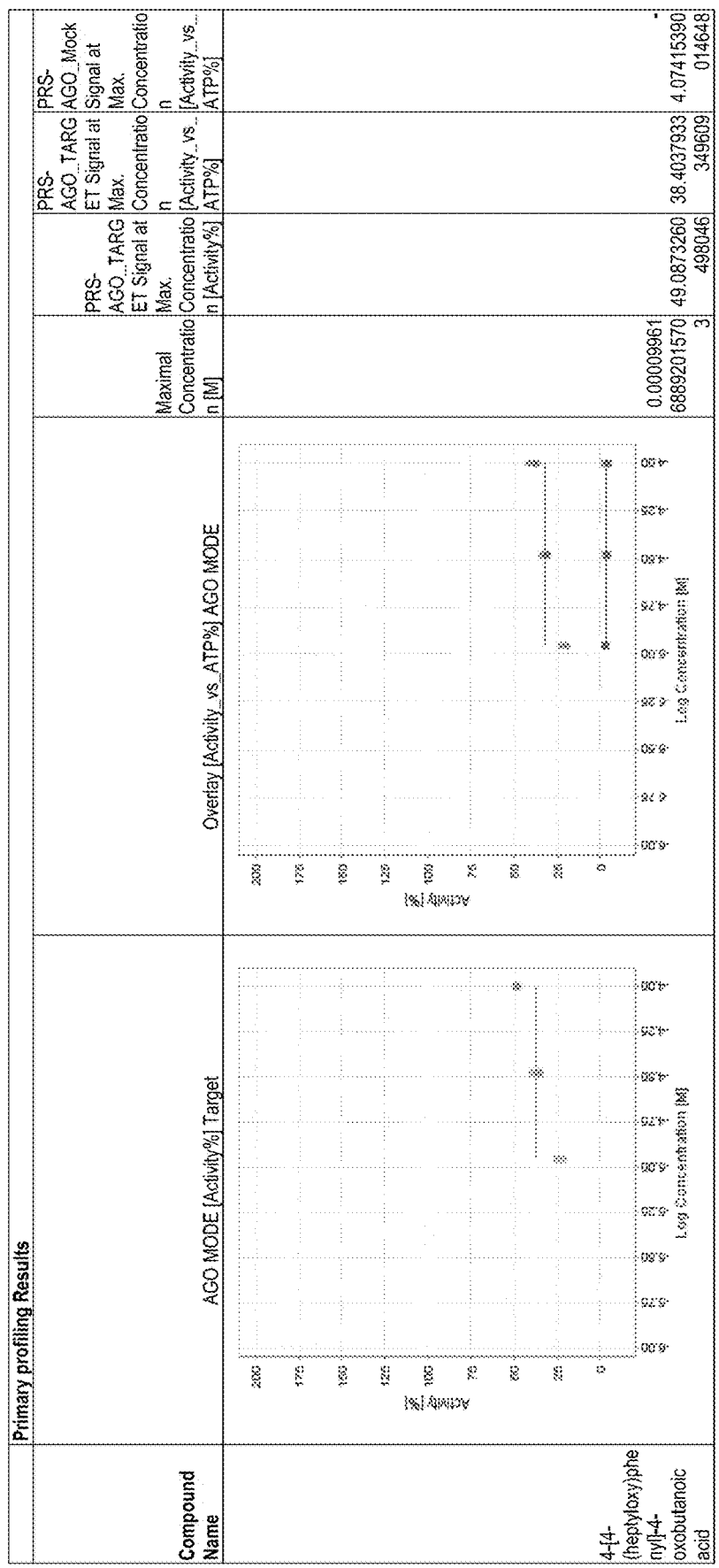
Figure 1U:
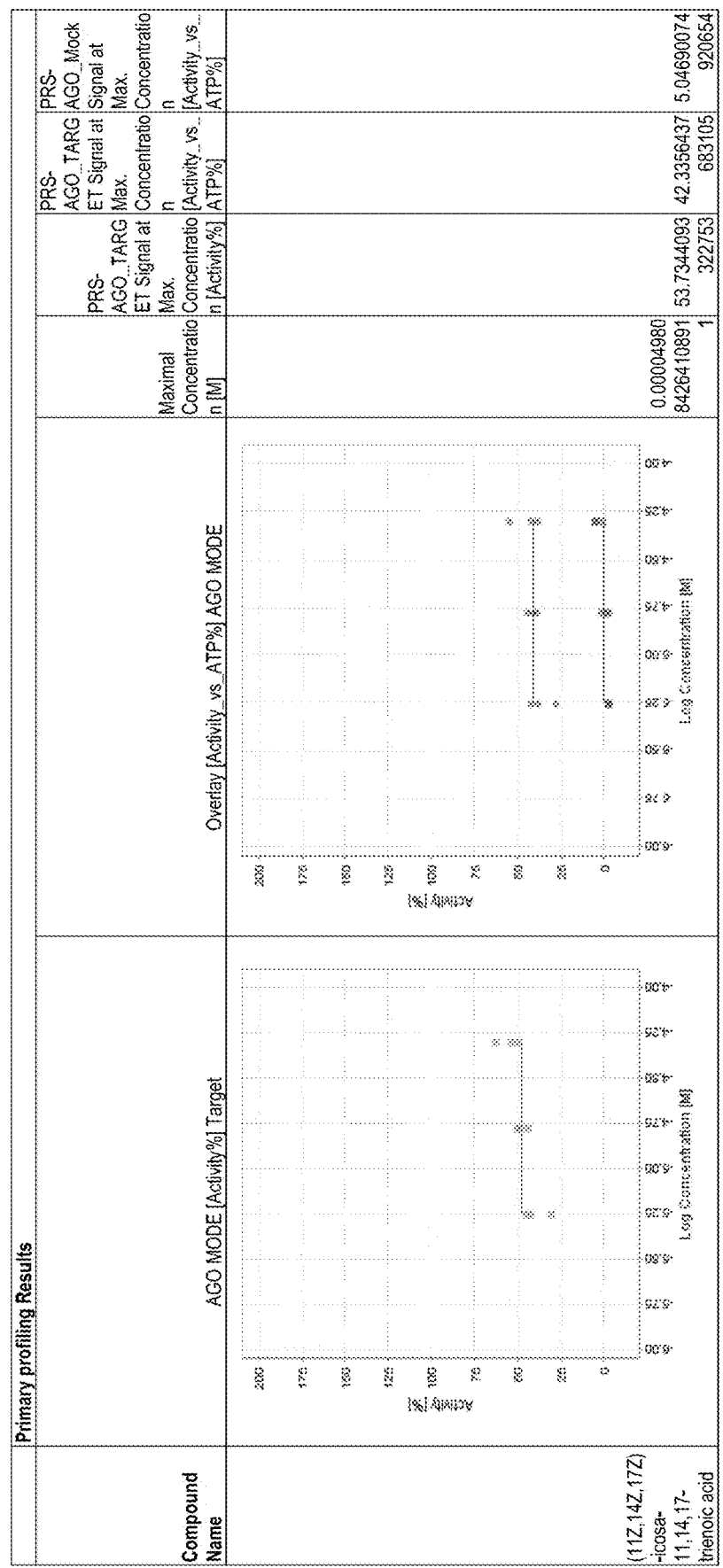
Figure 1V:
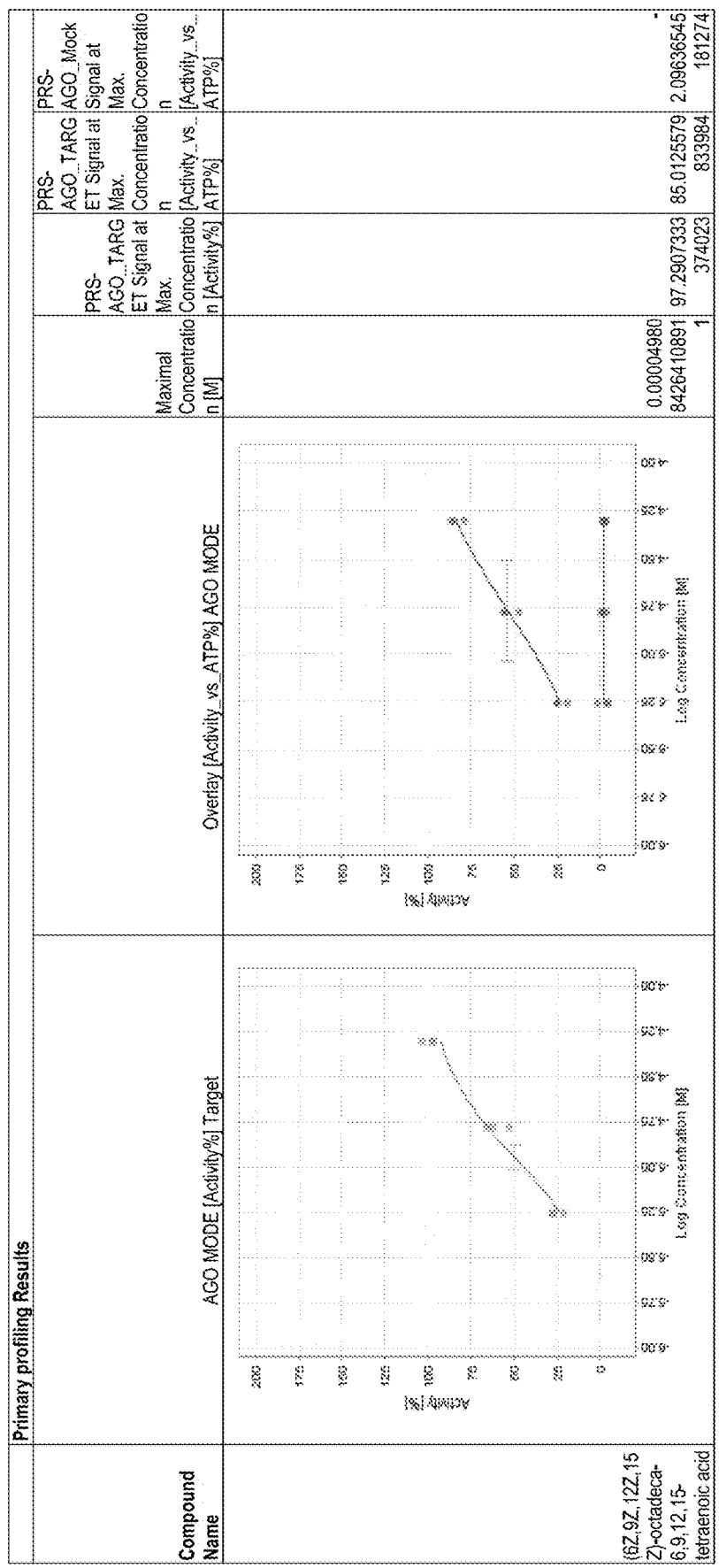
Figure 1W:
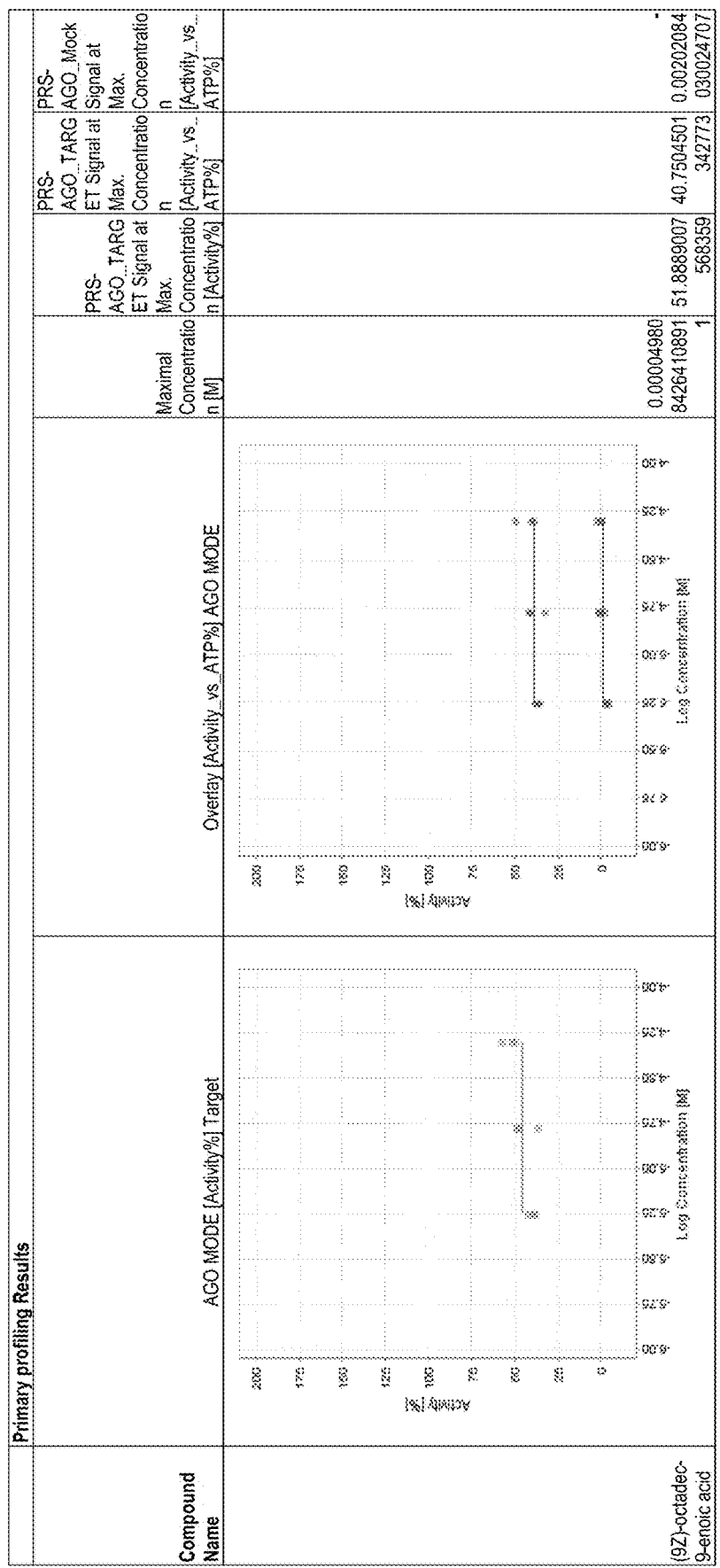
Figure 1X:
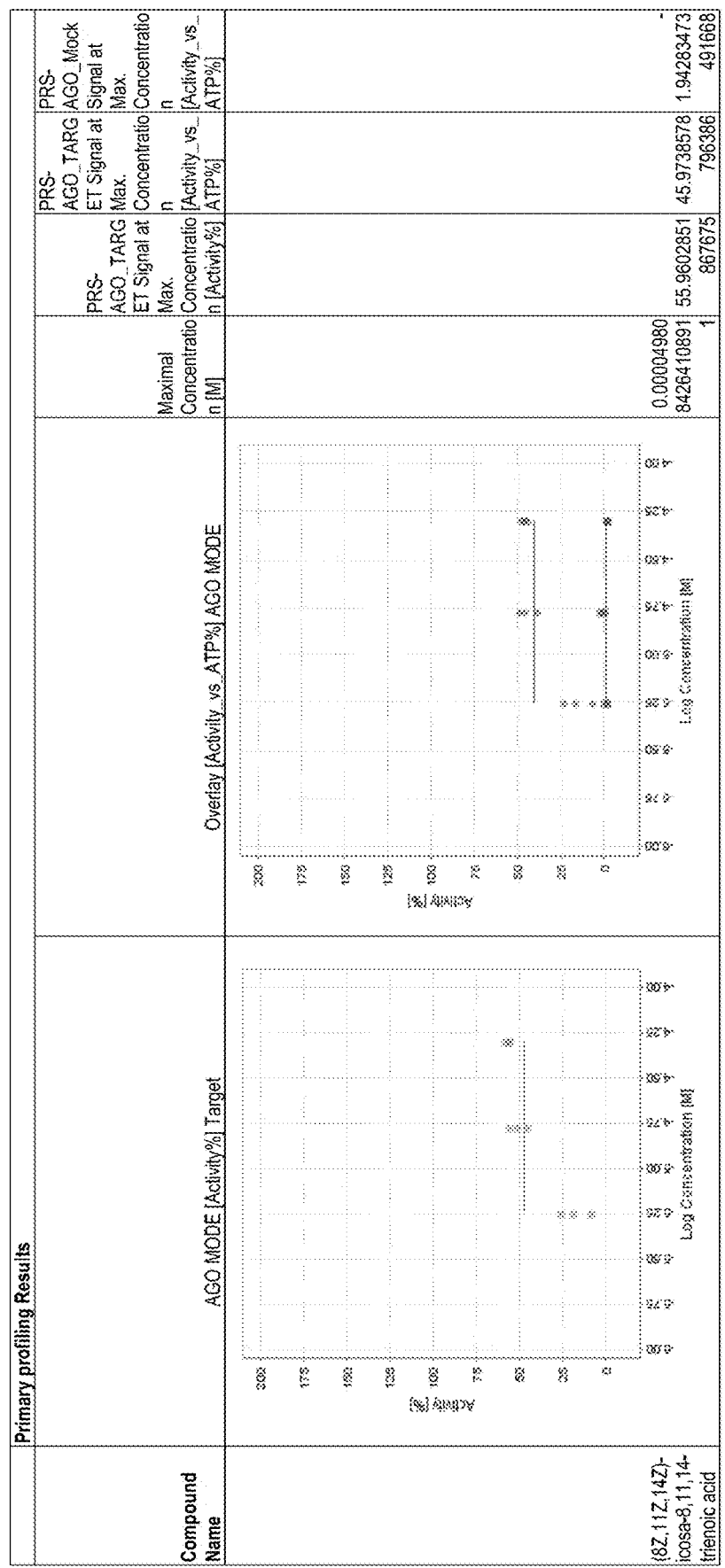
Figure 1Y:
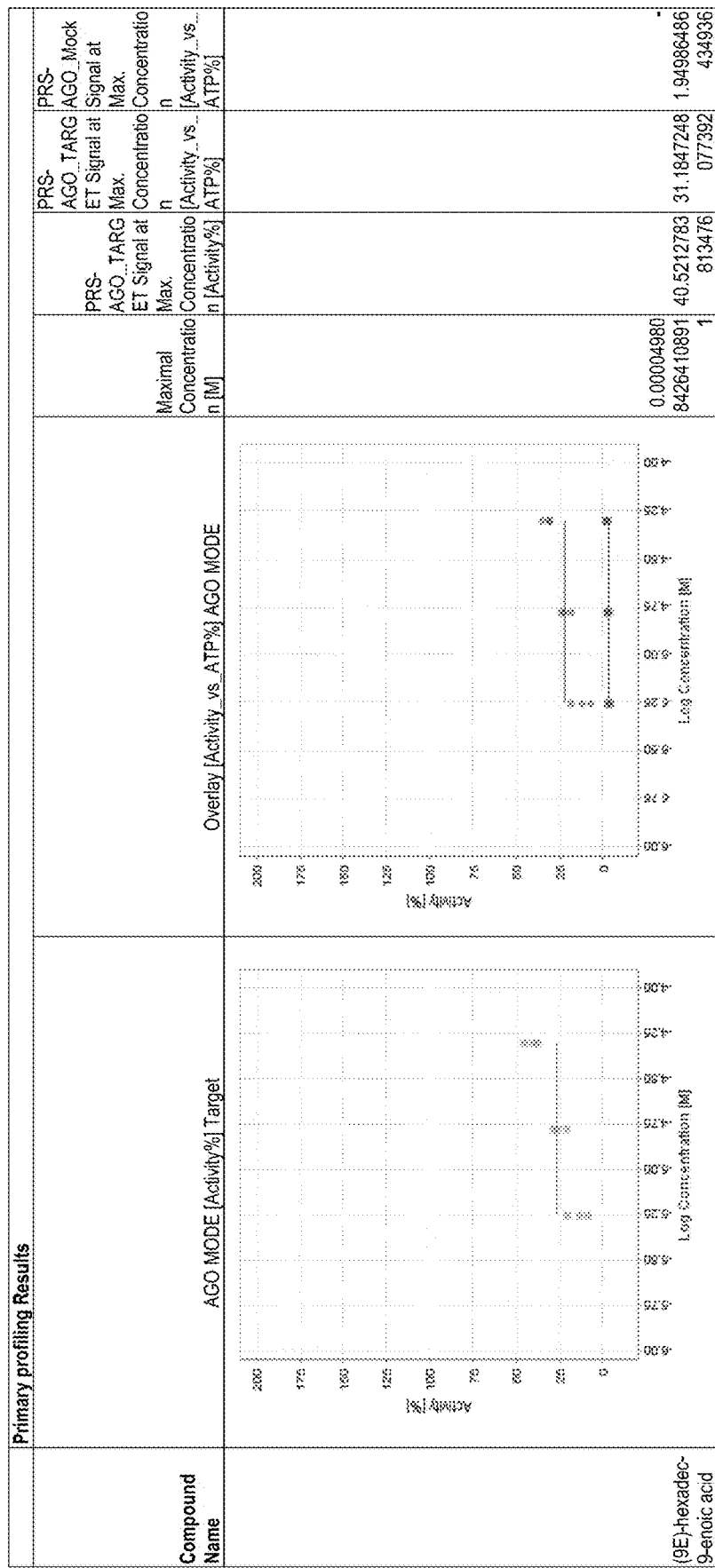
Figure 1Z:
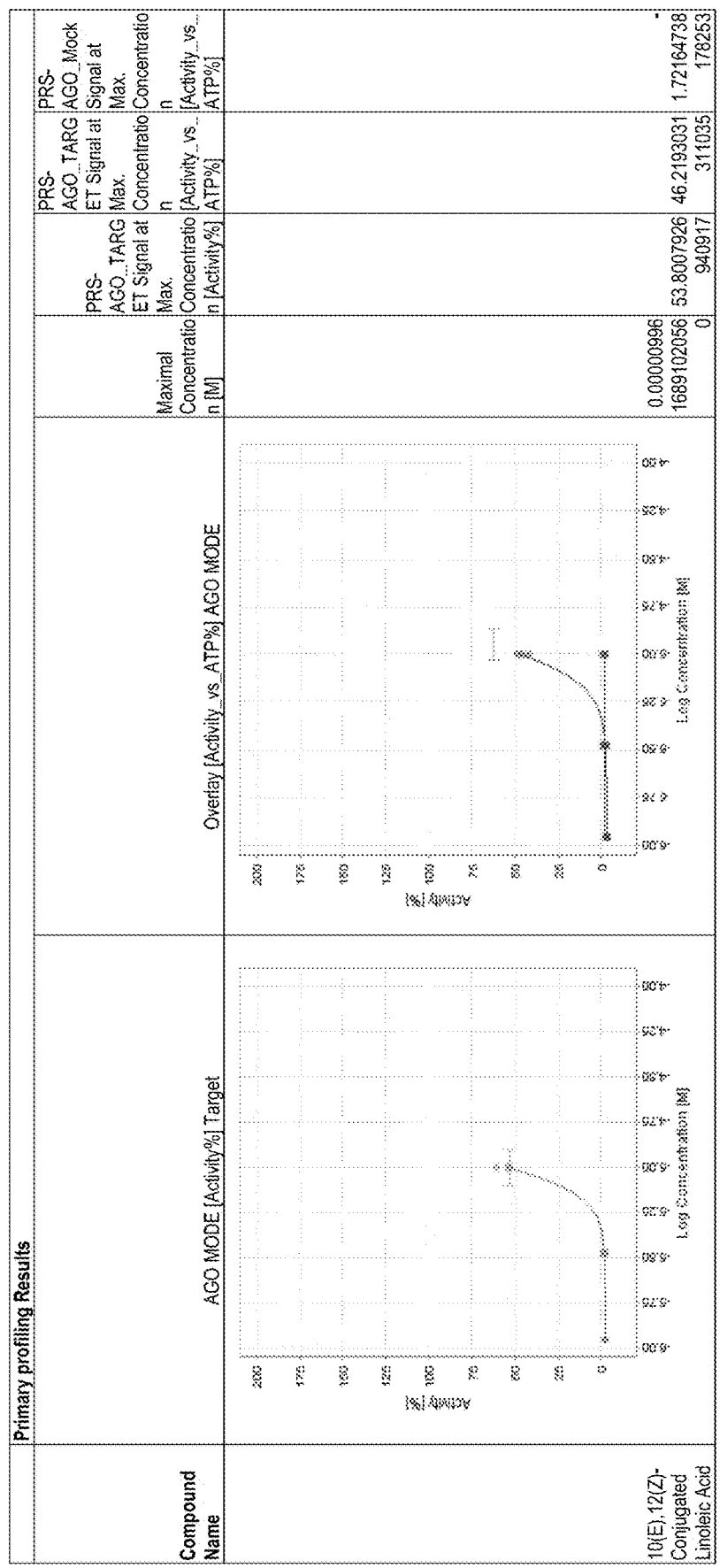
Figure 1A:
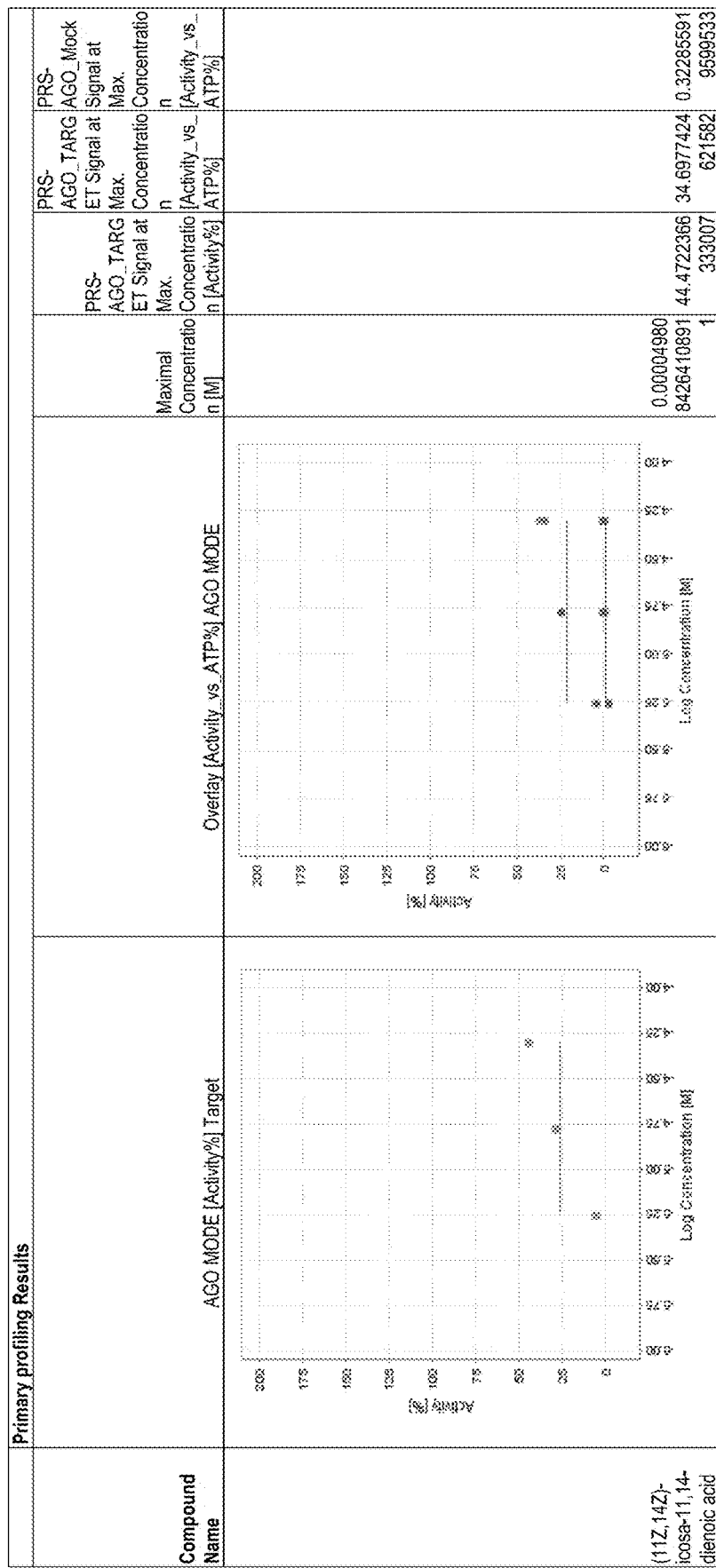
Figure 1A:
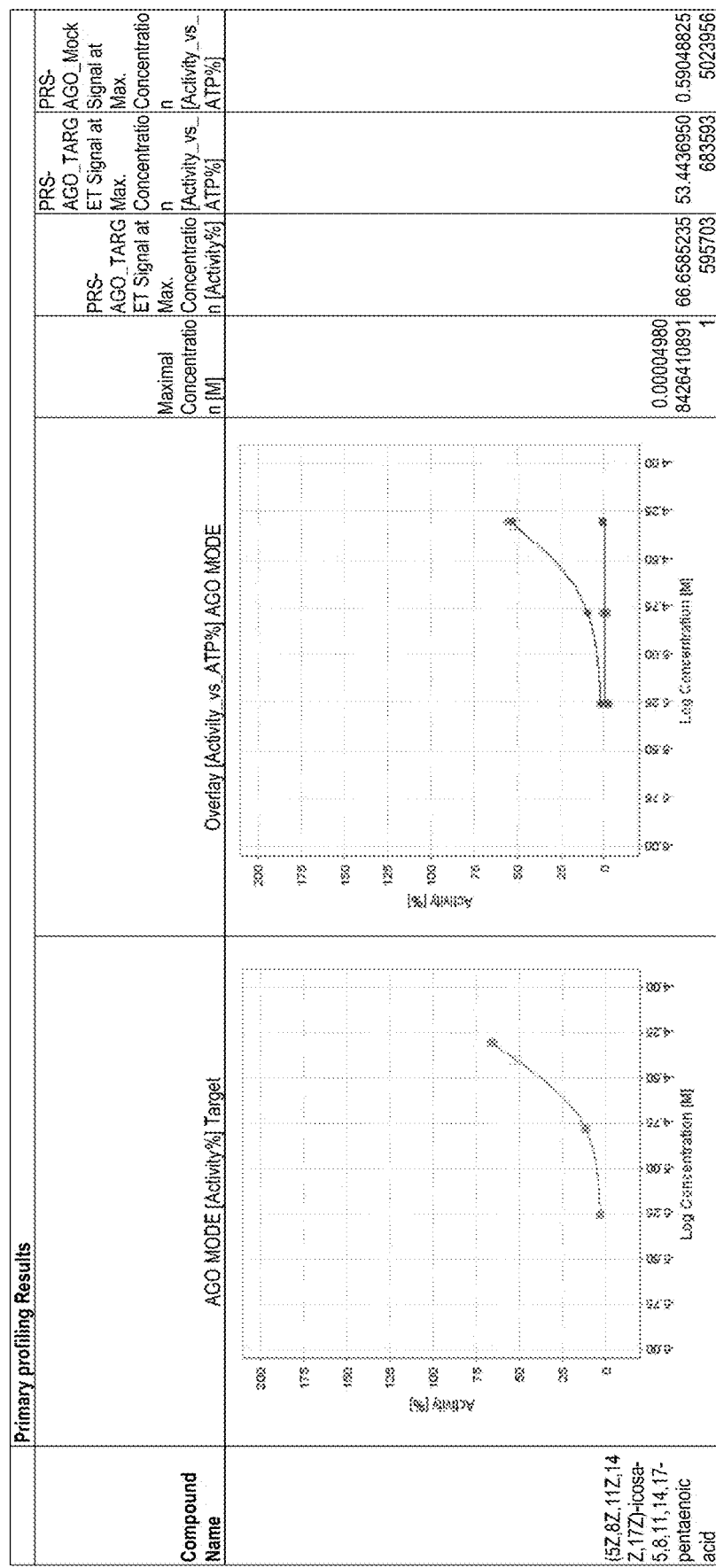
Figure 1A:
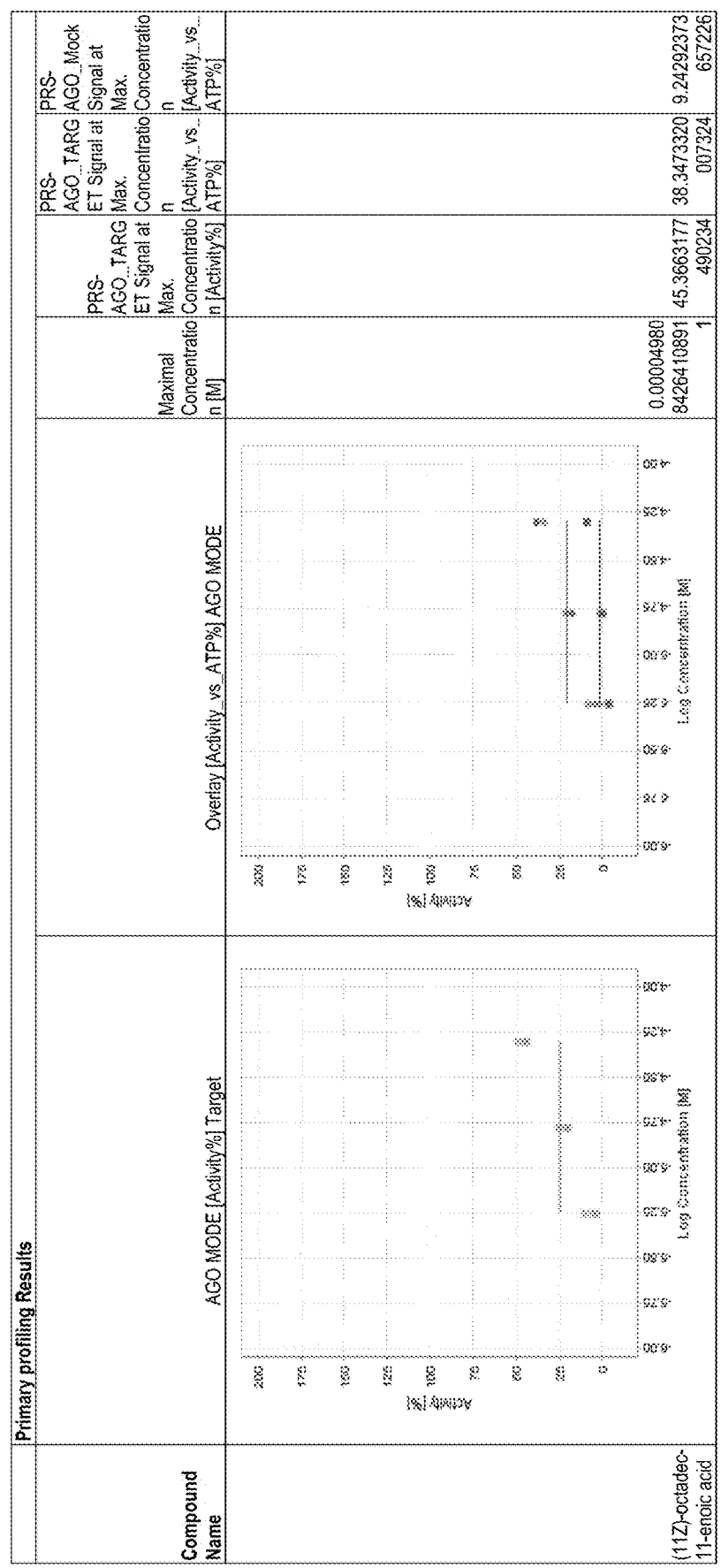
Figure 1A:
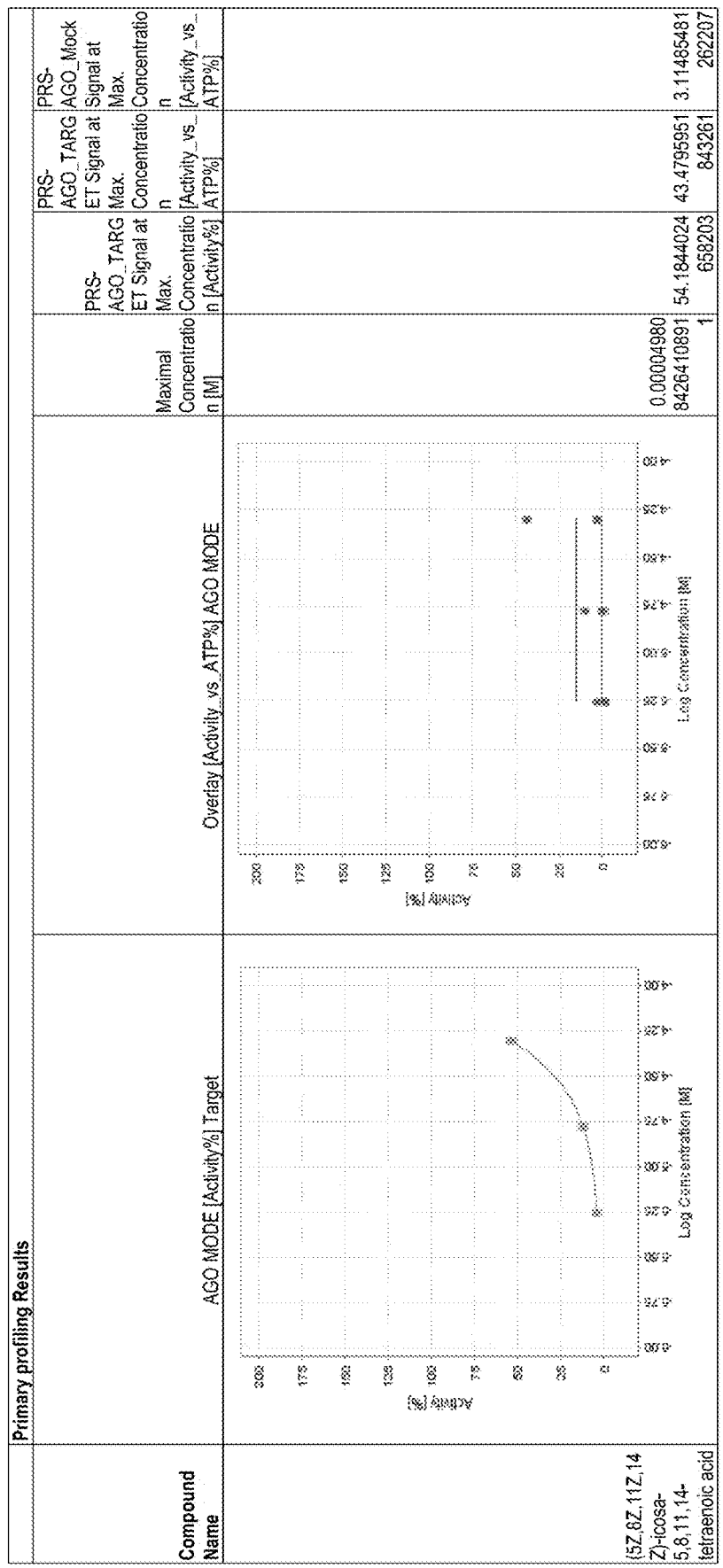
Figure 1A:
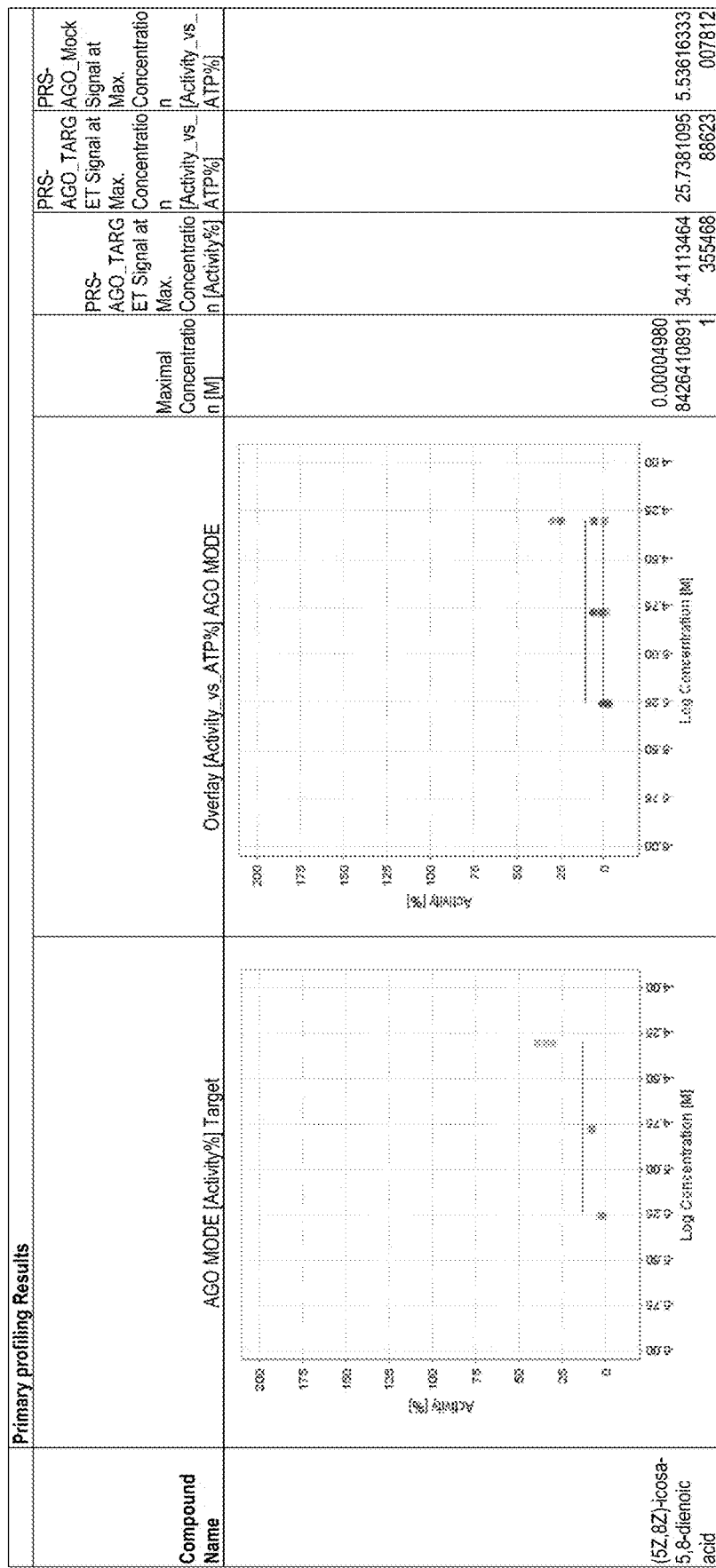
Figure 1A:
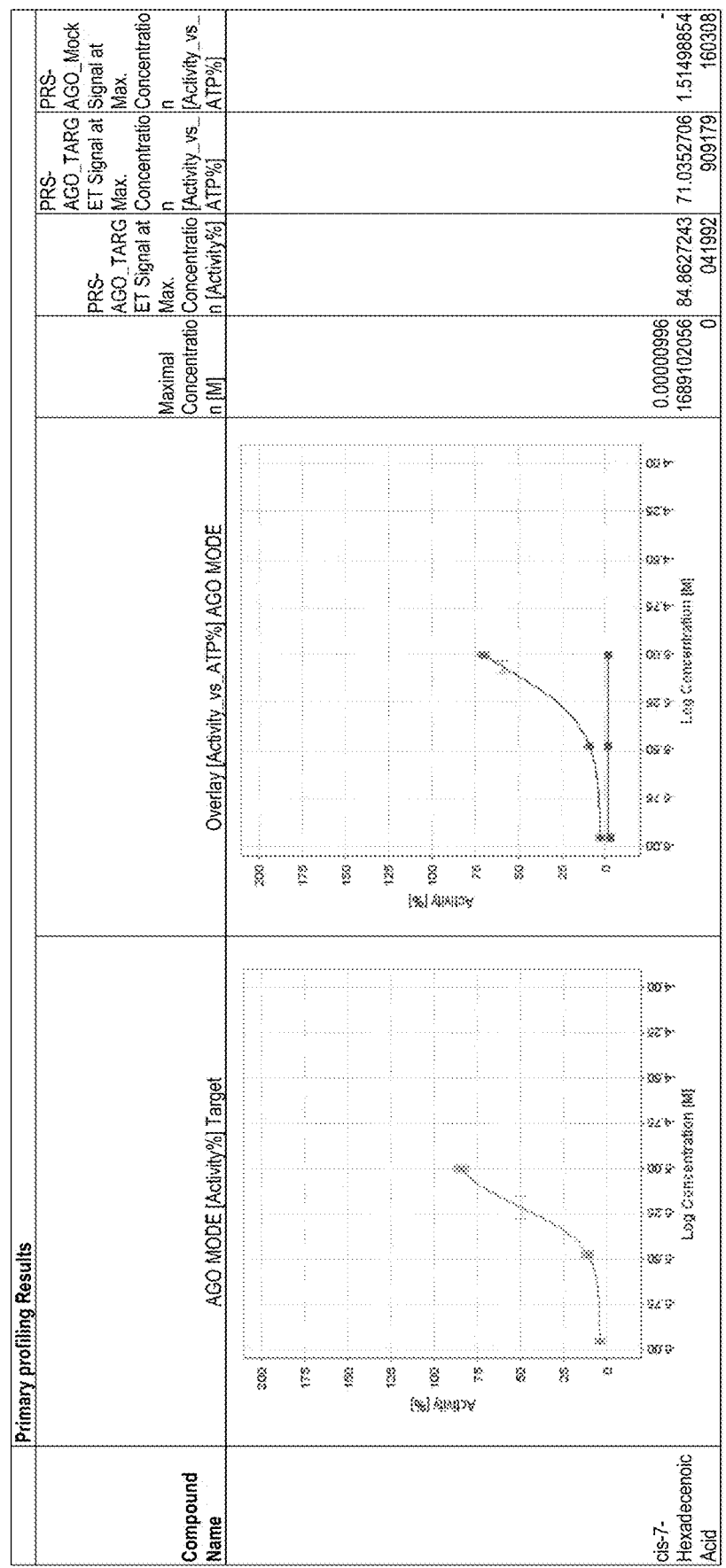
Figure 1A:
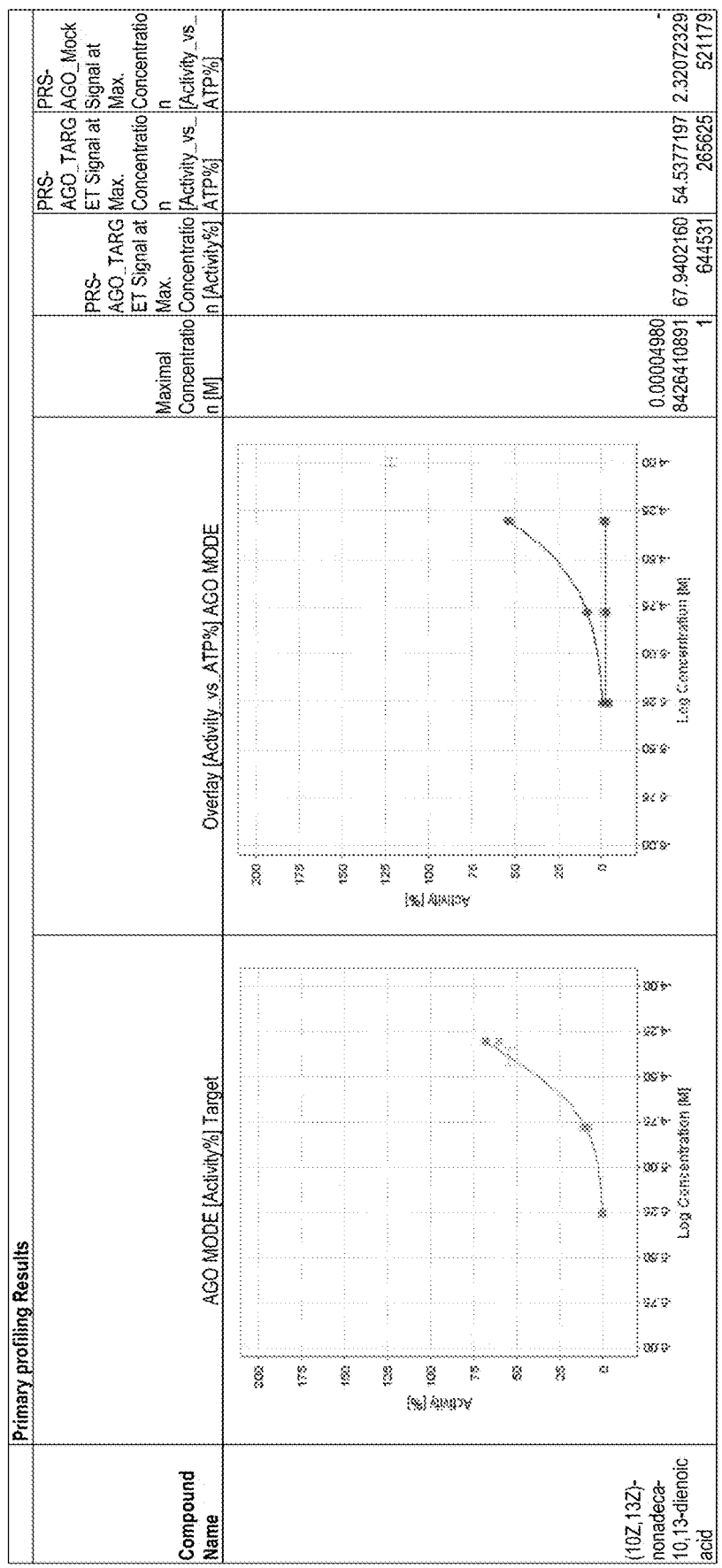
Figure 1A:
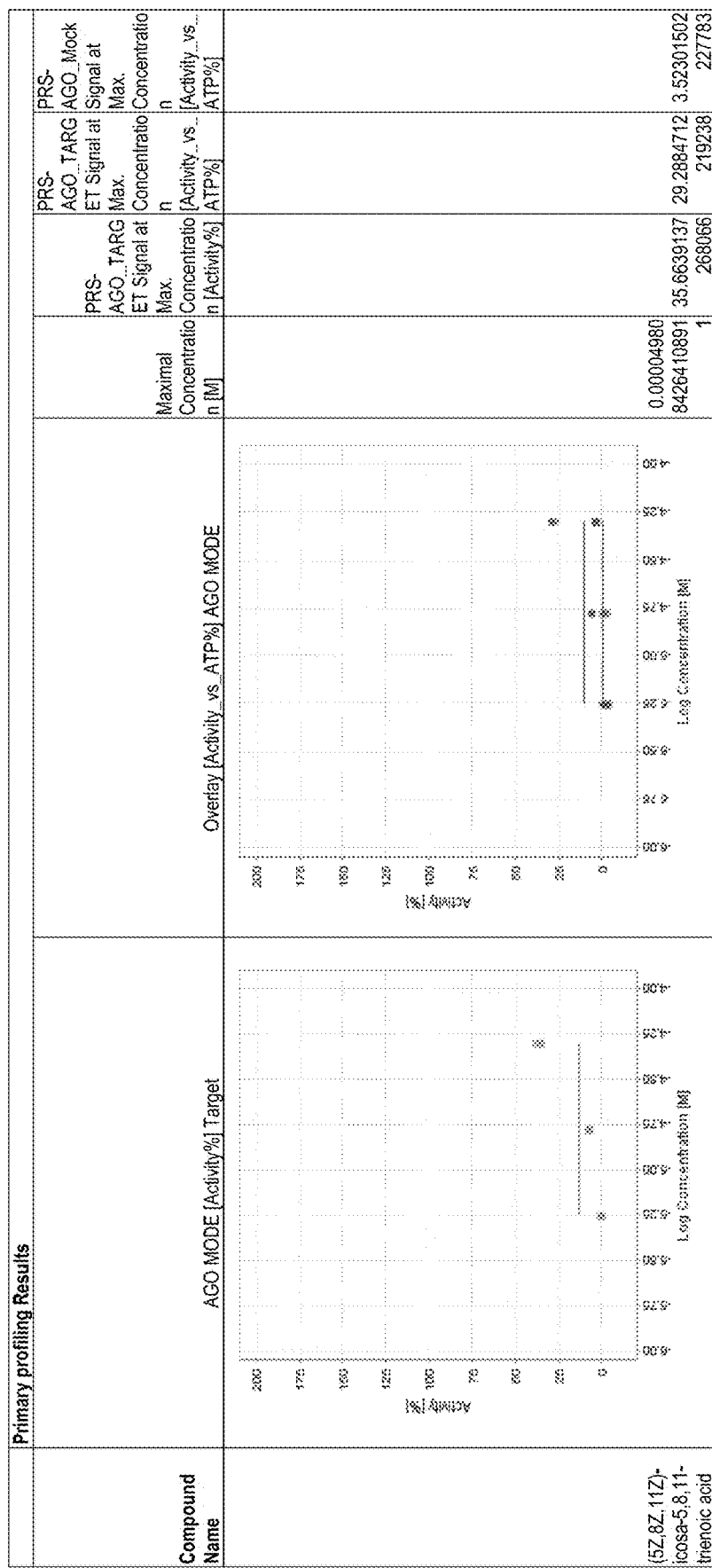

To date, there remains a need for a flavor modifier that can increase and/or enhance the palatability of various cat pet food products. The present application relates to flavor compositions that include at least one compound. The flavor compositions can be used to increase the palatability and/or enhance or modify the taste of various pet food products such as a nutritionally-complete pet food. The flavor compositions can further include combinations of compounds, including amino acids, nucleotides, and furanones (as described in International Application Nos. PCT/EP2013/072788 filed Oct. 31, 2013, PCT/EP2013/072789 filed Oct. 31, 2013, PCT/EP2013/072790 filed Oct. 31, 2013, and PCT/EP2013/072794 filed Oct. 31, 2013, each of which is incorporated by reference in its entirety), nucleotide derivatives (as described in International Application No. PCT/US15/65046 filed Dec. 10, 2015, which is incorporated by reference in its entirety), and/or transmembrane compounds (as described in International Application No. PCT/US15/65036 filed Dec. 10, 2015, which is incorporated by reference in its entirety) and can be added to pet food products in various delivery system formats.

1. Definitions

The terms used in this specification generally have their ordinary meanings in the art, within the context of this invention and in the specific context where each term is used. Certain terms are discussed below, or elsewhere in the specification, to provide additional guidance to the practitioner in describing the compositions and methods of the invention and how to make and use them.

As used herein, the use of the word "a" or "an" when used in conjunction with the term "comprising" in the claims and/or the specification may mean "one," but it is also consistent with the meaning of "one or more," "at least one," and "one or more than one." Still further, the terms "having," "including," "containing" and "comprising" are interchangeable and one of skill in the art is cognizant that these terms are open ended terms.

The term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value.

As used herein, "taste" refers to a sensation caused by activation or inhibition of receptor cells in a subject's taste buds. In certain embodiments, taste can be selected from the group consisting of sweet, sour, salt, bitter, kokumi and umami. In certain embodiments, a taste is elicited in a subject by a "tastant." In certain embodiments, a tastant is a synthetic tastant. In certain embodiments, the tastant is prepared from a natural source.

In certain embodiments, "taste" can include free fatty acid taste. See, e.g., Cartoni et al., J. of Neuroscience, 30(25): 8376-8382 (2010), the contents of which are incorporated herein by reference. In certain embodiments, free fatty acid taste is a sensation caused by activation or inhibition of receptor cells in a subject's taste buds, for example the receptor GPR120, and is separate than the texture and olfactory sensory perceptions of fatty foods, for example, foods with viscous, slippery, oily, mouth-coating or creamy textures.

As used herein, "taste profile" refers to a combination of tastes, such as, for example, one or more of a sweet, sour, salt, bitter, umami, kokumi and free fatty acid taste. In certain embodiments, a taste profile is produced by one or more tastant that is present in a composition at the same or different concentrations. In certain embodiments, a taste profile refers to the intensity of a taste or combination of tastes, for example, a sweet, sour, salt, bitter, umami, kokumi and free fatty acid taste, as detected by a subject or any assay known in the art. In certain embodiments, modifying, changing or varying the combination of tastants in a taste profile can change the sensory experience of a subject.

As used herein, "flavor" refers to one or more sensory stimuli, such as, for example, one or more of taste (gustatory), smell (olfactory), touch (tactile) and temperature (thermal) stimuli. In certain non-limiting embodiments, the sensory experience of a subject exposed to a flavor can be classified as a characteristic experience for the particular flavor. For example, a flavor can be identified by the subject as being, but not limited to, a floral, citrus, berry, nutty, caramel, chocolate, peppery, smoky, cheesy, meaty, etc., flavor. As used herein, a flavor composition can be selected from a liquid, solution, dry powder, spray, paste, suspension and any combination thereof. The flavor can be a natural composition, an artificial composition, a nature identical, or any combination thereof.

As used interchangeably herein, "aroma" and "smell" refer to an olfactory response to a stimulus. For example, and not by way of limitation, an aroma can be produced by aromatic substances that are perceived by the odor receptors of the olfactory system.

As used herein, "flavor profile" refers to a combination of sensory stimuli, for example, tastes, such as sweet, sour, bitter, salty, umami, kokumi and free fatty acid tastes, and/or olfactory, tactile and/or thermal stimuli. In certain embodiments, the flavor profile comprises one or more flavors which contribute to the sensory experience of a subject. In certain embodiments, modifying, changing or varying the combination of stimuli in a flavor profile can change the sensory experience of a subject.

As used herein "admixing," for example, "admixing the flavor composition or combinations thereof of the present application with a food product," refers to the process where the flavor composition, or individual components of the flavor composition, is mixed with or added to the completed product or mixed with some or all of the components of the product during product formation or some combination of these steps. When used in the context of admixing, the term "product" refers to the product or any of its components. This admixing step can include a process selected from the step of adding the flavor composition to the product, spraying the flavor composition on the product, coating the flavor composition on the product, suspending the product in the flavor composition, painting the flavor composition on the product, pasting the flavor composition on the product, encapsulating the product with the flavor composition, mixing the flavor composition with the product and any combination thereof. The flavor composition can be a liquid, emulsion, dry powder, spray, paste, suspension and any combination thereof.

In certain embodiments, the compounds of a flavor composition can be generated during the processing of a pet food product, e.g., sterilization, retorting and/or extrusion, from precursor compounds present in the pet food product. In a non-limiting example, the composition can be a free fatty acid that is liberated from one or more triglycerides during the processing of a pet food product. In certain embodiments, the free fatty acid is produced during thermal, acid and/or enzymatic treatment of the triglycerides. In certain embodiments, the triglycerides are present in meat (e.g., chicken, beef, pork, fish, and/or tallow) and/or vegetable (e.g., oils such as vegetable and sunflower oil) sources that are processed to produce the pet food.

As used herein, "ppm" means parts-per-million and is a weight relative parameter. A part-per-million is a microgram per gram, such that a component that is present at 10 ppm is present at 10 micrograms of the specific component per 1 gram of the aggregate mixture.

As used herein, "palatability" can refer to the overall willingness of an animal to eat a certain food product. Increasing the "palatability" of a pet food product can lead to an increase in the enjoyment and acceptance of the pet food by the companion animal to ensure the animal eats a "healthy amount" of the pet food. The term "healthy amount" of a pet food as used herein refers to an amount that enables the companion animal to maintain or achieve an intake contributing to its overall general health in terms of micronutrients, macronutrients and calories, such as set out in the "Mars Petcare Essential Nutrient Standards." In certain embodiments, "palatability" can mean a relative preference of an animal for one food product over another. For example, when an animal shows a preference for one of two or more food products, the preferred food product is more "palatable," and has "enhanced palatability." In certain embodiments, the relative palatability of one food product compared to one or more other food products can be determined, for example, in side-by-side, free-choice comparisons, e.g., by relative consumption of the food products, or other appropriate measures of preference indicative of palatability. Palatability can be determined by a standard testing protocol in which the animal has equal access to both food products such as a test called "two-bowl test" or "versus test." Such preference can arise from any of the animal's senses, but can be related to, inter alia, taste, aftertaste, smell, mouth feel and/or texture.

The term "pet food" or "pet food product" means a product or composition that is intended for consumption by a companion animal, such as cats, dogs, guinea pigs, rabbits, birds and horses. For example, but not by way of limitation, the companion animal can be a "domestic" cat such as *Felis domesticus*. In certain embodiments, the companion animal can be a "domestic" dog, e.g., *Canis lupus familiaris*. A "pet food" or "pet food product" includes any food, feed, snack, food supplement, liquid, beverage, treat, toy (chewable and/or consumable toys), and meal substitute or meal replacement.

As used herein "nutritionally-complete" refers to pet food product that contains all known required nutrients for the intended recipient of the pet food product, in appropriate amounts and proportions based, for example, on recommendations of recognized or competent authorities in the field of companion animal nutrition. Such foods are therefore capable of serving as a sole source of dietary intake to maintain life, without the addition of supplemental nutritional sources.

As used herein "flavor composition" refers to at least one compound or biologically acceptable salt thereof that modulates, including enhancing, multiplying, potentiating, decreasing, suppressing, or inducing, the tastes, smells, flavors and/or textures of a natural or synthetic tastant, flavoring agent, taste profile, flavor profile and/or texture profile in an animal or a human. In certain embodiments, the flavor composition comprises a combination of compounds or biologically acceptable salts thereof. In certain embodiments, the flavor composition includes one or more excipients.

As used herein, the terms "modulates" or "modifies" refers an increase or decrease in the amount, quality or effect of a particular activity of a receptor and/or an increase or decrease in the expression, activity or function of a receptor. "Modulators," as used herein, refer to any inhibitory or activating compounds identified using in silico, in vitro and/or in vivo assays for, e.g., agonists, antagonists and their homologs, including fragments, variants and mimetics.

"Inhibitors" or "antagonists," as used herein, refer to modulating compounds that reduce, decrease, block, prevent, delay activation, inactivate, desensitize or downregulate biological activity and/or expression of receptors or pathway of interest.

"Inducers," "activators" or "agonists," as used herein, refer to modulating compounds that increase, induce, stimulate, open, activate, facilitate, enhance activation, sensitize or upregulate a receptor or pathway of interest.

As used herein, the terms "vector" and "expression vector" refer to DNA molecules that are either linear or circular, into which another DNA sequence fragment of appropriate size can be integrated. Such DNA fragment(s) can include additional segments that provide for transcription of a gene encoded by the DNA sequence fragment. The additional segments can include and are not limited to: promoters, transcription terminators, enhancers, internal ribosome entry sites, untranslated regions, polyadenylation signals, selectable markers, origins of replication and such like. Expression vectors are often derived from plasmids, cosmids, viral vectors and yeast artificial chromosomes. Vectors are often recombinant molecules containing DNA sequences from several sources.

The term "operably linked," when applied to DNA sequences, e.g., in an expression vector, indicates that the sequences are arranged so that they function cooperatively in order to achieve their intended purposes, i.e., a promoter sequence allows for initiation of transcription that proceeds through a linked coding sequence as far as the termination signal.

The term "nucleic acid molecule" and "nucleotide sequence," as used herein, refers to a single or double stranded covalently-linked sequence of nucleotides in which the 3' and 5' ends on each nucleotide are joined by phosphodiester bonds. The nucleic acid molecule can include deoxyribonucleotide bases or ribonucleotide bases, and can be manufactured synthetically in vitro or isolated from natural sources.

The terms "polypeptide," "peptide," "amino acid sequence" and "protein," used interchangeably herein, refer to a molecule formed from the linking of at least two amino acids. The link between one amino acid residue and the next is an amide bond and is sometimes referred to as a peptide bond. A polypeptide can be obtained by a suitable method known in the art, including isolation from natural sources, expression in a recombinant expression system, chemical synthesis or enzymatic synthesis. The terms can apply to amino acid polymers in which one or more amino acid residue is an artificial chemical mimetic of a corresponding naturally occurring amino acid, as well as to naturally occurring amino acid polymers and non-naturally occurring amino acid polymers.

The term "amino acid," as used herein, refers to naturally occurring and synthetic amino acids, as well as amino acid analogs and amino acid mimetics that function in a manner similar to the naturally occurring amino acids. Naturally occurring amino acids are those encoded by the genetic code, as well as those amino acids that are later modified, e.g., hydroxyproline, gamma-carboxyglutamate and O-phosphoserine. Amino acid analogs and derivatives can refer to compounds that have the same basic chemical structure as a naturally occurring amino acid, i.e., a carbon that is bound to a hydrogen, a carboxyl group, an amino group and an R group, e.g., homoserine, norleucine, methionine sulfoxide and methionine methyl sulfonium. Such analogs can have modified R groups (e.g., norleucine) or modified peptide backbones, but retain the same basic chemical structure as a naturally occurring amino acid. Amino acid mimetics means chemical compounds that have a structure that is different from the general chemical structure of an amino acid, but that functions in a manner similar to a naturally occurring amino acid.

The terms "isolated" or "purified," used interchangeably herein, refers to a nucleic acid, a polypeptide, or other biological moiety that is removed from components with which it is naturally associated. The term "isolated" can refer to a polypeptide that is separate and discrete from the whole organism with which the molecule is found in nature or is present in the substantial absence of other biological macromolecules of the same type. The term "isolated" with respect to a polynucleotide can refer to a nucleic acid molecule devoid, in whole or part, of sequences normally associated with it in nature; or a sequence, as it exists in nature, but having heterologous sequences in association therewith; or a molecule disassociated from the chromosome.

As used herein, the term "recombinant" can be used to describe a nucleic acid molecule and refers to a polynucleotide of genomic, RNA, DNA, cDNA, viral, semisynthetic or synthetic origin which, by virtue of its origin or manipulation is not associated with all or a portion of polynucleotide with which it is associated in nature.

The term "fusion," as used herein, refers to joining of different peptide or protein segments by genetic or chemical methods wherein the joined ends of peptide or protein segments may be directly adjacent to each other or may be separated by linker or spacer moieties such as amino acid residues or other linking groups.

2. Fatty Acid Receptor

The presently disclosed subject matter provides fatty acid receptors for use in the disclosed methods. The fatty acid receptors of the present disclosure can include mammalian fatty acid receptors such as, but not limited to, feline, canine and human fatty acid receptors.

In certain non-limiting embodiments, the fatty acid receptor of the present disclosure is encoded by a nucleic acid as described by International Publication No. WO 2014/199114, published Dec. 18, 2014, which is incorporated by reference in its entirety herein. In certain non-limiting embodiments, the fatty acid receptor of the present disclosure comprises an amino acid sequence as described by International Publication No. WO 2014/199114.

In certain non-limiting embodiments, the fatty acid receptor comprises a feline, canine or human fatty acid receptor nucleotide sequence as described by International Publication No. WO 2014/199114, published Dec. 18, 2014.

In certain non-limiting embodiments, the fatty acid receptor comprises a feline, canine or human fatty acid receptor amino acid sequence as described by International Publication No. WO 2014/199114, published Dec. 18, 2014.

In certain embodiments, the fatty acid receptor for use in the presently disclosed subject matter can include a receptor comprising a nucleotide sequence having at least 85, at least 90%, at least 91%, at least 92%, at least 93%, at least 94%, at least 95%, at least 96%, at least 97%, at least 98% or at least 99% identity to a feline, canine or human fatty acid receptor nucleotide sequence.

In certain embodiments, the fatty acid receptor for use in the presently disclosed subject matter can include a receptor comprising an amino acid sequence having at least 85%, at least 90%, at least 91%, at least 92%, at least 93%, at least 94%, at least 95%, at least 96%, at least 97%, at least 98% or at least 99% identity to a feline, canine or human fatty acid receptor amino acid sequence.

In certain embodiments, the disclosed subject matter provides for the use of an isolated or purified fatty acid receptor and/or variants and fragments thereof. The disclosed subject matter also encompasses the use of sequence variants. In certain embodiments, variation can occur in either or both the coding and non-coding regions of a nucleotide sequence of a fatty acid receptor. Variants can include a substantially homologous protein encoded by the same genetic locus in an organism, i.e., an allelic variant. Variants also encompass proteins derived from other genetic loci in an organism, e.g., feline, but having substantial homology to the fatty acid receptor, i.e., a homolog. Variants can also include proteins substantially homologous to the fatty acid receptor but derived from another organism, i.e., an ortholog. Variants also include proteins that are substantially homologous to the fatty acid receptor that are produced by chemical synthesis. Variants also include proteins that are substantially homologous to the fatty acid receptor that are produced by recombinant methods.

The disclosed subject matter also provides for fusion proteins that comprise a fatty acid receptor, or fragment thereof. In certain embodiments, a fusion protein of the present disclosure can include a detectable marker, a functional group such as a carrier, a label, a stabilizing sequence or a mechanism by which fatty acid receptor agonist binding can be detected. Non-limiting embodiments of a label include a FLAG tag, a His tag, a MYC tag, a maltose binding protein and others known in the art. The presently disclosed subject matter also provides nucleic acids encoding such fusion proteins, vectors containing fusion protein-encoding nucleic acids and host cells comprising such nucleic acids or vectors. In certain embodiments, fusions can be made at the amino terminus (N-terminus) of a fatty acid receptor or at the carboxy terminus (C-terminus) of a fatty acid receptor.

In certain embodiments, the fatty acid receptors disclosed herein can contain additional amino acids at the N-terminus and/or at the C-terminus end of the sequences, e.g., when used in the methods of the disclosed subject matter. In certain embodiments, the additional amino acids can assist with immobilizing the polypeptide for screening purposes, or allow the polypeptide to be part of a fusion protein, as disclosed above, for ease of detection of biological activity.

3. Fatty Acid Receptor Binding Compounds

The present disclosure relates to flavor compositions comprising at least one compound that can modulate the activity of a fatty acid receptor, for example, a GPR120 receptor. In certain embodiments, the compositions comprise a free fatty acid. The compounds disclosed herein were identified through an in vitro assay wherein the ability of the compounds to activate a feline GPR120 receptor (fGPR120) expressed by cells in culture was determined, and/or an in silico assay, wherein the compounds' ability to bind to fGPR120 was determined in silico. The flavor compositions can be used to enhance or modify the palatability, taste or flavor of pet food products. The flavor compositions can include combinations of compounds, for example, combinations of one or more compounds and/or one or more amino acids and/or one or more nucleotides and/or one or more furanones as described herein and in International Application Nos. PCT/EP2013/072788 filed Oct. 31, 2013, PCT/EP2013/072789 filed Oct. 31, 2013, PCT/EP2013/

072790 filed Oct. 31, 2013, PCT/EP2013/072794 filed Oct. 31, 2013, each of which is incorporated by reference herein in its entirety; and/or one or more nucleotide derivatives as described herein and in International Application No. PCT/US15/65046 filed Dec. 10, 2015, which is incorporated by reference herein in its entirety; and/or one or more transmembrane compounds, as described herein and in International Application No. PCT/US15/65036 filed Dec. 10, 2015, which is incorporated by reference herein in its entirety, and can be added to pet food product compositions in various delivery system formats.

In certain embodiments, at least one fatty acid receptor modulating compound is selected from the following compounds:

(5Z,8Z,11Z,14Z)-icosa-5,8,11,14-tetraenoic acid (also known as Arachidonic Acid);
(5Z,8Z)-icosa-5,8-dienoic acid;
4-[4-(heptyloxy)phenyl]-4-oxobutanoic acid;
(11Z)-octadec-11-enoic acid (also known as cis-Vaccenic acid);
(9E)-hexadec-9-enoic acid (also known as Palmitelaidic acid);
tridec-12-enoic acid (also known as 12-Tridecenoic acid);
S-Farnesyl Thioacetic Acid;
(10Z)-pentadec-10-enoic acid (also known as (10Z)-10-Pentadecenoic acid);
10(E),12(Z)-Conjugated Linoleic Acid (also known as (10Z,12Z)-10,12-Octadecadienoic acid);
(10Z,13Z)-nonadeca-10,13-dienoic acid;
(9Z,11E)-octadeca-9,11-dienoic acid;
cis-7-Hexadecenoic Acid;
dodecanoic acid (also known as Lauric acid);
(9Z)-tetradec-9-enoic acid (also known as Myristoleic acid);
(11Z,14Z,17Z)-icosa-11,14,17-trienoic acid (also known as Dihomo-α-linolenic acid (20:3(n-3)));
(6Z,9Z,12Z)-octadeca-6,9,12-trienoic acid (also known as γ-Linolenic acid);
(11Z,14Z)-icosa-11,14-dienoic acid (also known as Dihomolinoleic acid (20:2(n-6)));
(9Z)-hexadec-9-enoic acid (also known as palmitoleate, (Z)-Palmitoleic acid);
12-methoxydodecanoic acid;
(8Z,11Z,14Z)-icosa-8,11,14-trienoic acid;
(9Z,12Z)-octadeca-9,12-dienoic acid (also known as Linoleic acid);
(10Z)-heptadec-10-enoic acid;
Pinolenic Acid;
(9Z,12Z,15Z)-octadeca-9,12,15-trienoic acid (also known as α-Linolenic acid)l;
tridecanoic acid (also known as Tridecylic acid);
tetradecanoic acid (also known as Myristic acid);
(9Z)-octadec-9-enoic acid (also known as Oleic acid);
GW 9508 (also known as 4-[[(3-Phenoxyphenyl)methyl]amino]benzenepropanoic acid);
(5Z,8Z,11Z,14Z,17Z)-icosa-5,8,11,14,17-pentaenoic acid (also known as Eicosapentanoic acid);
3-(4-((4-fluoro-4'-methylbiphenyl-2-yl)methoxy)phenyl) propanoic acid (also known as TUG 891 and 4-[(4-Fluoro-4'-methyl[1,1'-biphenyl]-2-yl)methoxy]-benzenepropanoic acid);
(10E)-pentadec-10-enoic acid;
(9E)-tetradec-9-enoic acid (also known as Myristoleate);
(6Z,9Z,12Z,15Z)-octadeca-6,9,12,15-tetraenoic acid;
(5Z,8Z,11Z)-icosa-5,8,11-trienoic acid (also known as Mead acid); and
Dodecyl dihydrogen phosphate.

The present disclosure also provides for salts, stereoisomers and comestible forms of the compounds described herein.

In certain embodiments, the compound is a saturated fatty acid.

In certain embodiments, the compound is an unsaturated or polyunsaturated fatty acid.

In certain embodiments, the compound comprises the structure R—X, wherein

X is a carboxyl group or a bioisosteric replacement for a carboxylate such as, but not limited to, a phosphate; boronic acid; phosphoester; phosphodiester; phosphinic acid; sulfonamide; malonic acid; 2-sulfoacetic acid; sulfonic acid; hydroxamic acid; tetrazole; hydroxylurea; phosphoramide, $C(O)OCH_2CH(OH)OP(O)(OR_1)(OR_2)$ where $R_1$ and $R_2$ are each independently selected from H, lower alkyl ($C_1$-$C_6$), and Ph; or any other bioisosteric replacement for a carboxylate group known in the art; and R is a hydrocarbon chain having a carbon length of between about $C_2$ and about $C_{40}$, or between about $C_4$ and about $C_{35}$, or between about $C_6$ and about $C_{30}$, or between about $C_8$ and about $C_{28}$, or between about $C_{10}$ and about $C_{26}$, or between about $C_{12}$ and about $C_{24}$, or between about $C_{14}$ and about $C_{22}$, or between about $C_{16}$ and about $C_{20}$. In certain embodiments, the hydrocarbon chain has a carbon length of between about $C_{14}$ and about $C_{22}$.

In certain embodiments, the hydrocarbon chain may be unsubstituted or substituted with one or more of H, $CH_3$, $C_1$-$C_{20}$, COOH, $SO_3H$, CHO, $C(O)R_1$, $C=CR_1R_2$, $C=NOH$, $OP(O)(OR_1)(OR_2)$, $OR_1$, $SR_1$, CN, $COOR_1$, $CONR_1R_2$, $NO_2$, NHOH, F, Cl, Br, I, and $NR_1R_2$, where $R_1$, $R_2$ are each independently selected from H and branched or unbranched lower alkyl (e.g., $C_1$-$C_6$).

In certain embodiments the hydrocarbon chain comprises zero to eight double bonds, for example, positioned alternately with single bonds along the hydrocarbon chain. In certain embodiments, the compound is an (E) isomer. In certain embodiments, the compound is a (Z) isomer. In certain embodiments, the double bonds may optionally be substituted with one or more of hydrogen, methyl, or lower alkyl groups, for example, an alkyl having a carbon length of between about $C_1$ and $C_{12}$.

In certain embodiments, one or more of the carbons in the hydrocarbon chain is substituted by an oxygen, sulfur, nitrogen, ketone, sulfone, sulfoxide, amide, urea, or sulfonamide.

In certain embodiments, the compounds of the present disclosure comprise one or more negatively charged groups attached to a hydrocarbon chain. In certain embodiments, the negatively charged group comprises, for example, a carboxyl group, or a bioisosteric replacement for a carboxylate such as, but not limited to, a phosphate, boronic acid, phosphoester, phosphodiester, phosphinic acid, sulfonamide, malonic acid, 2-sulfoacetic acid, sulfonic acid, hydroxamic acid, tetrazole, hydroxylurea, phosphoramide, or any other bioisosteric replacement for a carboxylate known to a practitioner in the art.

In certain embodiments the compounds comprise a fatty acid. In certain embodiments, the fatty acid does not comprise a fatty acid ester, for example, a methyl ester or ethyl ester.

In certain embodiments the compounds comprise a carboxyl group that interacts with arginine at position 99 of GPR120 (i.e., Arg99). In certain embodiments, the carboxyl group forms a salt bridge with Arg99. In certain embodiments, the hydrocarbon chain of the compound forms hydrophobic interactions with other GPR120 amino acid residues present in the GPR120 fatty acid binding domain.

In certain embodiments the compound of the present disclosure comprises a compound of Formula I, having the following structure.

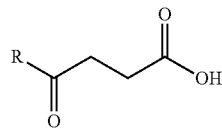

wherein R is a hydrocarbon chain, for example, a substituted or unsubstituted hydrocarbon chain having a carbon length of between about $C_1$ and about $C_{40}$, or between about $C_4$ and about $C_{35}$, or between about $C_6$ and about $C_{30}$, or between about $C_8$ and about $C_{28}$, or between about $C_{10}$ and about $C_{26}$, or between about $C_{12}$ and about $C_{24}$, or between about $C_{14}$ and about $C_{22}$, or between about $C_{16}$ and about $C_{20}$. In certain embodiments, the hydrocarbon chain has a carbon length of between about $C_{14}$ and about $C_{22}$. Substitutions may include, but are not limited to, those described above, for example, the hydrocarbon chain may be substituted with one or more of H, $CH_3$, $C_1$-$C_{20}$, COOH, $SO_3H$, CHO, $C(O)R_1$, $C=CR_1R_2$, $C=NOH$, $OP(O)(OR_1)(OR_2)$, $OR_1$, $SR_1$, CN, $COOR_1$, $CONR_1R_2$, $NO_2$, NHOH, F, Cl, Br, I, and $NR_1R_2$, where $R_1$, $R_2$ are each independently selected from H or branched or unbranched lower alkyl (e.g., $C_1$-$C_6$).

In certain embodiments the compound of the present disclosure comprises a compound of Formula II, having the following structure:

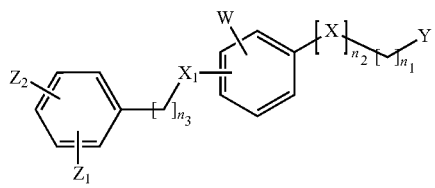

wherein
X is $(C)R_1R_2$, O, S, C(O), or a chemical bond;
$X_1$ is $(C)R_1R_2$, O, S, or $N(R_1)$;
Y is COOH, $SO_3H$, —OP(O)(OH)$_2$, or Tetrazole;
W is halogen, COOH, COOMe, CN, $N(R_1)(R_2)$, CHO, $CONR_1R_2$, Aryl, OH, H, —S-Aryl, —O-Aryl, —N-Aryl, $CF_3$, $OCH_3$, $CH_3$, $NO_2$, or OEt;
$Z_1$ and $Z_2$ are each independently selected from halogen, COOH, COOMe, CN, $N(R_1)(R_2)$, CHO, $CONR_1R_2$, Aryl, OH, H, —S-Aryl, —O-Aryl, —N-Aryl, $CF_3$, $OCH_3$, $CH_3$, $NO_2$, and OEt;
$R_1$ and $R_2$ are each independently selected from H and branched or unbranched $C_1$-$C_6$ lower alkyl;
$n_1$ is 0-4;
$n_2$ is 0-2; and
$n_3$ is 0-4.

In certain embodiments the compound of the present disclosure comprises a compound of Formula III, having the following structure:

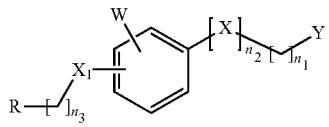

wherein
X is $(C)R_1R_2$, O, S, C(O), or a chemical bond;
$X_1$ is $(C)R_1R_2$, O, S, or $N(R_1)$;
Y is COOH, $SO_3H$, —OP(O)(OH)$_2$, or Tetrazole;
W is halogen, COOH, COOMe, CN, $N(R_1)(R_2)$, CHO, $CONR_1R_2$, Aryl, OH, H, —S-Aryl, —O-Aryl, —N-Aryl, $CF_3$, $OCH_3$, $CH_3$, $NO_2$, or OEt;
R is $CH_3$, or $(R_4)(R_5)X_2$,
$R_1$ and $R_2$ are each independently selected from H and branched or unbranched $C_1$-$C_6$ lower alkyl;
$R_4$ and $R_5$ are each independently selected from H, aryl, and branched or unbranched lower alkyl ($C_1$-$C_{10}$);
$n_1$ is 0-4;
$n_2$ is 0-2;
$n_3$ is 1-12 (branched or unbranched $C_2$-$C_{20}$); and
$X_2$ is C or N.

In certain embodiments, the fatty acid receptor modulators of the present disclosure comprise a salt of the fatty acid receptor modulator, for example, but not limited to, an acetate salt or a formate salt. In certain embodiments, the fatty acid receptor modulator salt comprises an anion (−) (for example, but not limited to, Cl$^-$, O$^{2-}$, $CO_3^{2-}$, $HCO_3^-$, OH$^-$, $NO_3^-$, $PO_4^{3-}$, $SO_4^{2-}$, $CH_3COO^-$, HCOO$^-$ and $C_2O_4^{2-}$) bonded via an ionic bond with a cation (+) (for example, but not limited to, Al$^{3+}$, Ca$^{2+}$, Na$^+$, K$^+$, Cu$^{2+}$, H$^+$, Fe$^{3+}$, Mg$^{2+}$, NH$_4^+$ and H$_3$O$^+$). In other embodiments, the fatty acid receptor agonist salt comprises a cation (+) bonded via an ionic bond with an anion (−). In certain embodiments, the compounds of the present disclosure comprise a sodium salt or potassium salt of the compound.

In certain embodiments, the fatty acid receptor modulators of the present application are identified through in silico modeling of a fatty acid receptor (such as a GPR120 receptor), e.g., a feline or a canine fatty acid receptor, wherein the fatty acid receptor modulating compounds of the present application comprise a structure that fits within a binding site of the fatty acid receptor. In certain embodiments, the in silico method comprises the in silico methods described herein and in the Examples section of the present application.

In certain embodiments, the fatty acid receptor modulators of the present application are identified through an in vitro method, wherein the fatty acid receptor agonist compounds activate and/or modulate a fatty acid receptor, disclosed herein, expressed by cells in vitro. In certain embodiments, the in vitro method comprises the in vitro methods described herein and in the Examples section of the present application.

In certain embodiments, the compounds are comprised in a flavor composition without other palatability enhancing agents. In certain embodiments, the compounds are comprised in one or more flavor compositions with one or more additional palatability enhancing agents, for example, nucleotides, nucleotide derivatives, amino acids, furanones and transmembrane compounds described herein which activate different active sites on different receptors (e.g., an umami receptor).

4. Methods for Identifying Fatty Acid Receptor Modulating Compounds

The present disclosure further provides methods for identifying compounds that modulate the activity and/or expression of a fatty acid receptor. For example, and not by way of limitation, the modulator can be an agonist or an antagonist. The presently disclosed subject matter provides in silico and in vitro methods for identifying compounds that modulate the activity and/or expression of a fatty acid receptor, disclosed above.

4.1 in Silico Methods

The presently disclosed subject matter further provides in silico methods for identifying compounds that can potentially interact with a fatty acid receptor and/or modulate the activity and/or expression of a fatty acid receptor, for example, a feline, canine or human fatty acid receptor.

In certain embodiments, the method can include predicting the three-dimensional structure (3D) of a fatty acid receptor and screening the predicted 3D structure with putative fatty acid receptor modulating compounds (i.e., test compounds). The method can further include predicting whether the putative compound would interact with the binding site of the receptor by analyzing the potential interactions with the putative compound and the amino acids of the receptor. The method can further include identifying a test compound that can bind to and/or modulate the biological activity of the fatty acid receptor by determining whether the 3D structure of the compound fits within the binding site of the 3D structure of the receptor.

In certain embodiments, the fatty acid receptor for use in the disclosed method can have an amino acid or nucleotide sequence as described by International Publication No. WO 2014/199114, published Dec. 18, 2014, or a fragment or variant thereof.

Non-limiting examples of compounds (e.g., potential fatty acid receptor modulators) that can be tested using the disclosed methods include any small chemical compound, or any biological entity, such as peptides, salts, amino acids and fatty acid compounds known in the art. In certain embodiments, the test compound can be a small chemical molecule.

In certain embodiments, structural models of a fatty acid receptor can be built using crystal structures of other GPCRs as templates for homology modelling. For example, and not by way of limitation, structural models can be generated using the crystal structures of Group A GPCRs. In certain embodiments, a structural model of a fatty acid receptor can be based on a known or a combination of known crystal structures of GPCRs. (See, e.g., Rasmussen, S. G. et al., (2011) Nature 477: 549-555; Wu, B. et al., (2010) Science 330: 1066-1071; and Wu, H. et al., (2012) Nature 485: 327-332, each of which is incorporated by reference in its entirety herein). For example, and not by way of limitation, a structural model of the transmembrane domain of a fatty acid receptor can be generated based on the crystal structure having the protein data base (PDB) ID No. 4DJH, 3OE6, and/or 3SN6. FIGS. 4A-4C, 5A-5C, 6A-6C, 8A, 8B and 9A-9C depict structural models of fatty acid receptors that can be used in the disclosed in silico methods. Any suitable modelling software known in the art can be used. In certain embodiments, the Modeller software package (Accelrys, BIOVIA, Dassault Systemes) can be used to generate the three-dimensional protein structure.

In certain embodiments, the in silico methods of identifying a compound that binds to a fatty acid receptor comprises determining whether a test compound interacts with one or more amino acids of a fatty acid receptor interacting domain, as described herein.

Compounds that are identified by the disclosed in silico methods can be further tested using the in vitro methods disclosed herein.

4.2 Fatty Acid Receptor Binding Site

The present application provides for methods of screening for compounds that modulate the activity of a fatty acid receptor, for example, a feline, canine or human fatty acid receptor, wherein the compounds interact with one or more amino acids of the fatty acid receptor. In certain embodiments, the binding site of a fatty acid receptor comprises amino acids within the transmembrane domain, for example, 7-transmembrane (7TM) domain, of the receptor, and can be identified by generating an interaction map of the receptor using in silico modeling, as described herein. In one non-limiting example, the presence of an amino acid in the transmembrane interaction map means that the residue is in the vicinity of the ligand binding environment, and interacts with the ligand.

In certain embodiments, the interaction between a compound and one or more amino acids of the fatty acid receptors described herein can comprises one or more hydrogen bond, covalent bond, non-covalent bond, salt bridge, physical interaction, and combinations thereof. The interactions can also be any interaction characteristic of a ligand receptor interaction known in the art. Such interactions can be determined by, for example, site directed mutagenesis, x-ray crystallography, x-ray or other spectroscopic methods, Nuclear Magnetic Resonance (NMR), cross-linking assessment, mass spectroscopy or electrophoresis, cryo-microscopy, displacement assays based on known agonists, structural determination and combinations thereof. In certain embodiments, the interactions are determined in silico, for example, by theoretical means such as docking a compound into a feline or canine fatty acid receptor binding pocket as described herein, for example, using molecular docking, molecular modeling, molecular simulation, or other means known to persons of ordinary skill in the art.

In certain embodiments, the interaction is a hydrogen bond interaction.

In certain embodiments, the interaction is a hydrophobic interaction.

In certain embodiments, the compounds identified according to the methods described herein that modulate the activity of a fatty acid receptor interact with one or more amino acids in a transmembrane domain of the fatty acid receptor, for example, a seven transmembrane domain (7TM). In certain embodiments, the amino acids that the compounds interact with comprise 1, 2, 3, 4, 5, 6, 7, 8, 9, 10, 11, 12, 13, 14, 15, 16, 17, 18, 19, 20, 21, 22, 23 or more of PHE88, VAL95, VAL98 and ARG99 on Helix 2; PHE115, MET118, SER119, GLY122, SER123 on Helix 3; TRP207, PHE211, VAL212, ASN215 on Helix 5; TRP277, ILE280, ILE281, ILE284 on Helix 6; and TRP299, PHE303, PHE304, VAL307, THR310, PHE311 on Helix 7 of a fatty acid receptor, for example, a fatty acid receptor comprising a feline fatty acid receptor, or the corresponding amino acids of a canine fatty acid receptor or a human fatty acid receptor.

In certain embodiments, the methods for identifying a composition that modulates the activity of a feline fatty acid receptor comprises (a) contacting a test agent with a fatty acid receptor, for example, a feline fatty acid receptor comprising an amino acid sequence of SEQ ID NO: 1, (b) detecting an interaction between the test agent and one or more amino acids in an interacting site of the fatty acid receptor selected from the group consisting of PHE88, VAL95, VAL98 and ARG99 on Helix 2; PHE115, MET118, SER119, GLY122, SER123 on Helix 3; TRP207, PHE211, VAL212, ASN215 on Helix 5; TRP277, ILE280, ILE281, ILE284 on Helix 6; and TRP299, PHE303, PHE304, VAL307, THR310, PHE311 on Helix 7; and combinations thereof, and (c) selecting as the composition, a test agent that interacts with one or more of the amino acids.

In certain embodiments, the method further comprises determining the activity of the fatty acid receptor after step (a), and selecting as the composition, a test agent that increases the activity of the fatty acid receptor.

In certain embodiments, the method further comprises contacting the fatty acid receptor with a ligand, for example an agonist, and selecting as the composition, a test agent that increases or enhances the agonist's ability to activate the fatty acid receptor.

4.3 In Vitro Methods

The presently disclosed subject matter further provides in vitro methods for identifying compounds that can modulate the activity and/or expression of a fatty acid receptor.

The fatty acid receptors for use in the presently disclosed methods can include isolated or recombinant fatty acid receptors or cells expressing a fatty acid receptor, disclosed herein. In certain embodiments, the fatty acid receptor for use in the disclosed methods can have an amino acid or nucleotide sequence as described by International Publication No. WO 2014/199114, published Dec. 18, 2014, or a fragment or variant thereof.

In certain embodiments, the method for identifying compounds that modulate the activity and/or expression of a fatty acid receptor comprises measuring the biological activity of a fatty acid receptor in the absence and/or presence of a test compound. In certain embodiments, the method can include measuring the biological activity of a fatty acid receptor in the presence of varying concentrations of the test compound. The method can further include identifying the test compounds that result in a modulation of the activity and/or expression of the fatty acid receptor compared to the activity and/or expression of the fatty acid receptor in the absence of the test compound.

In certain embodiments, the compounds identified according to the methods described herein increase the biological activity of a fatty acid receptor by at least about 5%, 10%, 15%, 20%, 25%, 30%, 35%, 40%, 45%, 50%, 55%, 60%, 65%, 70%, 75%, 80%, 85%, 90%, 95%, 100%, or more, compared to the biological activity of the fatty acid receptor when the compound is not present. In certain embodiments, the compounds identified according to the methods described herein increase the biological activity of a fatty acid receptor by at least about 30% compared to the biological activity of the fatty acid receptor when the compound is not present.

In certain embodiments, the method can further include analyzing two or more, three or more or four or more test compounds in combination. In certain embodiments, the two or more, three or more or four or more test compounds can be from different classes of compounds, e.g., amino acids and small chemical compounds. For example, and not by way of limitation, the method can include analyzing the effect of one or more small chemical test compounds on the biological activity and/or expression of a fatty acid receptor in the presence of one or more amino acid test compounds. In certain embodiments, the method for identifying a compound's effect on the activity and/or expression of a fatty acid receptor comprises analyzing the effect of a test compound on the biological activity and/or expression of a fatty acid receptor in the presence of one or more nucleotide or nucleotide derivative test compounds.

In certain embodiments, the method for identifying compounds that modulate the activity and/or expression of a fatty acid receptor comprises determining whether a compound modulates the receptor directly, for example, as an agonist or antagonist. In certain embodiments, the method comprises determining whether a compound indirectly modulates the activity of the receptor (e.g., as an allosteric modulator), for example, by enhancing or decreasing the effect of other compounds on activating or inhibiting receptor activity.

In certain embodiments, the method for identifying compounds that modulate the activity and/or expression of a fatty acid receptor comprises expressing a fatty acid receptor in a cell line and measuring the biological activity of the receptor in the presence and/or absence of a test compound. The method can further comprise identifying test compounds that modulate the activity of the receptor by determining if there is a difference in receptor activation in the presence of a test compound compared to the activity of the receptor in the absence of the test compound. In certain embodiments, the selectivity of the putative fatty acid receptor modulator can be evaluated by comparing its effects on other GPCRs or taste receptors, e.g., umami, CaSR, T1R, etc. receptors.

Activation of the receptor in the disclosed methods can be detected through the use of a labelling compound and/or agent. In certain embodiments, the activity of the fatty acid receptor can be determined by the detection of secondary messengers such as, but not limited to, cAMP, cGMP, IP3, DAG or calcium. In certain embodiments, the activity of the fatty acid receptor can be determined by the detection of the intracellular calcium levels. Monitoring can be by way of luminescence or fluorescence detection, such as by a calcium sensitive fluorescent dye. In certain embodiments, the intracellular calcium levels can be determined using a cellular dye, e.g., a fluorescent calcium indicator such as Calcium 4. In certain embodiments, the intracellular calcium levels can be determined by measuring the level of calcium binding to a calcium-binding protein, for example, calmodulin. Alternatively and/or additionally, activity of the fatty acid receptor can be determined by detection of the phosphorylation, transcript levels and/or protein levels of one or more downstream protein targets of the fatty acid receptor.

The cell line used in the disclosed methods can include any cell type that is capable of expressing a fatty acid receptor. Non-limiting examples of cells that can be used in the disclosed methods include HeLa cells, Chinese hamster ovary cells (CHO cells), African green monkey kidney cells (COS cells), *Xenopus* oocytes, HEK-293 cells and murine 3T3 fibroblasts. In certain embodiments, the method can include expressing a fatty acid receptor in CHO-K1 cells. In certain embodiments, the method can include expressing a fatty acid receptor in HEK-293 cells. In certain embodiments, the method can include expressing a fatty acid receptor in COS cells. In certain embodiments, the cells constitutively express the fatty acid receptor. In another embodiment, expression of the fatty acid receptor by the cells is inducible.

In certain embodiments, the cell expresses a calcium-binding photoprotein, wherein the photoprotein luminesces upon binding calcium. In certain embodiments, the calcium binding photoprotein comprises the protein clytin. In certain embodiments the clytin is a recombinant clytin. In certain embodiments, the clytin comprises an isolated clytin, for example, a clytin isolated from *Clytia gregarium*. In certain embodiments, the calcium-binding photoprotein comprises the protein aequorin, for example, a recombinant aequorin or an isolated aequorin, such as an aequorin isolated from *Aequorea victoria*. In certain embodiments, the calcium-binding photoprotein comprises the protein obelin, for example, a recombinant obelin or an isolated obelin, such as an obelin isolated from *Obelia longissima*.

In certain embodiments, expression of a fatty acid receptor in a cell can be performed by introducing a nucleic acid encoding a fatty acid receptor into the cell. For example, and not by way of limitation, a nucleic acid having the nucleotide sequence set forth in International Publication No. WO 2014/199114, published Dec. 18, 2014, or a fragment thereof, can be introduced into a cell. In certain embodiments, the introduction of a nucleic acid into a cell can be carried out by any method known in the art, including but not limited to transfection, electroporation, microinjection, infection with a viral or bacteriophage vector containing the nucleic acid sequences, cell fusion, chromosome-mediated gene transfer, microcell-mediated gene transfer, spheroplast fusion, etc. Numerous techniques are known in the art for the introduction of foreign genes into cells (see, e.g., Loeffler and Behr, Meth. Enzymol. 217:599-618 (1993); Cohen et al., Meth. Enzymol. 217:618-644 (1993); Cline, Pharmac. Ther. 29:69-92 (1985), the disclosures of which are hereby incorporated by reference in their entireties) and can be used in accordance with the disclosed subject matter. In certain embodiments, the technique can provide for stable transfer of nucleic acid to the cell, so that the nucleic acid is expressible by the cell and inheritable and expressible by its progeny. In certain embodiments, the technique can provide for a transient transfer of the nucleic acid to the cell, so that the nucleic acid is expressible by the cell, wherein heritability and expressibility decrease in subsequent generations of the cell's progeny.

In certain embodiments, the method can include identifying compounds that bind to a fatty acid receptor. The method can comprise contacting a fatty acid receptor with a test compound and measuring binding between the compound and the fatty acid receptor. For example, and not by way of limitation, the methods can include providing an isolated or purified fatty acid receptor in a cell-free system, and contacting the receptor with a test compound in the cell-free system to determine if the test compound binds to the fatty acid receptor. In certain embodiments, the method can comprise contacting a fatty acid receptor expressed on the surface of a cell with a test compound and detecting binding of the test compound to the fatty acid receptor. The binding can be measured directly, e.g., by using a labeled test compound, or can be measured indirectly. In certain embodiments, the detection comprises detecting a physiological event in the cell caused by the binding of the compound to the fatty acid receptor, e.g., an increase in the intracellular calcium levels. For example, and not by way of limitation, detection can be performed by way of fluorescence detection, such as a calcium sensitive fluorescent dye, by detection of luminescence, or any other method of detection known in the art.

In certain non-limiting embodiments, the in vitro assay comprises cells expressing a fatty acid receptor that is native to the cells. Examples of such cells expressing a native fatty acid receptor include, for example but not limited to, dog (canine) and/or cat (feline) taste cells (e.g., primary taste receptor cells). In certain embodiments, the dog and/or cat taste cells expressing a fatty acid receptor are isolated from a dog and/or cat and cultured in vitro. In certain embodiments, the taste receptor cells can be immortalized, for example, such that the cells isolated from a dog and/or cat can be propagated in culture.

In certain embodiments, expression of a fatty acid receptor in a cell can be induced through gene editing, for example, through use of the CRISPR gene editing system to incorporate a fatty acid receptor gene into the genome of a cell, or to edit or modify a fatty acid receptor gene native to the cell.

In certain embodiments, the in vitro methods of identifying a compound that binds to a fatty acid receptor comprises determining whether a test compound interacts with one or more amino acids of a fatty acid receptor interacting domain, as described herein.

In certain embodiments, compounds identified as modulators of a fatty acid receptor can be further tested in other analytical methods including, but not limited to, in vivo assays, to confirm or quantitate their modulating activity.

In certain embodiments, methods described herein can comprise determining whether the fatty acid receptor modulator is a fatty acid taste enhancing compound, e.g., a fatty acid receptor agonist.

In certain embodiments, the methods of identifying a fatty acid receptor modulator can comprise comparing the effect of a test compound to a fatty acid receptor agonist. For example, a test compound that increases the activity of the receptor compared to the activity of the receptor when contacted with a fatty acid receptor agonist can be selected as a fatty acid receptor modulating compound (e.g., as an agonist).

In certain embodiments, the methods of identifying a fatty acid receptor modulator can comprise determining whether a test compound modulates the activity of the receptor when the receptor is contacted with an agonist, or whether the test compound can modulate the activity of a positive allosteric modulator (PAM). Test compounds that increase or decrease the effect of said agonist or PAM on the receptor can be selected as a fatty acid receptor modulating compound (e.g., as an allosteric modulator).

5. Flavor Compositions

In certain embodiments, the flavor compositions of the present disclosure can be used to increase the palatability of pet food products, such as cat food products. The flavor compositions can include combinations of compounds, and can be added to the pet food product in various delivery systems.

In certain embodiments, the present disclosure relates to methods for modulating the fatty acid taste (for example, the activity of a fatty acid receptor, such as GPR120, including fGPR120) and/or the palatability of a pet food product comprising: a) providing at least one pet food product, or a precursor thereof, and b) combining the pet food product, or precursor thereof, with at least a fatty acid taste modulating amount of at least one flavor composition, for example, comprising one or more compounds, or a comestibly acceptable salt thereof, so as to form an enhanced pet food product.

In certain embodiments, the flavor compositions of the present disclosure can enhance the activity of a GPR120 receptor and/or palatability of a pet food product, such as, for example, a pet food product including wet pet food products, dry pet food products, moist pet food products, pet beverage products and/or snack pet food products.

In certain embodiments, one or more of the flavor compositions of the present disclosure can be added to a pet food product, in an amount effective to modify, enhance or otherwise alter a taste or taste profile of the pet food product. The modification can include, for example, an increase or enhancement in the palatability of the pet food product, as determined by animals, e.g., cats and/or dogs, or in the case of formulation testing, as determined by a panel of animal taste testers, e.g., cats and/or dogs, via procedures known in the art.

In certain embodiments of the present disclosure, a pet food product can be produced that contains a sufficient amount of at least one flavor composition described herein, for example, comprising a compound, to produce a pet food product having the desired taste, e.g., fatty acid taste.

In certain embodiments of the present disclosure, a pet food product can be produced that contains a sufficient amount of a flavor composition comprising at least one, two, three, four, five, six or more compounds.

In certain embodiments, a GPR120 modulating amount of one or more of the flavor compositions of the present disclosure can be added to the pet food product, so that the pet food product has an increased palatability as compared to a pet food product prepared without the flavor composition, as determined by animals, e.g., cats and/or dogs, or in the case of formulation testing, as determined by a panel of animal taste testers, via procedures known in the art.

In certain embodiments of the present disclosure, the flavor composition is added to a pet food product in an amount effective to increase, enhance and/or modify the palatability of the pet food product.

The concentration of flavor composition admixed with a pet food product to modulate and/or improve the palatability of the pet food product can vary depending on variables, such as, for example, the specific type of pet food product, what fatty acid compounds are already present in the pet food product and the concentrations thereof, and the enhancer effect of the particular flavor composition on such fatty acid compounds.

A broad range of concentrations of the flavor compositions can be employed to provide such palatability modification. In certain embodiments of the present application, the flavor composition is admixed with a pet food product wherein the flavor composition is present in an amount of from about 0.01 ppm to about 1,000 ppm. For example, but not by way of limitation, the flavor composition can be present in the amount from about 0.01 ppm to about 750 ppm, from about 0.01 ppm to about 500 ppm, from about 0.01 ppm to about 250 ppm, from about 0.01 ppm to about 150 ppm, from about 0.01 ppm to about 100 ppm, from about 0.01 ppm to about 75 ppm, from about 0.01 ppm to about 50 ppm, from about 0.01 ppm to about 25 ppm, from about 0.01 ppm to about 15 ppm, from about 0.01 ppm to about 10 ppm, from about 0.01 ppm to about 5 ppm, from about 0.01 ppm to about 4 ppm, from about 0.01 ppm to about 3 ppm, from about 0.01 ppm to about 2 ppm, from about 0.01 ppm to about 1 ppm, from about 0.01 ppm to about 1,000 ppm, from about 0.1 ppm to 1,000 ppm, from about 1 ppm to 1,000 ppm, from about 2 ppm to about 1,000 ppm, from about 3 ppm to about 1,000 ppm, from about 4 ppm to about 1,000 ppm, from about 5 ppm to about 1,000 ppm, from about 10 ppm to about 1,000 ppm, from about 15 ppm to about 1,000 ppm, from about 25 ppm to about 1,000 ppm, from about 50 ppm to about 1,000 ppm, from about 75 ppm to about 1,000 ppm, from about 100 ppm to about 1,000 ppm, from about 150 ppm to about 1,000 ppm, from about 250 ppm to about 1,000 ppm, from about 250 ppm to about 1,000 ppm, from about 500 ppm to about 1,000 ppm or from about 750 ppm to about 1,000 ppm, and values in between.

In certain embodiments of the present application, the flavor composition is admixed with a pet food product wherein the flavor composition is present in an amount of from about 0.01 ppm to about 500 ppm, or from about 0.1 ppm to about 500 ppm, or from about 1 ppm to about 500 ppm, and values in between.

In certain embodiments of the present application, the flavor composition is admixed with a pet food product wherein the flavor composition is present in an amount of from about 0.01 ppm to about 100 ppm, or from about 0.1 ppm to about 100 ppm, or from about 1 ppm to about 100 ppm, and values in between.

In certain embodiments, the flavor composition is present in the pet food product at an amount greater than about 0.01 ppm, greater than about 0.1 ppm, greater than about 1 ppm, greater than about 2 ppm, greater than about 3 ppm, greater than about 4 ppm, greater than about 5 ppm, greater than about 10 ppm, greater than about 25 ppm, greater than about 50 ppm, greater than about 75 ppm, greater than about 100 ppm, greater than about 250 ppm, greater than about 500 ppm, greater than about 750 ppm or greater than about 1000 ppm, and values in between.

In certain embodiments, a compound of the present disclosure is present in a food product in an amount that is sufficient to modulate, activate and/or enhance a fatty acid receptor, e.g., a GPR120 receptor. For example, but not by way of limitation, a compound can be present in a food product in an amount from about 10 pM to about 1 M, from about 1 nM to about 1 M, from about 1 µM to about 1 M, from about 1 mM to about 1 M, from about 10 mM to about 1 M, from about 100 mM to about 1 M, from about 250 mM to about 1 M, from about 500 mM to about 1 M, from about 750 mM to about 1 M, from about 0.001 µM to about 1 M, from about 0.001 µM to about 750 mM, from about 0.001 µM to about 500 mM, from about 0.001 µM to about 250 mM, from about 0.001 µM to about 100 mM, from about 0.001 µM to about 50 mM, from about 0.001 µM to about 25 mM, from about 0.001 µM to about 10 mM, from about 0.001 µM to about 1 mM, from about 0.001 µM to about 100 µM or from about 0.001 µM to about 10 µM, and values in between.

In certain embodiments of the present application, the flavor composition is admixed with a pet food product wherein the flavor composition is present in an amount of from about 10 pM to about 1 M, or from about 1 pM to about 1 M, or from about 0.1 pM to about 1 M, and values in between.

In certain embodiments of the present application, the flavor composition is admixed with a pet food product wherein the flavor composition is present in an amount of from about 10 pM to about 0.5 M, or from about 1 pM to about 0.5 M, or from about 0.1 pM to about 0.5 M, and values in between.

In certain embodiments of the present application, the flavor composition is admixed with a pet food product wherein the flavor composition is present in an amount of from about 10 pM to about 0.1 M, or from about 1 pM to about 0.1 M, or from about 0.1 pM to about 0.1 M, and values in between.

In certain embodiments of the present application, the flavor composition is admixed with a food product wherein the flavor composition is present in an amount of from about 0.001 to about 10% weight/weight (w/w) of the food product. For example, but not by way of limitation, the flavor composition can be present in the amount from about 0.001% to about 10%, from about 0.01% to about 20% w/w, from about 0.001% to about 1%, from about 0.001% to about 0.1%, from about 0.001% to about 0.01%, from about 0.01% to about 10%, from about 0.01% to about 1%, or from about 0.1% to about 10%, or from about 0.1% to about 1% w/w, and values in between.

In certain embodiments of the present application, the flavor composition is admixed with a food product wherein the flavor composition is present in an amount of from about 0.001% to about 5%, or from about 0.01% to about 5%, or from about 0.1% to about 5% w/w, and values in between.

In certain embodiments of the present application, the flavor composition is admixed with a food product wherein the flavor composition is present in an amount of from about 0.001% to about 1%, or from about 0.01% to about 1%, or from about 0.1% to about 1% w/w, and values in between.

In certain embodiments of the present application, the flavor composition is admixed with a food product wherein the flavor composition is present in an amount of from about 0.01% to about 10% w/w.

In certain embodiments, the compounds of the present application are blended together in various ratios or are blended together with other compounds, e.g., nucleotides and/or nucleotide derivatives and/or furanones and/or amino acids and/or transmembrane compounds, to form various flavor compositions. Non-limiting examples of nucleotides, nucleotide derivatives, furanones, amino acids and transmembrane compounds are disclosed in International Application Nos. PCT/EP2013/072788 filed Oct. 31, 2013, PCT/EP2013/072789 filed Oct. 31, 2013, PCT/EP2013/072790 filed Oct. 31, 2013, PCT/EP2013/072794 filed Oct. 31, 2013, PCT/US15/65046 filed Dec. 10, 2015, PCT/US15/65036 filed Dec. 10, 2015, and PCT/US15/65067 filed Dec. 10, 2015, which are incorporated herein by reference in their entireties.

5.1 Nucleotides and Nucleotide Derivatives

In certain embodiments of the present disclosure, the flavor composition comprises at least one compound and at least one nucleotide and/or nucleotide derivative as described herein and by International Application No. PCT/US15/65046 filed Dec. 10, 2015, which is incorporated herein by reference in its entirety.

In certain embodiments of the present disclosure, the flavor composition comprises at least one compound and at least two, three, four, five or more nucleotide and/or nucleotide derivatives as described herein. Non-limiting examples of nucleotides include guanosine monophosphate (GMP), inosine monophosphate (IMP), adenosine monophosphate (AMP), cytidine monophosphate (CMP), thymine monophosphate (TMP), xanthosine monophosphate (XMP), uridine monophosphate (UMP) and combinations thereof.

In certain embodiments, the flavor composition can include a nucleotide and/or nucleotide derivative present in a food product which can be present in an amount of from about 1 pM to about 1 M, from about 1 nM to about 1 M, from about 1 µM to about 1 M, from about 1 mM to about 1 M, from about 10 mM to about 1 M, from about 100 mM to about 1 M, from about 250 mM to about 1 M, from about 500 mM to about 1 M, from about 750 mM to about 1 M, from about 1 µM to about 1 M, from about 1 µM to about 750 mM, from about 1 µM to about 500 mM, from about 1 µM to about 250 mM, from about 1 µM to about 100 mM, from about 1 µM to about 50 mM, from about 1 µM to about 25 mM, from about 1 µM to about 10 mM, from about 1 µM to about 1 mM, from about 1 µM to about 100 µM or from about 1 µM to about 10 µM, and values in between.

In certain embodiments, the nucleotide and/or nucleotide derivative can be present in an amount of greater than about 1 mM or greater than about 2.5 mM of the pet food product. In certain non-limiting embodiments, the nucleotide and/or nucleotide derivative can be present in an amount of less than about 100 mM, less than about 50 mM, less than about 20 mM or less than about 10 mM of the pet food product. In a certain, non-limiting embodiments, the nucleotide and/or or nucleotide derivative is present in an amount of about 5 mM of the pet food product.

In certain embodiments of the present disclosure, the flavor composition further comprises at least one amino acid as described herein.

In certain embodiments of the present disclosure, the flavor composition further comprises at least one transmembrane compound as described herein.

5.2 Amino acids

In certain embodiments of the present disclosure, the flavor composition comprises at least one compound and at least one amino acid as described herein, and by International Application Nos. PCT/EP2013/072788 filed Oct. 31, 2013, PCT/EP2013/072789 filed Oct. 31, 2013, PCT/EP2013/072790 filed Oct. 31, 2013, and PCT/EP2013/072794 filed Oct. 31, 2013, each of which is incorporated herein by reference in its entirety. In certain embodiments, the flavor composition comprises at least one compound and at least two, three, four, five or more amino acids as described herein.

In certain embodiments, the flavor composition comprises at least one compound, at least one, two, three, four, five or more first amino acids and/or at least one, two, three, four, five or more second amino acids.

In certain embodiments of the present disclosure, the flavor composition comprises at least one compound, at least one first amino acid and at least one second amino acid.

In certain embodiments of the present disclosure, the flavor composition comprises at least one compound, at least two first amino acids and at least one second amino acid.

In certain embodiments of the present disclosure, the flavor composition comprises at least one compound, at least one first amino acid and at least two second amino acids.

In certain embodiments of the present disclosure, the flavor composition comprises at least one compound, at least two first amino acids and at least two second amino acids.

In certain embodiments of the present disclosure, the flavor composition further comprises at least one fatty acid as described herein.

In certain embodiments of the present disclosure, the flavor composition further comprises at least one transmembrane compound as described herein.

Non-limiting examples of a first amino acid include tryptophan, phenylalanine, histidine, glycine, cysteine, alanine, tyrosine, serine, methionine, asparagine, leucine and combinations thereof.

Non-limiting examples of a second amino acid include threonine, isoleucine, proline, glutamic acid, aspartic acid, hydroxyl proline, arginine, cystine, glutamine, lysine, valine, orthinine, taurine, monosodium glutamate (MSG) and combinations thereof.

In certain embodiments, the at least one first amino acid and/or the second amino acid, alone or in combination, can be present in an amount of from about 1 mM to about 1 M, or from about 250 mM to about 1 M, or from about 5 mM to about 500 mM, or from about 10 mM to about 100 mM, or from about 15 mM to about 50 mM, or from about 20 mM to about 40 mM of the pet food product. In certain embodiments, the amino acid(s) can be present at an amount less than about 1 M, less than about 200 mM, less than about 100 mM, less than about 50 mM, less than about 20 mM or less than about 10 mM of the pet food product. In certain embodiments, the first amino acid and/or the second amino acid, alone or in combination, can be present in an amount of about 25 mM of the pet food product.

5.3 Transmembrane Compounds

In certain embodiments of the present disclosure, the flavor composition comprises at least one compound as described by the present application, and at least one transmembrane compound as described by International Application No. PCT/US15/65036 filed Dec. 10, 2015, which is incorporated herein by reference in its entirety, and in Table 1 below.

In certain embodiments of the present disclosure, the flavor composition comprises at least one compound and at least two, three, four, five or more transmembrane compound.

In certain embodiments of the present disclosure, the flavor composition includes at least one compound, at least one transmembrane compound and at least one amino acid as described herein.

In certain embodiments of the present disclosure, the flavor composition comprises at least one compound, at least one transmembrane compound, at least one first amino acid and at least one second amino acid as described herein.

In certain embodiments of the present disclosure, the flavor composition includes at least one compound, at least one transmembrane compound and at least one nucleotide and/or nucleotide derivative as described herein.

In certain embodiments of the present disclosure, the flavor composition includes at least one compound, at least one transmembrane compound, at least one nucleotide and/or nucleotide derivative and at least one amino acid.

In certain embodiments of the present disclosure, the flavor composition includes at least one compound, at least one transmembrane compound, at least one nucleotide and/or nucleotide derivative, at least one first amino acid and at least one second amino acid.

In certain embodiments, a transmembrane compound of the present disclosure can be present in a food product in an amount from about 1 pM to about 1 M, from about 1 nM to about 1 M, from about 1 µM to about 1 M, from about 1 mM to about 1 M, from about 10 mM to about 1 M, from about 100 mM to about 1 M, from about 250 mM to about 1 M, from about 500 mM to about 1 M, from about 750 mM to about 1 M, from about 1 µM to about 1 M, from about 1 µM to about 750 mM, from about 1 µM to about 500 mM, from about 1 µM to about 250 mM, from about 1 µM to about 100 mM, from about 1 µM to about 50 mM, from about 1 µM to about 25 mM, from about 1 µM to about 10 mM, from about 1 µM to about 1 mM, from about 1 µM to about 100 µM or from about 1 µM to about 10 µM, and values in between.

In certain embodiments, the transmembrane compound can be a salt, stereoisomer or a comestible form of a transmembrane compound described herein.

TABLE 1

| Compound Name |
| --- |
| 5-bromo-N-(pentan-3-yl)furan-2-carboxamide |
| 3,4-dimethyl-N-(pentan-3-yl)benzamide; N-(1-ethylpropyl)-3,4-dimethylbenzamide |

TABLE 1-continued

| Compound Name |
| --- |
| 4-methoxy-3-methyl-N-(1-phenylethyl)benzamide |
| N-(2,3-dimethylcyclohexyl) benzo[d][1,3]dioxole-5-carboxamide |
| ethyl 2- (benzo[d][1,3] dioxole-5-carboxamido)-3-methylbutanoate; ethyl N-(1,3-benzodioxol-5 ylcarbonyl) valinate |
| 4-methoxy-3-methyl-N-(pentan-2-yl)benzamide |
| N-(pentan-3-yl)-2,3-dihydrobenzo[b][1,4]dioxine-6-carboxamide |
| 3,4-dimethoxy-N-(pentan-3-yl)benzamide |
| (E)-methyl 3-methyl-2-(3-(thiophen-2-yl) acrylamido)butanoate |
| (E)-3-(3,4-dimethoxyphenyl)-N-(pentan-2-yl)acrylamide; (2E)-3-(3,4-dimethoxyphenyl)-N-(pentan-2-yl)prop-2-enamide |
| (E)-3-(4-methoxyphenyl)-N-(2-methylcyclohexyl) acrylamide |
| N1-phenethyl-N2-(pyridin-3-ylmethyl)oxalamide; N-(2-phenylethyl)-N'-(pyridin-3-ylmethyl)ethanediamide |
| N-(heptan-4-yl)benzo[d][1,3]dioxole-5-carboxamide |
| 1-(2-bromophenyl)-3-((1R,2S)-2-hydroxy-2,3-dihydro-1H-inden-1-yl)urea |
| N-(benzo[d][1,3]dioxol-5-yl)-2-propylpentanamide |
| 1-benzyl-3-(2-oxo-2-phenylethyl)imidazolidine-2,4,5-trione |
| N-(2-amino-2-oxo-1-phenylethyl)-3-chloro-4,5-dimethoxybenzamide |
| (E)-3-(4-methoxyphenyl)-N-(pentan-3-yl)acrylamide |
| 2-((5-(4-(methylthio)phenyl)-2H-tetrazol-2-yl)methyl)pyridine |
| N-(heptan-4-yl)benzo[d][1,3]dioxole-5-carboxamide |

6. Delivery Systems

In certain embodiments, the flavor compositions of the present application can be incorporated into a delivery system for use in pet food products. Delivery systems can be a non-aqueous liquid, solid, or emulsion. Delivery systems are generally adapted to suit the needs of the flavor composition and/or the pet food product into which the flavor composition will be incorporated.

The flavoring compositions can be employed in non-aqueous liquid form, dried form, solid form and/or as an emulsion. When used in dried form, suitable drying means such as spray drying can be used. Alternatively, a flavoring composition can be encapsulated or absorbed onto water insoluble materials. The actual techniques for preparing such dried forms are well-known in the art, and can be applied to the presently disclosed subject matter.

The flavor compositions of the presently disclosed subject matter can be used in many distinct physical forms well known in the art to provide an initial burst of taste, flavor and/or texture; and/or a prolonged sensation of taste, flavor and/or texture. Without being limited thereto, such physical forms include free forms, such as spray dried, powdered, and beaded forms, and encapsulated forms, and mixtures thereof.

In certain embodiments, the compounds of a flavor composition can be generated during the processing of a pet food product, e.g., sterilization, retorting and/or extrusion, from precursor compounds present in the pet food product. In a non-limiting example, the composition can be a free fatty acid that is liberated from one or more triglycerides during the processing of a pet food product. In certain embodiments, the free fatty acid is produced during thermal, acid and/or enzymatic treatment of the triglycerides. In certain embodiments, the triglycerides are present in meat (e.g., chicken, beef, pork, fish, and/or tallow) and/or vegetable (e.g., oils such as vegetable and sunflower oil) sources that are processed to produce the pet food.

In certain embodiments, as noted above, encapsulation techniques can be used to modify the flavor systems. In certain embodiments, flavor compounds, flavor components or the entire flavor composition can be fully or partially encapsulated. Encapsulating materials and/or techniques can be selected to determine the type of modification of the flavor system.

In certain embodiments, the encapsulating materials and/or techniques are selected to improve the stability of the flavor compounds, flavor components or flavor compositions; while in other embodiments the encapsulating materials and/or techniques are selected to modify the release profile of the flavor compositions.

Suitable encapsulating materials can include, but are not limited to, hydrocolloids such as alginates, pectins, agars, guar gums, celluloses, and the like, proteins, polyvinyl acetate, polyethylene, crosslinked polyvinyl pyrrolidone, polymethylmethacrylate, polylactid acid, polyhydroxyalkanoates, ethylcellulose, polyvinyl acetatephthalate, polyethylene glycol esters, methacrylic acid-co-methylmethacrylate, ethylene-vinylacetate (EVA) copolymer, and the like, and combinations thereof. Suitable encapsulating techniques can include, but are not limited to, spray coating, spray drying, spray chilling, absorption, adsorption, inclusion complexing (e.g., creating a flavor/cyclodextrin complex), coacervation, fluidized bed coating or other process can be used to encapsulate an ingredient with an encapsulating material.

Encapsulated delivery systems for flavoring agents or sweetening agents can contain a hydrophobic matrix of fat or wax surrounding a sweetening agent or flavoring agent core. The fats can be selected from any number of conventional materials such as fatty acids, glycerides or poly glycerol esters, sorbitol esters, and mixtures thereof. Examples of fatty acids include but are not limited to hydrogenated and partially hydrogenated vegetable oils such as palm oil, palm kernel oil, peanut oil, rapeseed oil, rice bran oil, soybean oil, cottonseed oil, sunflower oil, safflower oil and combinations thereof. Examples of glycerides include, but are not limited to, monoglycerides, diglycerides and triglycerides.

Waxes can be chosen from the group consisting of natural and synthetic waxes and mixtures thereof. Non-limiting examples include paraffin wax, petrolatum, carbowax, microcrystalline wax, beeswax, carnauba wax, candelilla wax, lanolin, bayberry wax, sugarcane wax, spermaceti wax, rice bran wax, and mixtures thereof.

The fats and waxes can be use individually or in combination in amounts varying from about 10 to about 70%, and alternatively in amounts from about 30 to about 60%, by weight of the encapsulated system. When used in combination, the fat and wax can be present in a ratio from about 70:10 to 85:15, respectively.

Typical encapsulated flavor compositions, flavoring agent or sweetening agent delivery systems are disclosed in U.S. Pat. Nos. 4,597,970 and 4,722,845, the disclosures of which are incorporated herein by reference in their entireties.

Liquid delivery systems can include, but are not limited to, systems with a dispersion of the flavor compositions of the present application, such as in carbohydrate syrups and/or emulsions. Liquid delivery systems can also include extracts where the compound and/or the flavor compositions are solubilized in a solvent. Solid delivery systems can be created by spray drying, spray coating, spray chilling, fluidized bed drying, absorption, adsorption, coacervation, complexation, or any other standard technique. In some embodiments, the delivery system can be selected to be compatible with or to function in the edible composition. In certain embodiments, the delivery system will include an oleaginous material such as a fat or oil. In certain embodiments, the delivery system will include a confectionery fat such as cocoa butter, a cocoa butter replacer, a cocoa butter substitute, or a cocoa butter equivalent.

When used in dried form, suitable drying means such as spray drying may be used. Alternatively, a flavoring composition may be adsorbed or absorbed onto substrates, such as water insoluble materials, and may be encapsulated. The actual techniques for preparing such dried forms are well known in the art.

7. Pet Food Products

The flavor compositions of the present disclosed subject matter can be used in a wide variety of pet food products. Non-limiting examples of suitable pet food products include wet food products, dry food products, moist food products, pet food supplements (e.g., vitamins), pet beverage products, snack and treats as described herein.

The combination of the flavoring composition(s) of the presently disclosed subject matter together with a pet food product and optional ingredients, when desired, provides a flavoring agent that possesses unexpected taste and imparts, for example, a fatty acid sensory experience, for example, through an increase in activity of a GPR120 fatty acid receptor. The flavor compositions disclosed herein can be added prior to, during or after formulation processing or packaging of the pet food product, and the components of the flavor composition can be added sequentially or simultaneously. In certain embodiments, the compounds of a flavor composition can be generated during the processing of a pet food product, e.g., sterilization, retorting and/or extrusion, from precursor compounds present in the pet food product. In a non-limiting example, the composition can be a free fatty acid that is liberated from one or more triglycerides during the processing of a pet food product. In certain embodiments, the free fatty acid is produced during thermal, acid and/or enzymatic treatment of the triglycerides. In certain embodiments, the triglycerides are present in meat (e.g., chicken, beef, pork, fish, and/or tallow) and/or vegetable (e.g., oils such as vegetable and sunflower oil) sources that are processed to produce the pet food.

In certain embodiments, the pet food product is a nutritionally complete dry food product. A dry or low moisture-containing nutritionally-complete pet food product can comprise less than about 15% moisture, and include from about 10 to about 60% fat, from about 10% to about 70% protein and from about 30% to about 80% carbohydrates, e.g., dietary fiber and ash.

In certain embodiments, the pet food product is a nutritionally complete wet food product. A wet or high moisture-containing nutritionally-complete pet food product can comprise greater than about 50% moisture. In certain embodiments, the wet pet food product includes from about 40% fat, from about 50% protein and from about 10% carbohydrates, e.g., dietary fiber and ash.

In certain embodiments, the pet food product is a nutritionally complete moist food product. A moist, e.g., semi-moist or semi-dry or soft dry or soft moist or intermediate or medium moisture containing nutritionally-complete pet food product comprises from about 15 to about 50% moisture.

In certain embodiments, the pet food product is a pet food snack product. Non-limiting examples of pet food snack products include snack bars, pet chews, crunchy treats, cereal bars, snacks, biscuits and sweet products.

In certain embodiments, the protein source can be derived from a plant source, such as lupin protein, wheat protein, soy protein and combinations thereof. Alternatively or additionally, the protein source can be derived from a variety of animal sources. Non-limiting examples of animal protein include beef, pork, poultry, lamb, or fish including, for example, muscle meat, meat byproduct, meat meal or fish meal.

8. Methods of Measuring Taste Attributes

In certain embodiments of the present disclosure, the taste, flavor and/or palatability attributes of a pet food product can be modified by admixing a flavor composition with the food product, or generated under food preparation conditions, as described herein. In certain embodiments, the attribute(s) can be enhanced or reduced by increasing or decreasing the concentration of the flavor composition admixed or generated with the food product. In certain embodiments, the taste attributes of the modified food product can be evaluated as described herein, and the concentration of flavor composition admixed or generated with the food product can be increased or decreased based on the results of the evaluation.

In certain embodiments of the present disclosure, the taste and/or palatability attributes can be measured using an in vitro assay, wherein a compound's ability to activate a feline GPR120 receptor expressed by cells in vitro at different concentrations is measured. In certain embodiments, an increase in the activation of the receptor correlates with an increase in the taste and/or palatability attributes of the compound. In certain embodiments, the composition is measured alone or in combination with other compounds. In certain embodiments the in vitro assay comprises the in vitro assays described in the Examples section of the present application.

In certain embodiments of the present disclosure, the taste and/or palatability attributes can be measured using a panelist of taste testers. For example, but not by way of limitation, the panel can contain feline panelists. In certain embodiments, the panel can include canine panelists. In certain embodiments, the palatability of a pet food product can be determined by the consumption of a pet food product containing a flavor composition alone (e.g., the one bowl test, monadic ranking). In certain embodiments, the palatability of a pet food product can be determined by the preferential consumption of a pet food product containing a flavor composition, disclosed herein, versus a pet food product that does not contain the flavor composition or another flavor composition (e.g., the two bowl test for testing preference, difference and/or choice).

In certain embodiments, the palatability and/or fatty acid taste of a flavor composition can be determined by the preferential consumption of an emulsion (or any other composition into which a compound of the present application can be admixed with, for example, a gel or gelatin) containing a flavor composition, disclosed herein, versus an emulsion that does not contain the flavor composition or contains a different flavor composition. For example, a gel panel can be used to compare the palatability of a range of concentrations of compounds in a monadic exposure. In certain embodiments, the emulsion can contain a palatability enhancer, for example, L-histidine, as an ingestive/positive tastant to increase baseline emulsion intake, therefore enabling the identification of a potential negative impact of the test compound.

The intake ratio for each pet food product or emulsion can be determined by measuring the amount of one ration consumed divided by the total consumption. The consumption ratio (CR) can then be calculated to compare the consumption of one ration in terms of the other ration to determine the preferential consumption of one food product or emulsion over the other. Alternatively or additionally, the difference in intake (g) can be used to assess the average difference in intake between the two emulsions in a two bottle test or between two pet food products in a two bowl test at a selected significance level, for example, at the 5% significance level to determine an average difference in intake with a 95% confidence interval. However, any significance level may be used, for example, a 1, 2, 3, 4, 5, 10, 15, 20, 25, or 50% significance level. In certain embodiments, percentage preference scores, e.g., the percentage preference for one emulsion or food product by an animal is the percentage of the total emulsion or food product ingested during the test that that emulsion or food product accounts for, can also be calculated.

9. Methods of Generation

In certain embodiments, the compounds of the present disclosure can be generated using standard chemosynthesis processes. In certain embodiments, the chemosynthesis process provides a compound having a purity of at least 99.999%, or at least 99%, or at least 95%, or at least 90%, or at least 85 or at least 80%. In certain embodiments, the compounds can be prepared using standard hydrolysis processes such as those employing acids, enzymes or a combination of acids and enzymes.

In certain embodiments, the compounds of the present disclosure can be generated under food preparation conditions, e.g., during the production of a pet food product. For example, but not by way of limitation, the compounds of the present disclosure can be generated during a thermal food process, e.g., sterilization, retorting and/or extrusion, from precursor compounds present in the pet food. In certain embodiments, a liquid and/or a powder palatant can also be added to enhance the taste of a pet food, e.g., to a dry pet food product, and to increase the palatability of the pet food. The palatant can be a digest of meat (e.g., liver) and/or a digest of a vegetable, and can optionally include other palatants known in the art. In certain embodiments, the compound can be admixed with or generated in the liquid and/or powder palatant prior to its addition to the pet food product. Alternatively or additionally, the compound can be admixed with or generated in the liquid and/or powder palatant after its addition to the pet food product.

10. Non-Limiting Examples of Methods of the Present Disclosure

In certain non-limiting embodiments, the present disclosure provides for a method of increasing the palatability of a pet food product comprising admixing the pet food product with a flavor composition comprising a compound as described herein, wherein the compound is present at a concentration of from about 10 pM to about 1 M in the admixture.

In certain non-limiting embodiments, the present disclosure provides for a method of increasing the palatability of a pet food product comprising producing the pet food product with a flavor composition comprising a compound as described herein, wherein the compound is present at a concentration of from about 10 pM to about 1 M in the product.

In certain non-limiting embodiments, the present disclosure provides for a method of increasing the fatty acid taste of a pet food product, for example, by increasing the activity of a GPR120 receptor, comprising admixing the pet food product with a flavor composition comprising a compound as described herein, wherein the compound is present at a concentration of from 0.01 ppm to 1,000 ppm in the admixture.

In certain non-limiting embodiments, the present disclosure provides for a method of increasing the palatability of a pet food product comprising admixing the pet food product with a flavor composition comprising a compound as described herein, wherein the flavor composition is present at a concentration of from about 0.01 ppm to 1,000 ppm in the admixture.

In certain non-limiting embodiments, the present disclosure provides for a method of increasing the fatty acid taste of a pet food product, for example, by increasing the activity of a GPR120 receptor, comprising admixing the pet food product with a flavor composition comprising a compound as described herein, wherein the flavor composition is present at a concentration of from about 0.001% to about 10% w/w, or from about 0.01% to about 20% w/w, or from about 0.01% to about 5% w/w, or from about 0.01% to about 1% w/w in the admixture.

In certain non-limiting embodiments, the present disclosure provides for a method of increasing the palatability of a pet food product comprising admixing the pet food product with a flavor composition comprising a compound as described herein, wherein the flavor composition is present at a concentration of from about 0.001% to about 10% w/w, or from about 0.01% to about 20% w/w, or from about 0.01% to about 5% w/w, or from about 0.01% to about 1% w/w in the admixture.

EXAMPLES

The presently disclosed subject matter will be better understood by reference to the following Examples, which are provided as exemplary of the invention, and not by way of limitation.

Example 1—Compounds that Activate the fGPR120 Receptor

The present example describes the activation of the cat GPR120 receptor (fGPR120) by compounds in vitro.

Compounds that may function as GPR120 agonists were identified by in vitro functional characterization. The effectiveness of a compound in activating the fGPR120 receptor was evaluated.

Methods: CHO-K1 cells that stably express fGPR120 were used to screen about 120 test compounds to identify compounds that activate the fGPR120 fatty acid receptor. Activation of the fGPR120 receptor was detected by a change in intracellular calcium levels using a calcium sensitive fluorescent dye. Cells that do not express the fGPR120 receptor (mock cells) were used as a control. A FLIPR® Tetra was used for data capture.

Figure 2A:
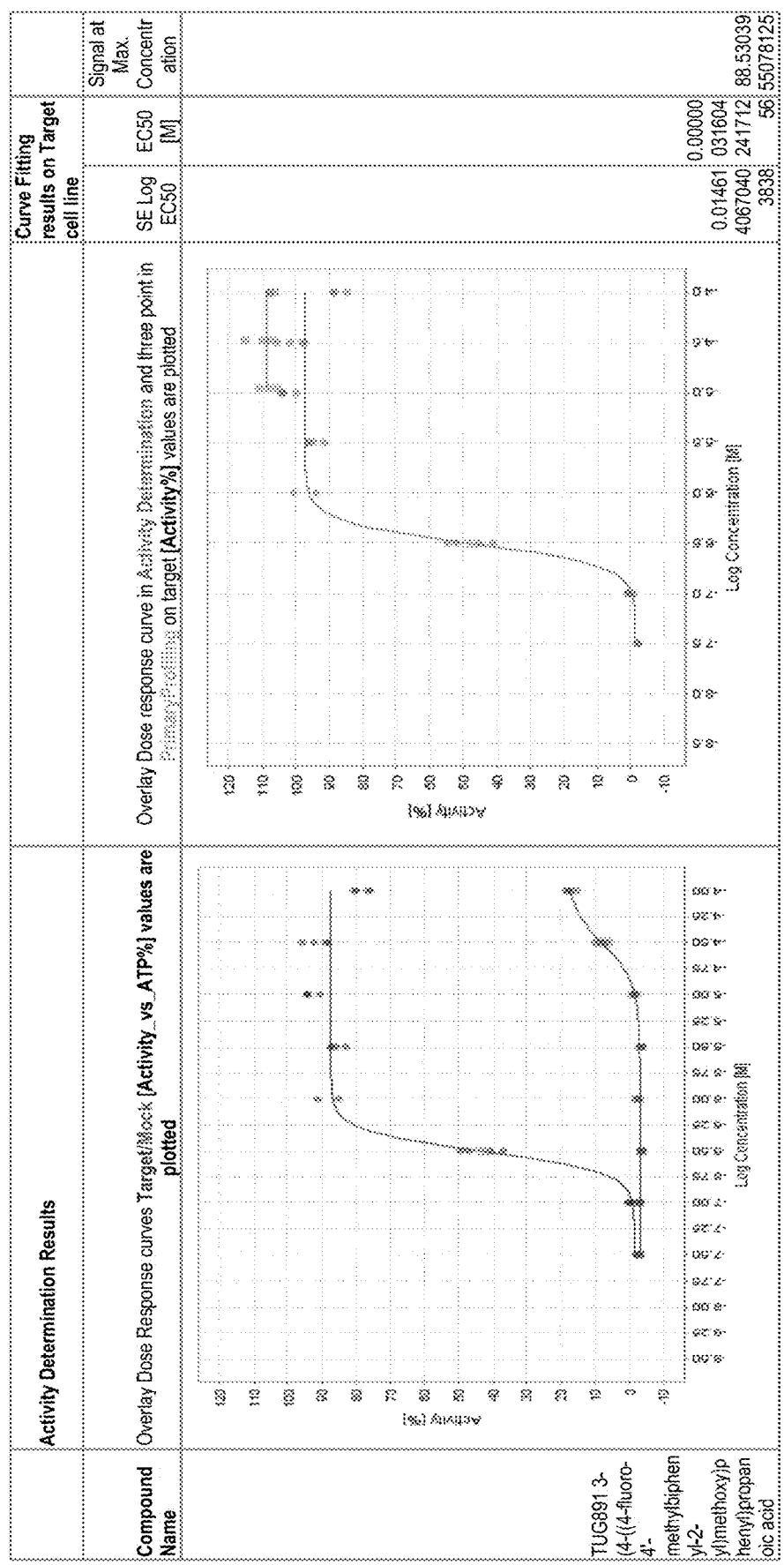
FIGS. 2A-2AH show dose response curves for the in vitro activation of fGPR120 for various compounds, as described by Example 1.
Figure 2B:
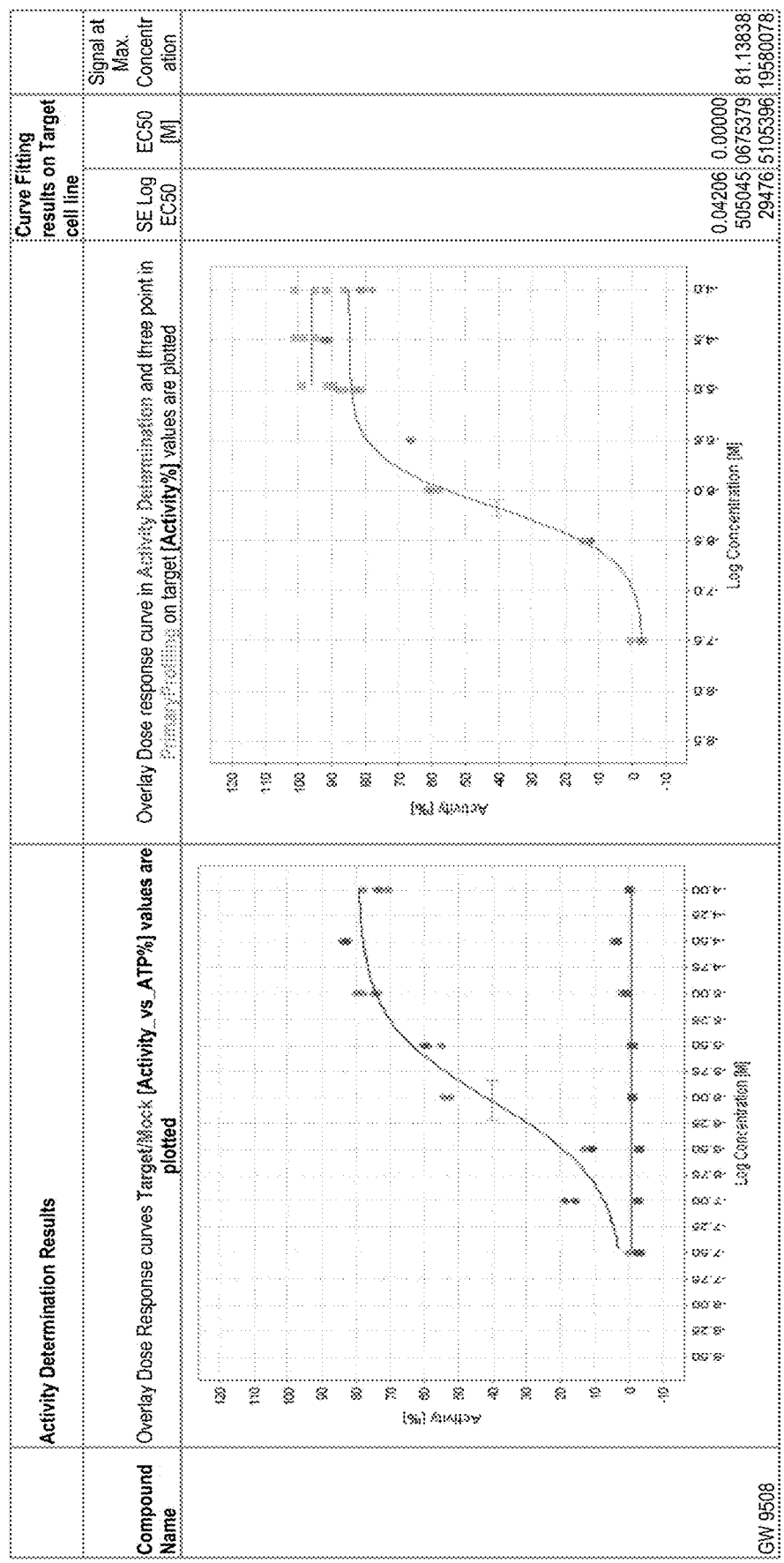
Figure 2C:
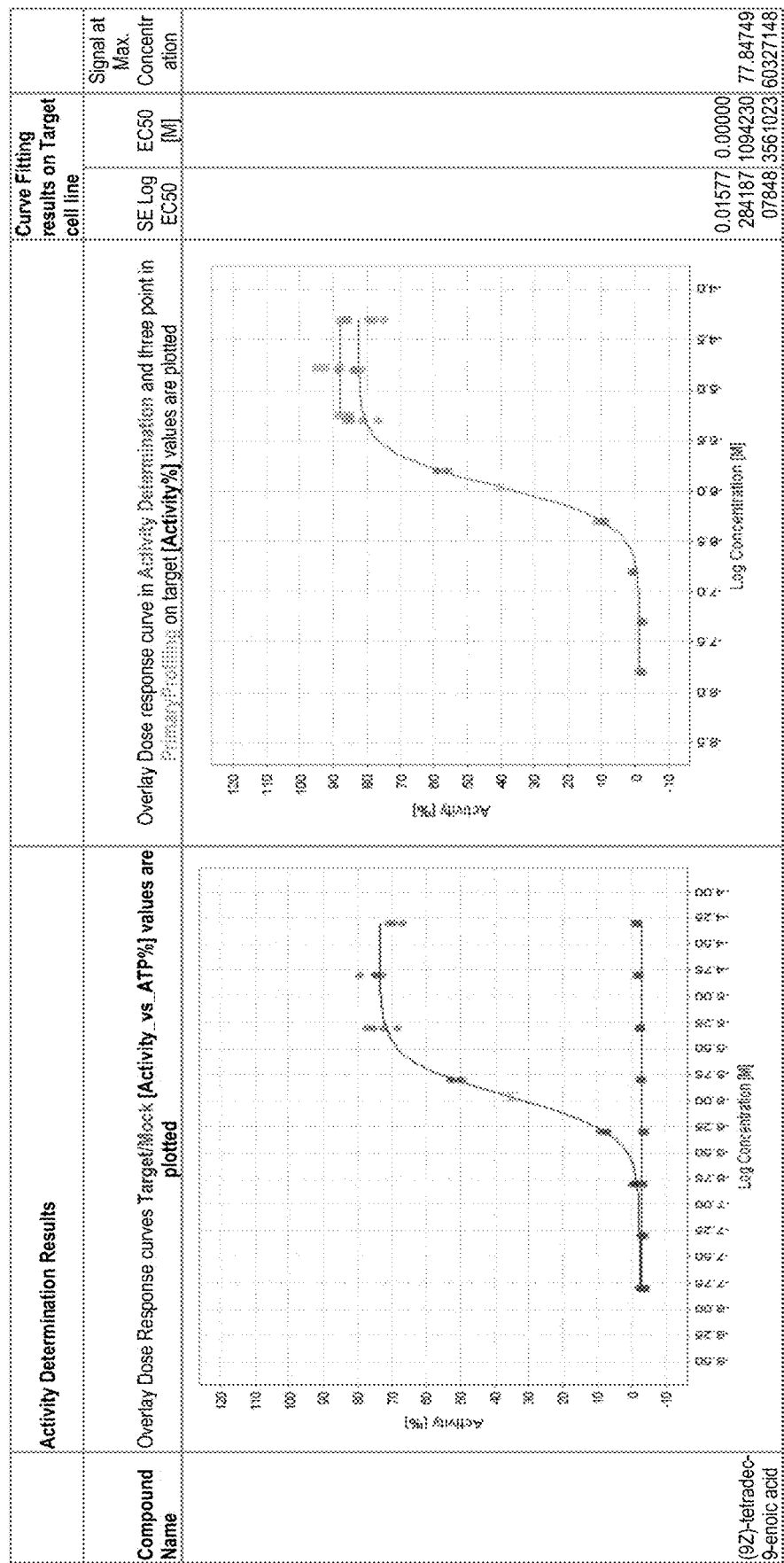
Figure 2D:
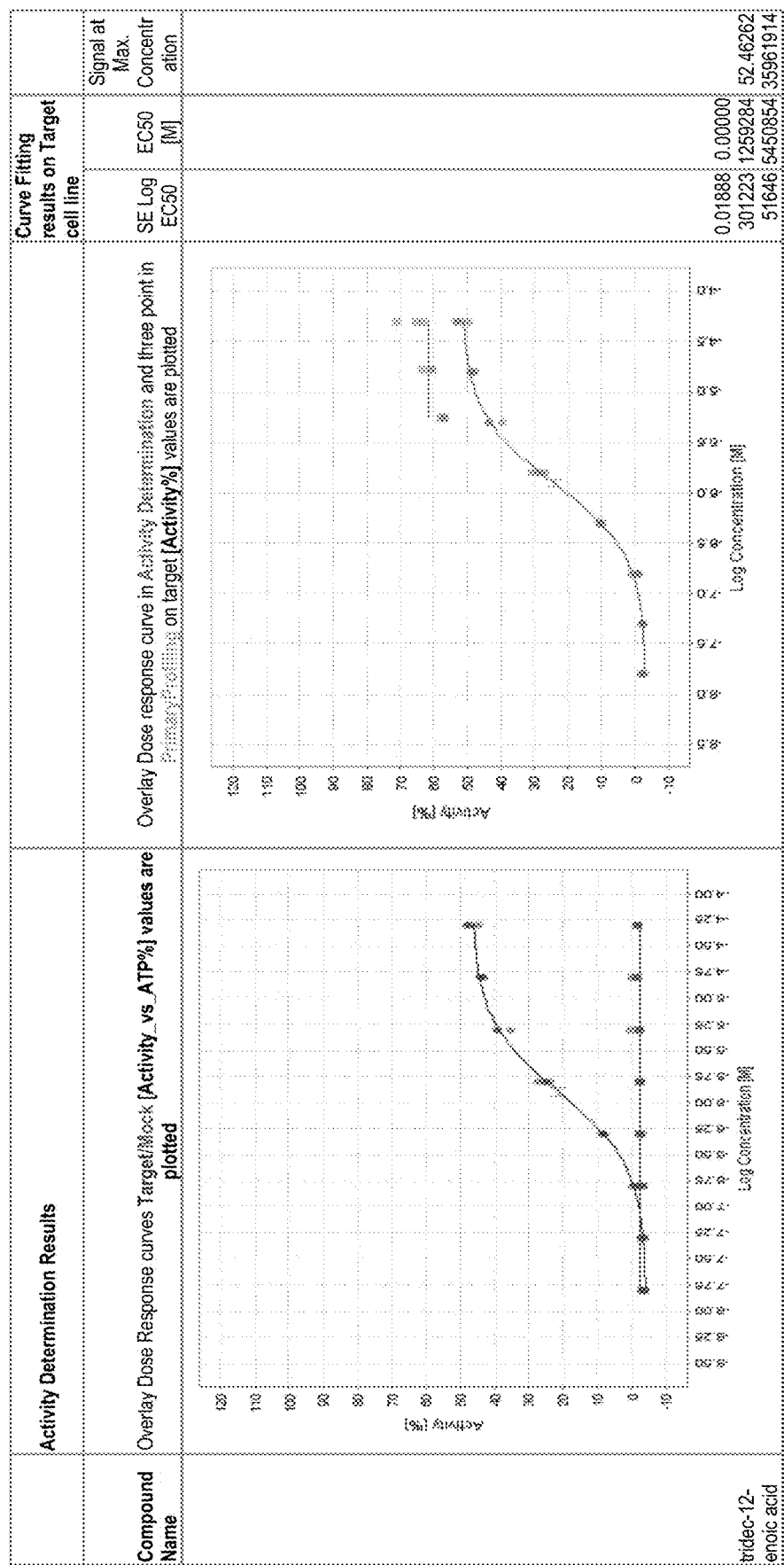
Figure 2E:
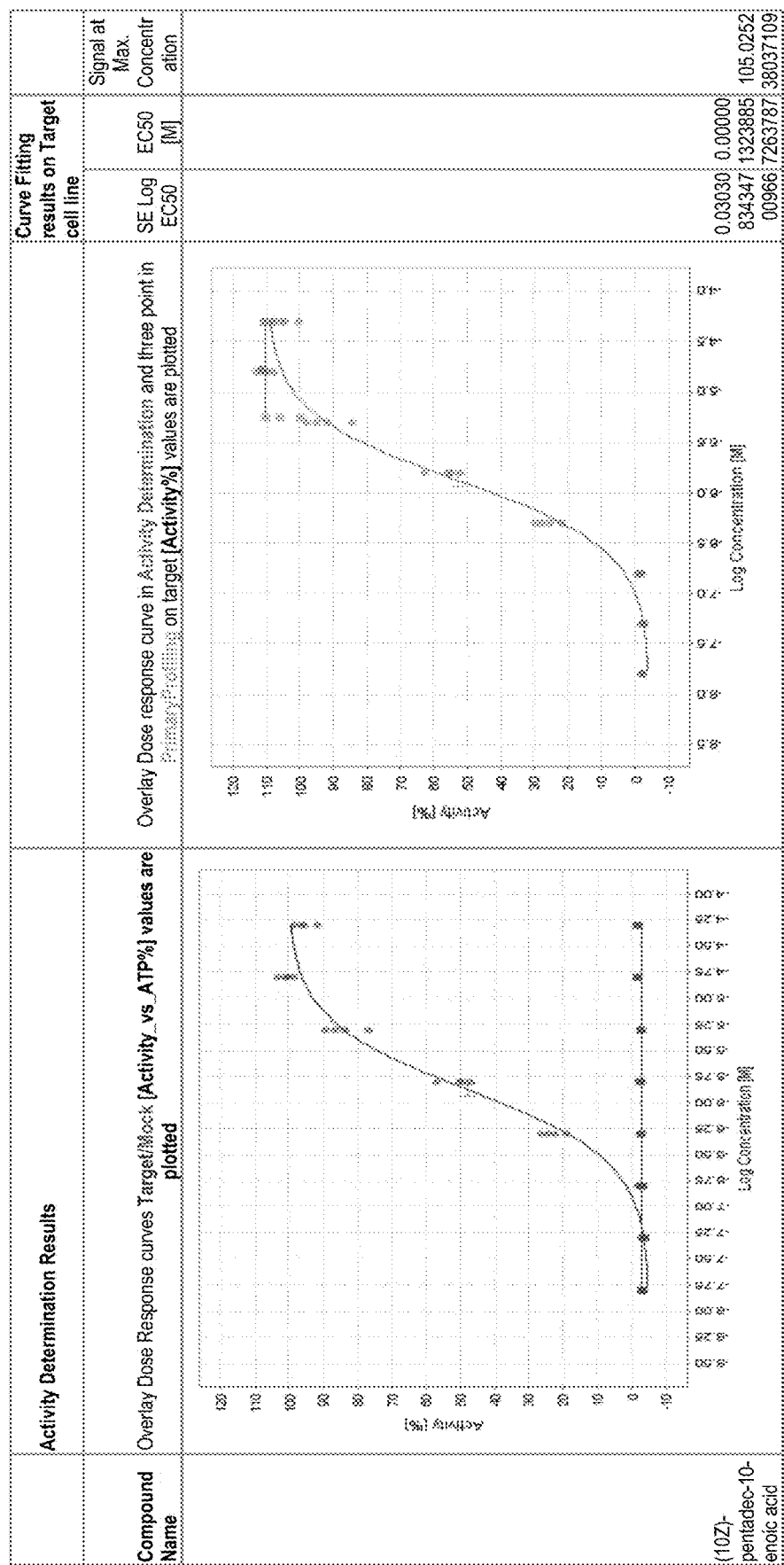
Figure 2G:
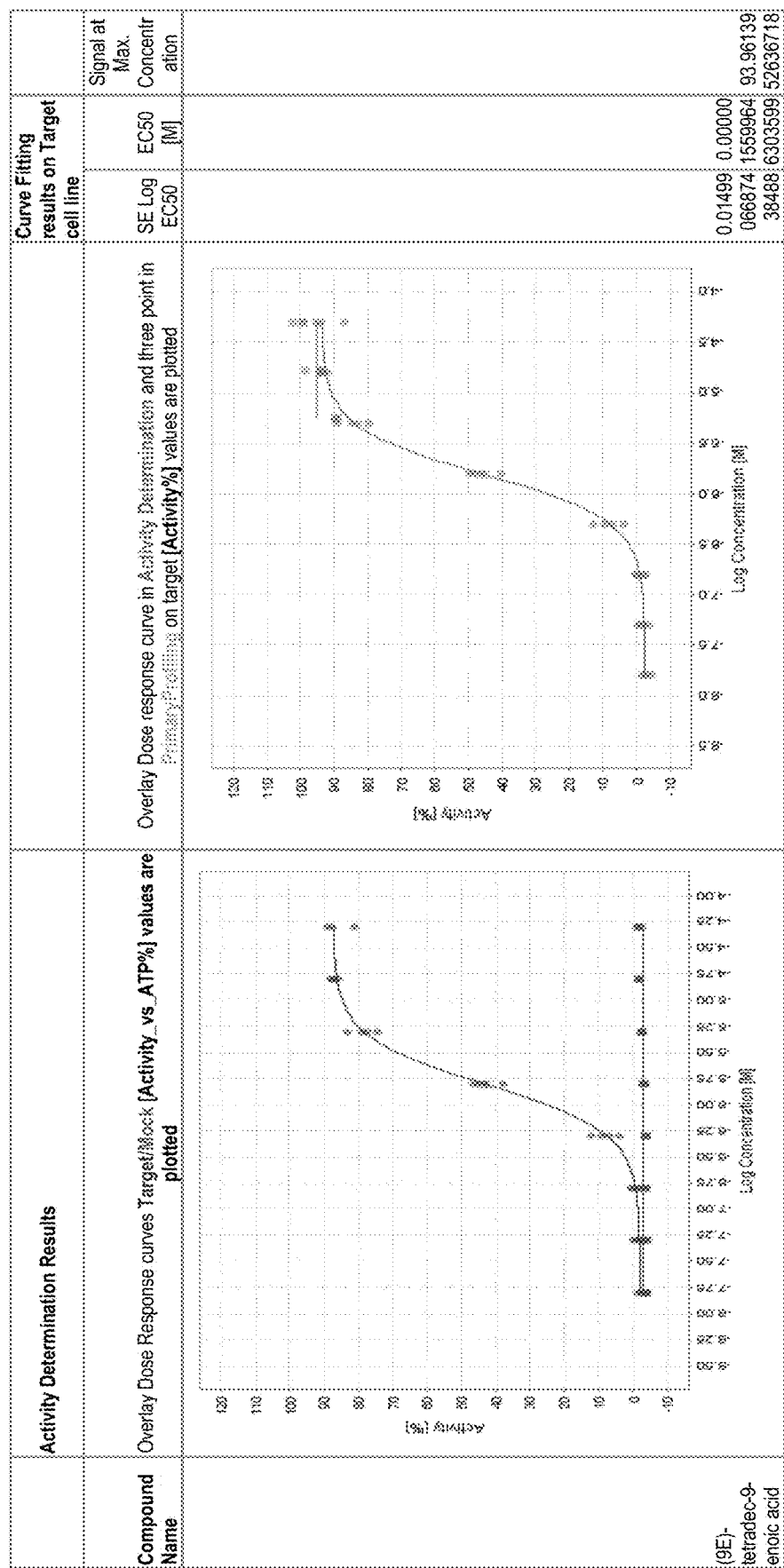
Figure 2H:
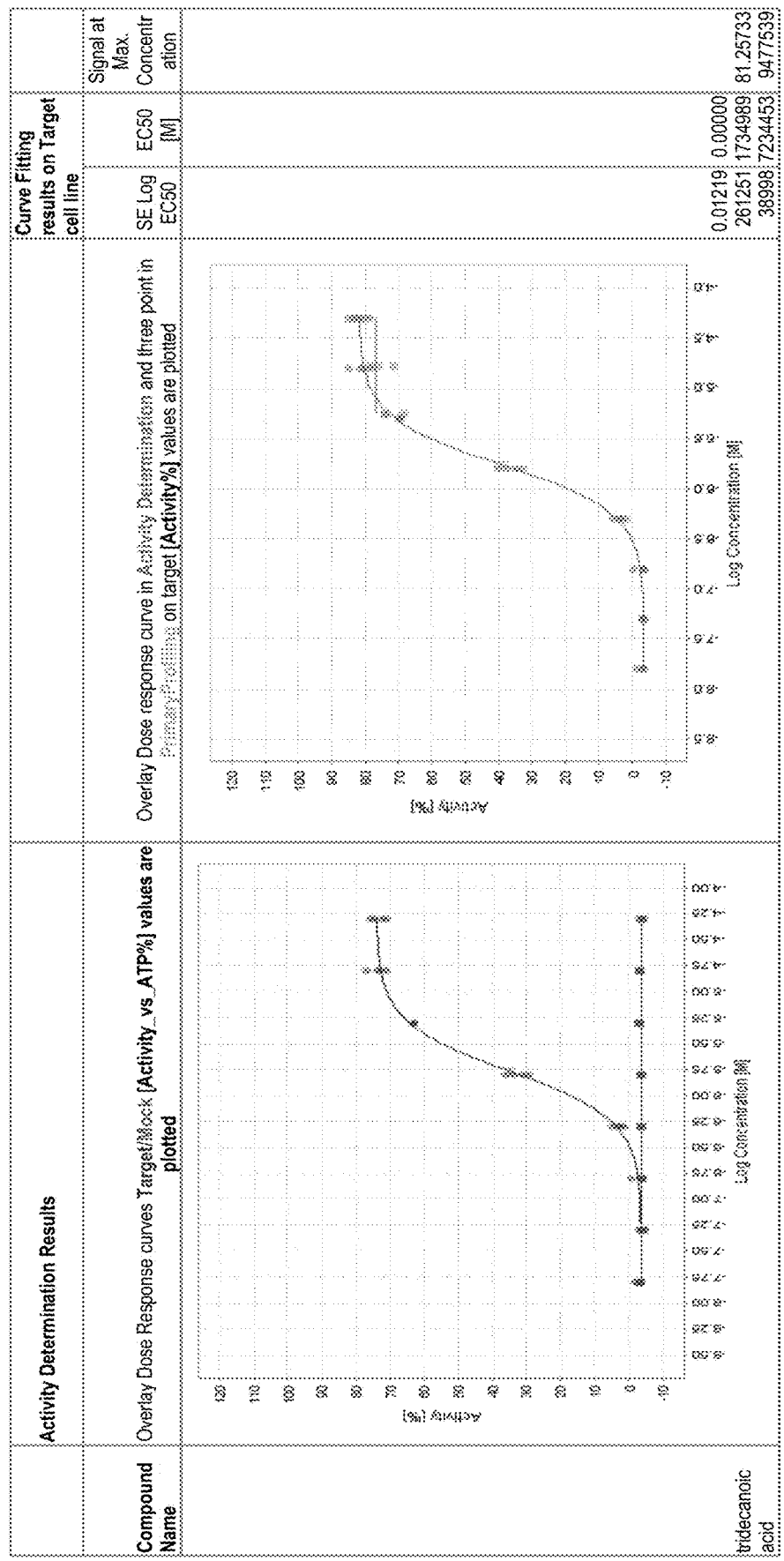
Figure 21:
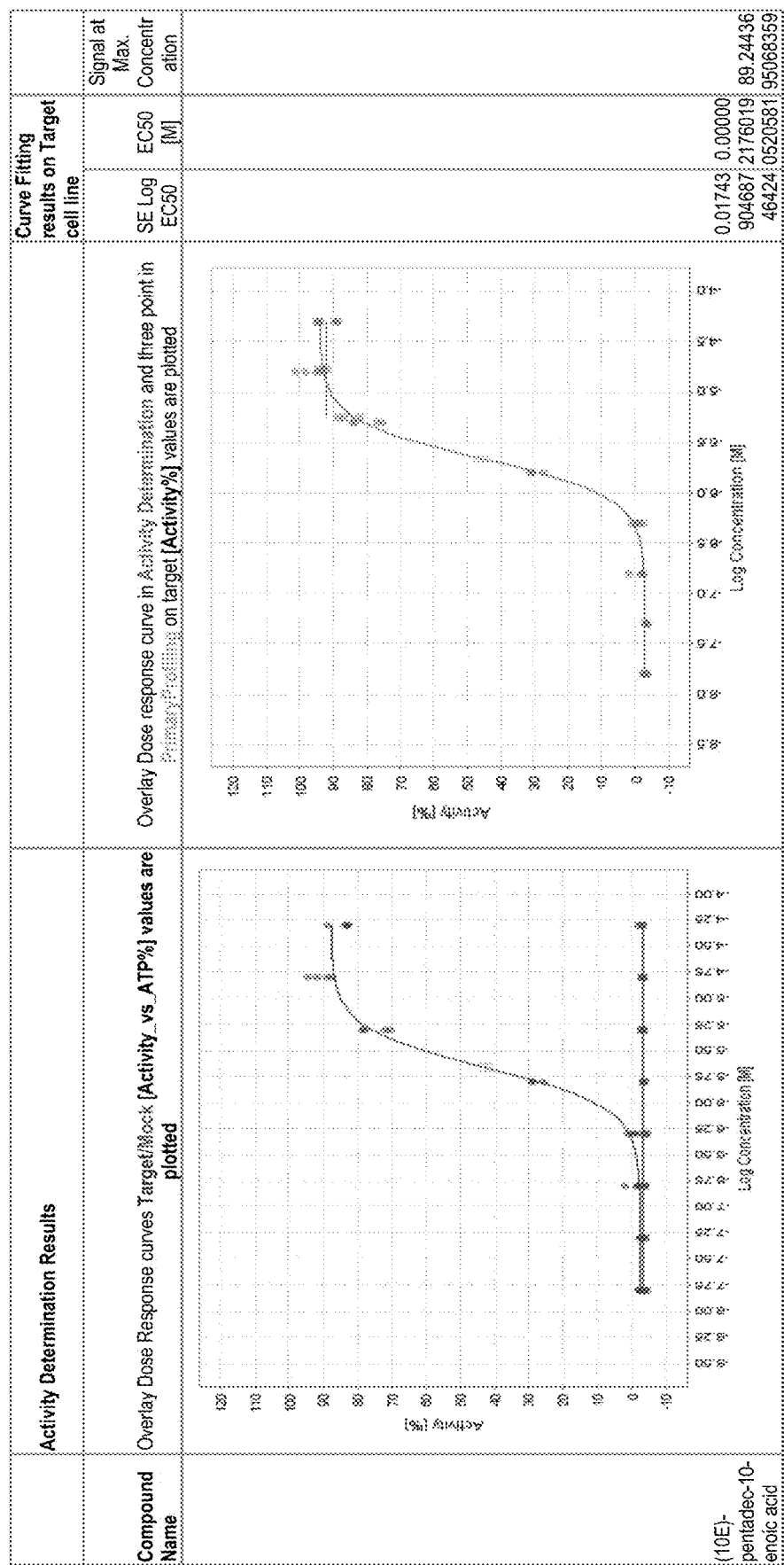
Figure 2J:
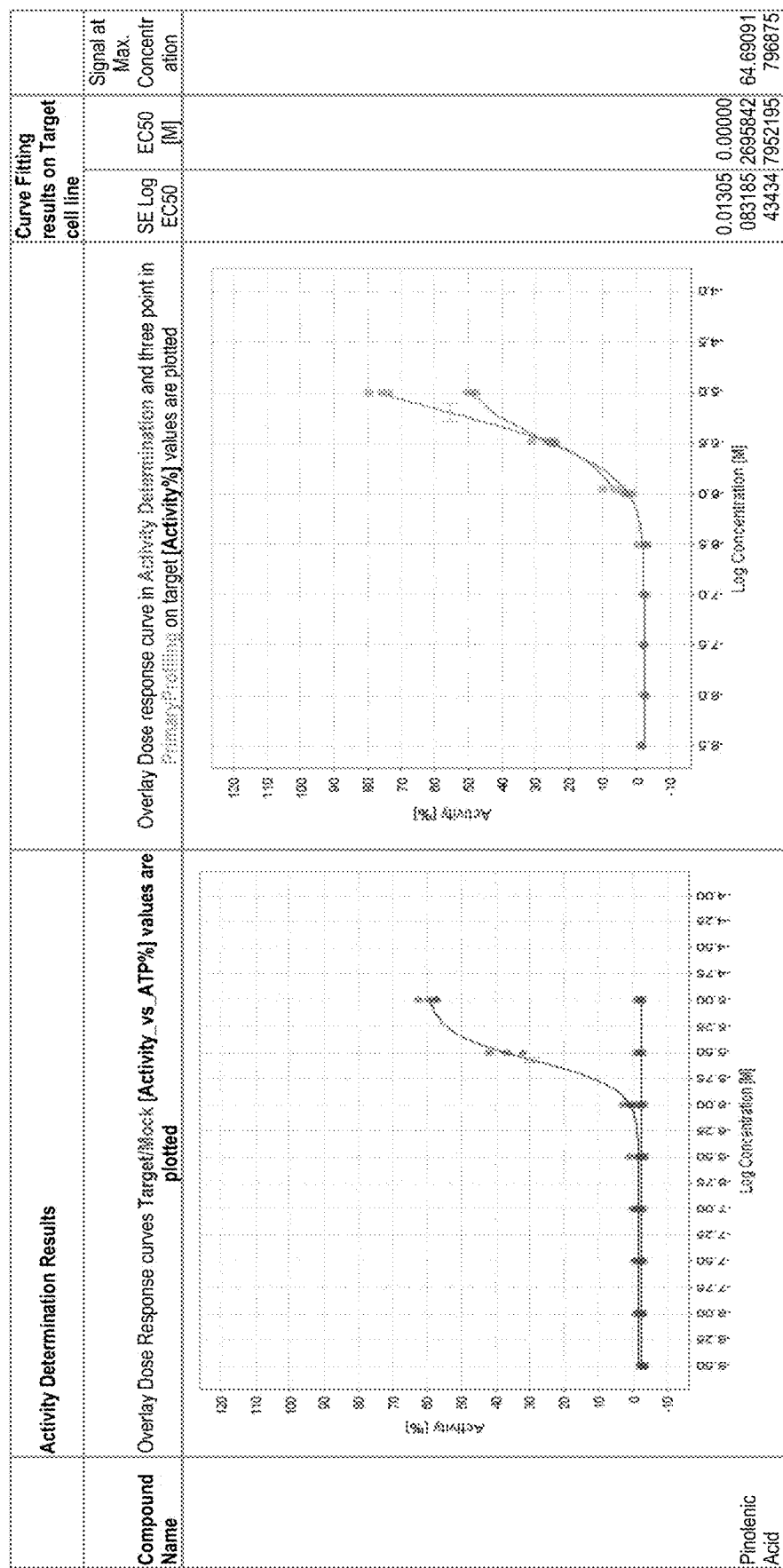
Figure 2K:
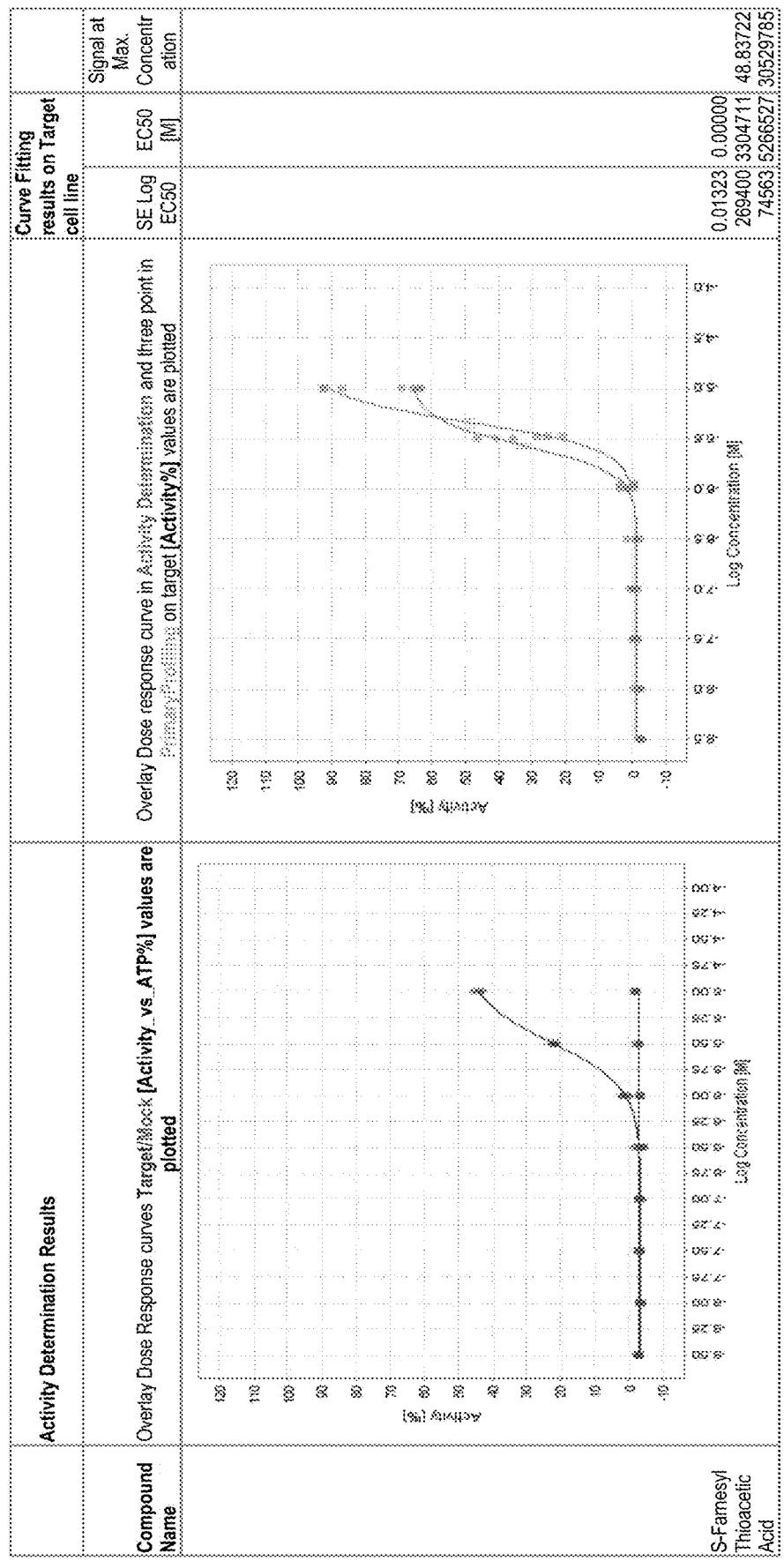
Figure 2L:
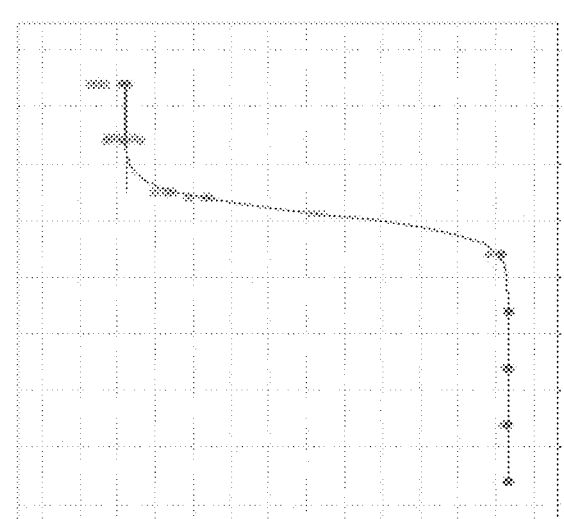
Figure 2M:
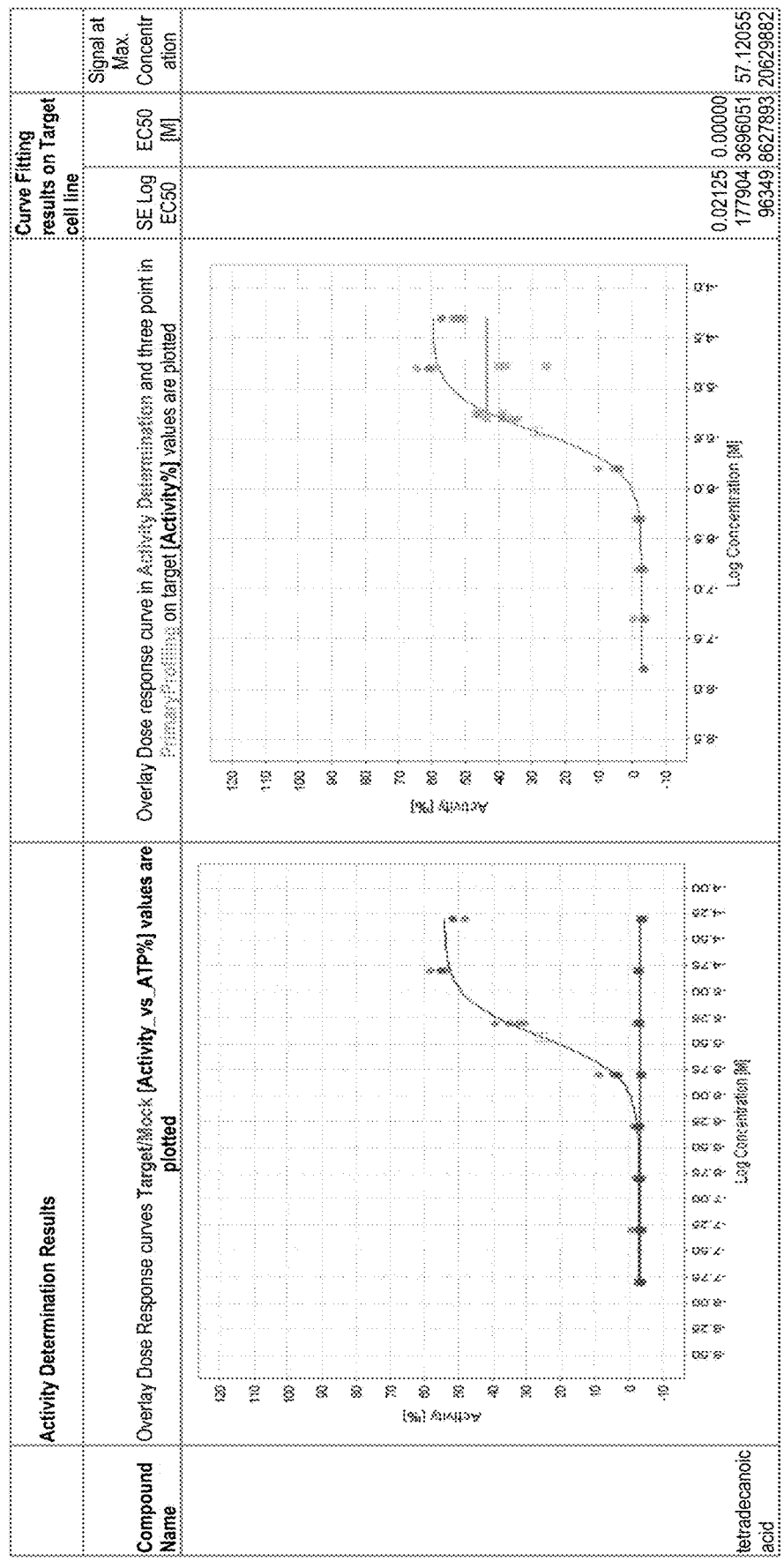
Figure 2N:
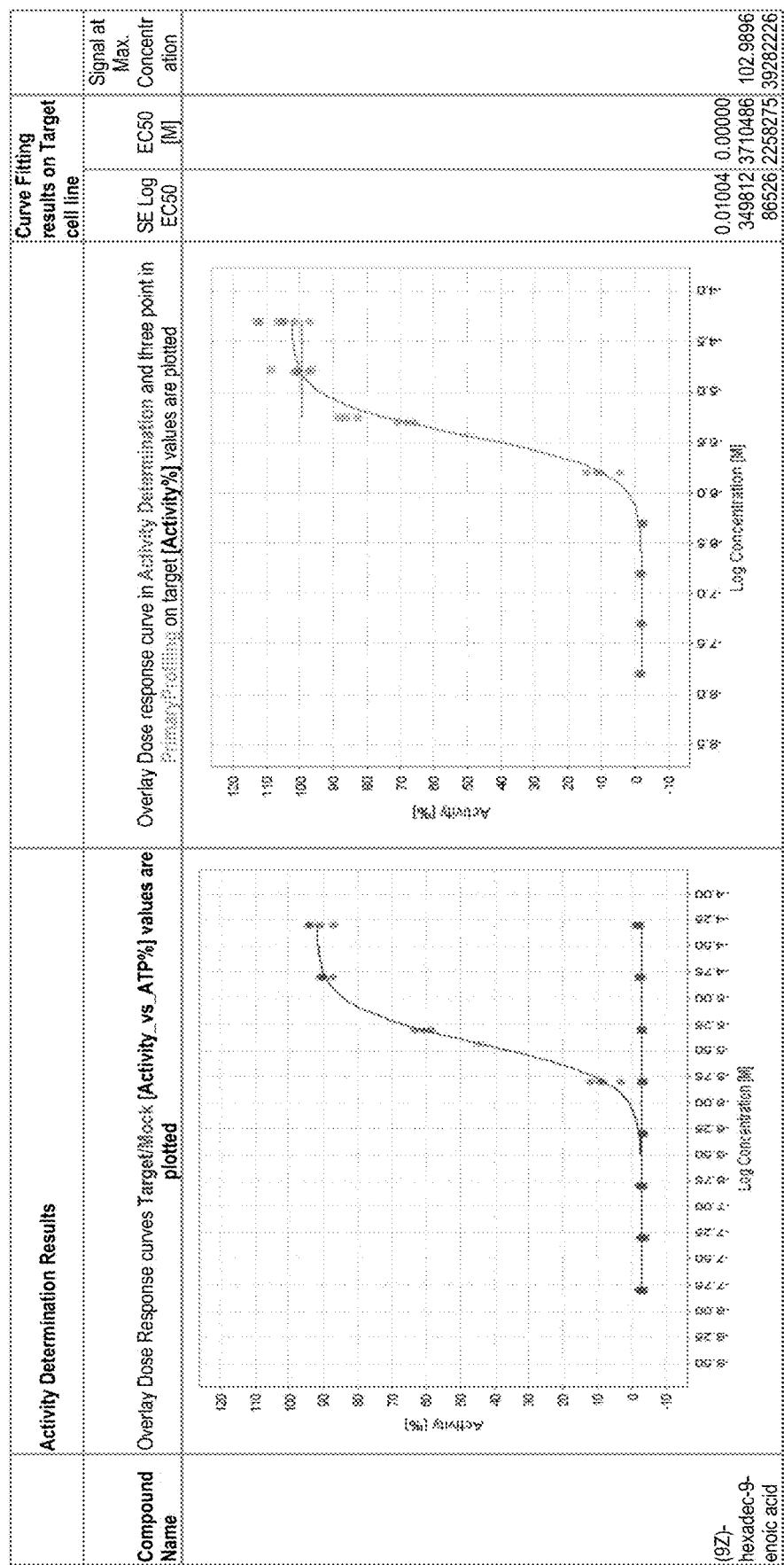
Figure 20:
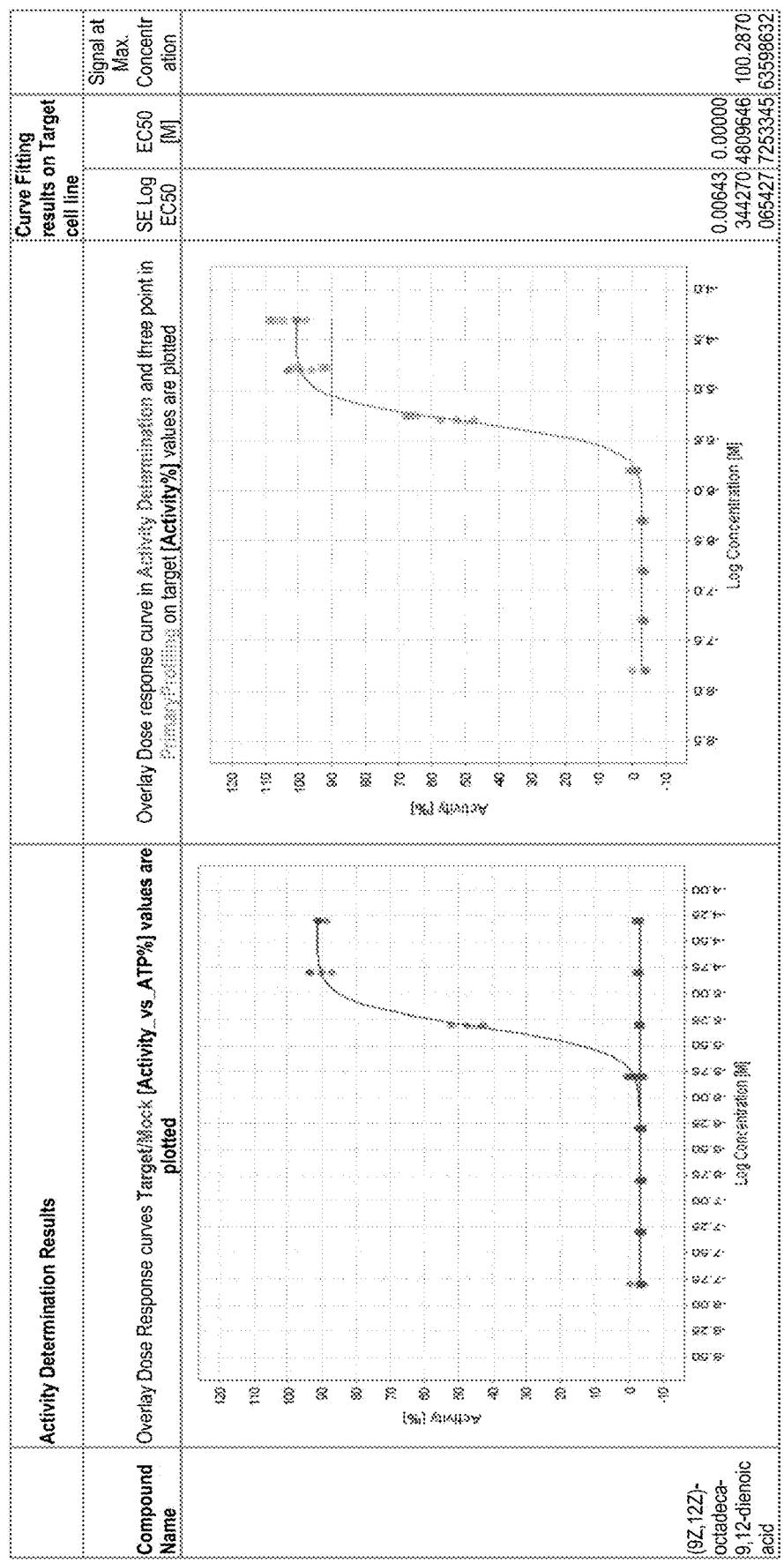
Figure 2P:
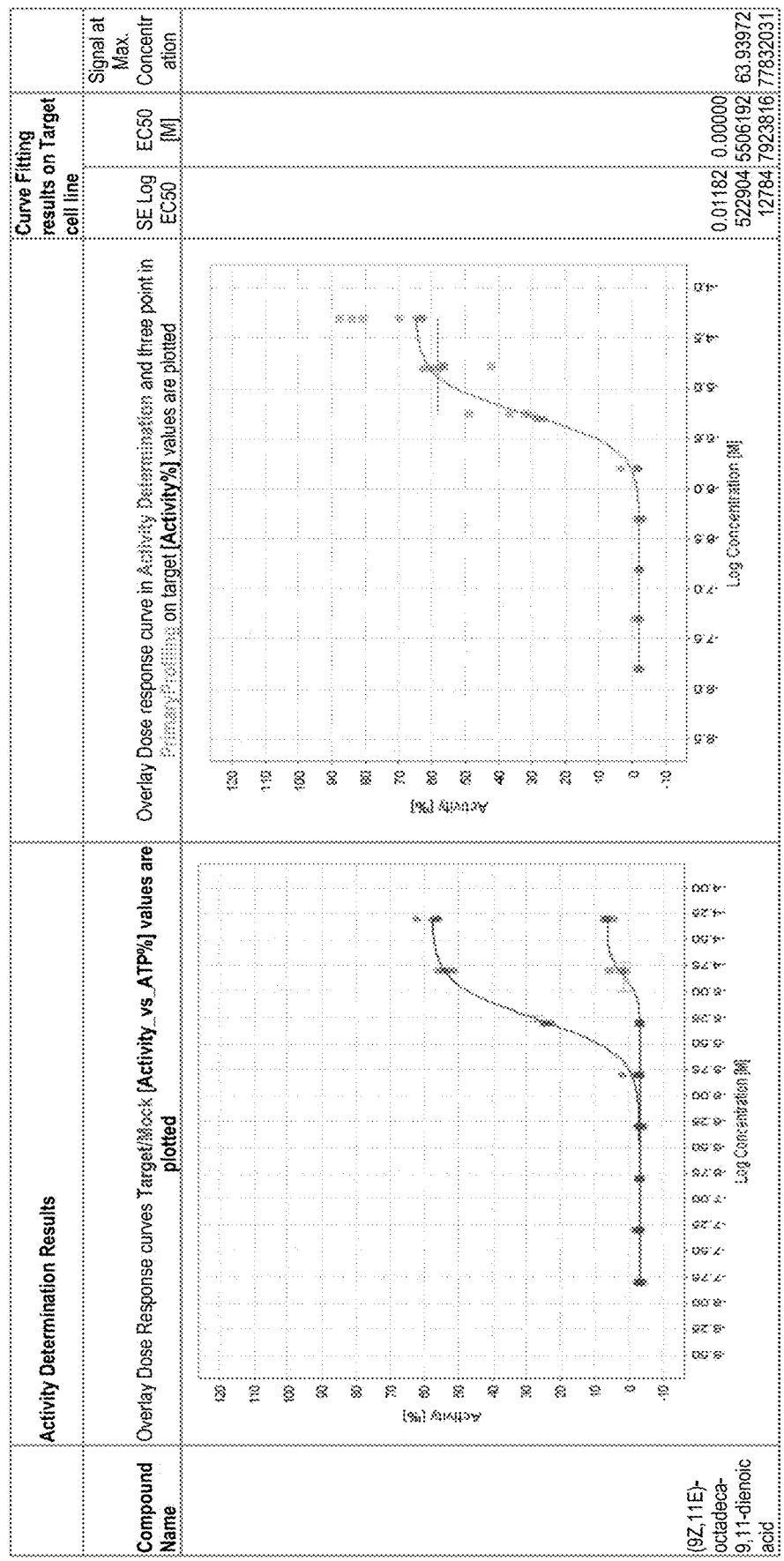
Figure 2Q:
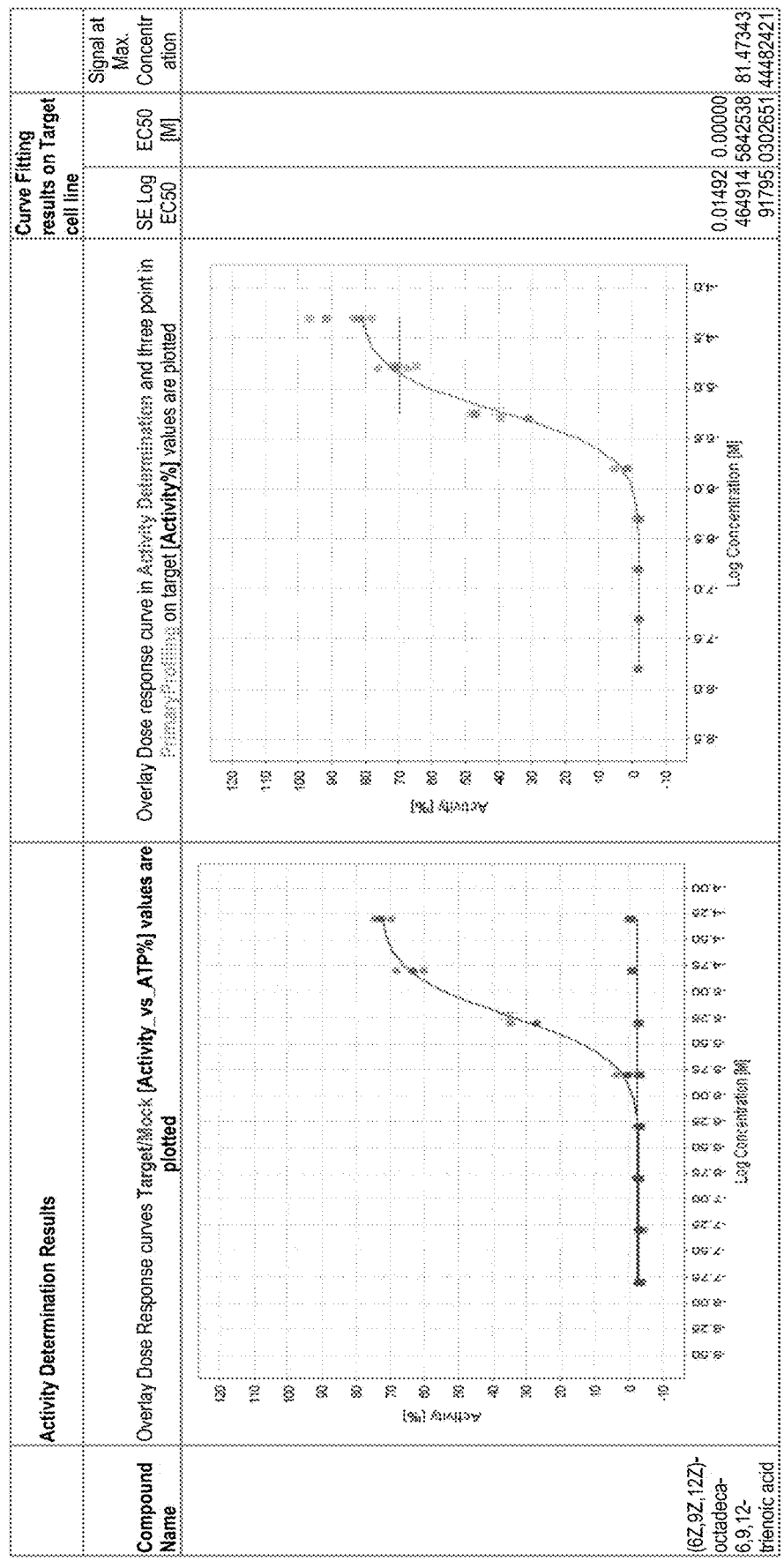
Figure 2R:
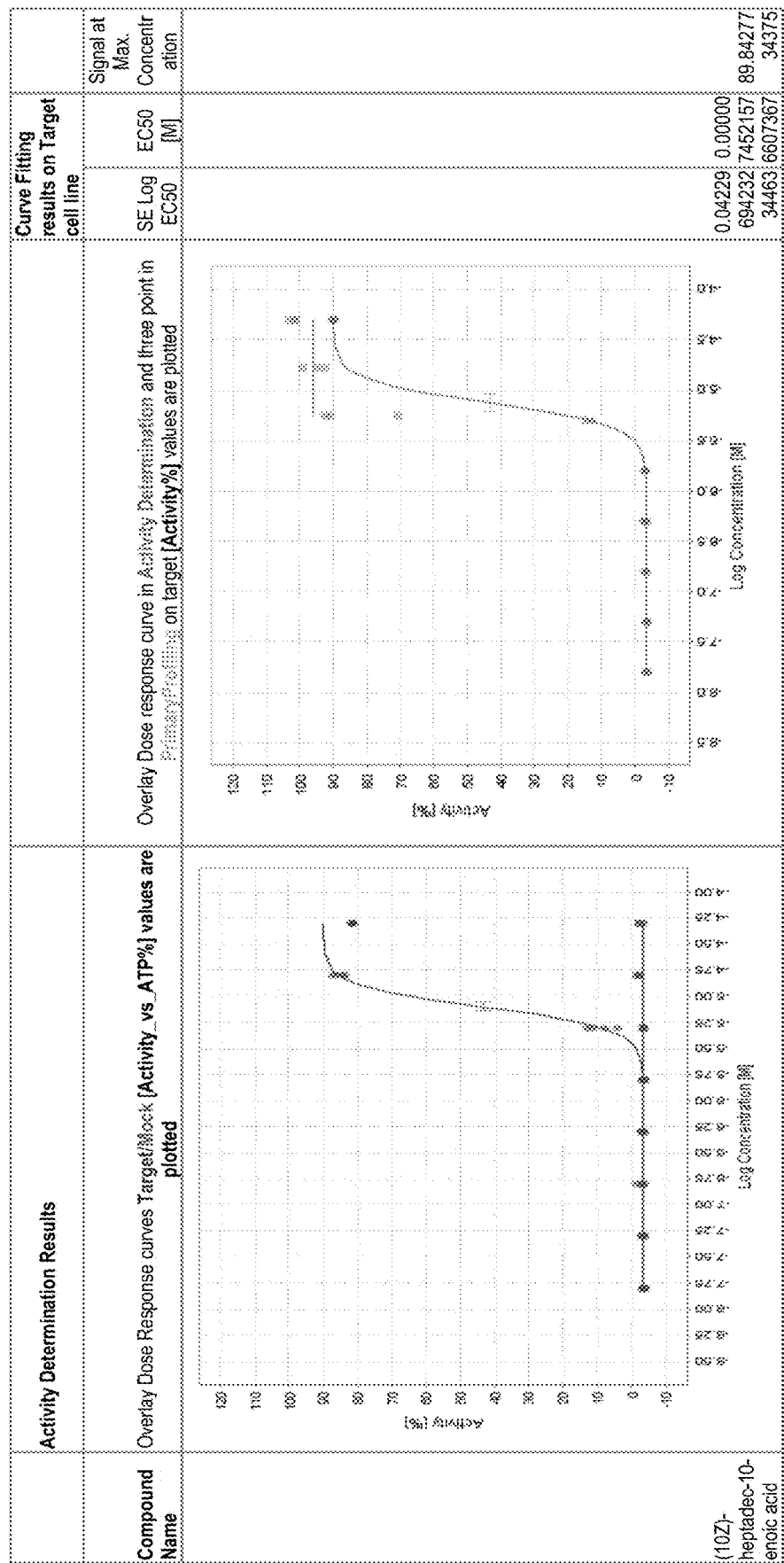
Figure 2S:
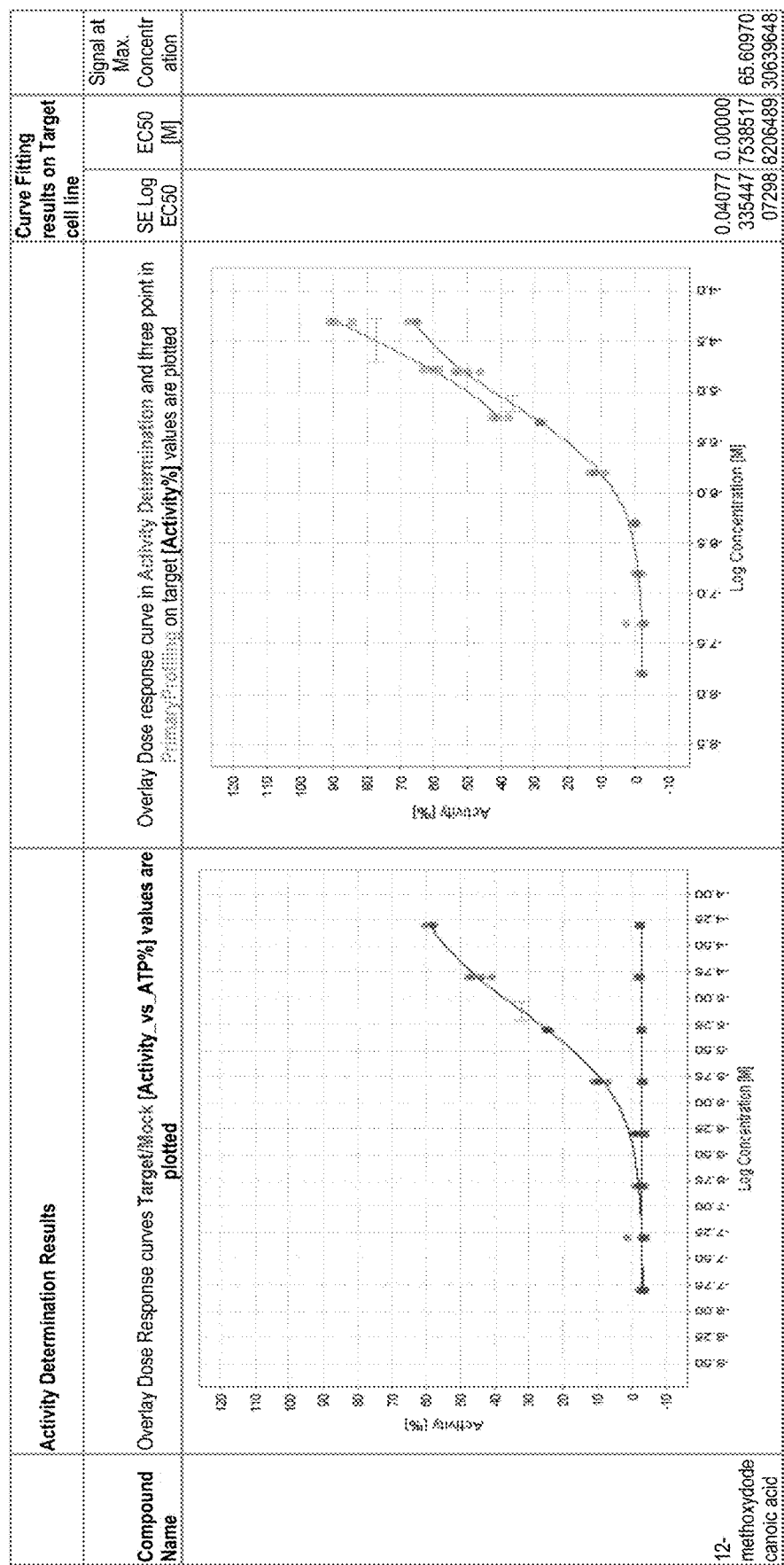
Figure 2T:
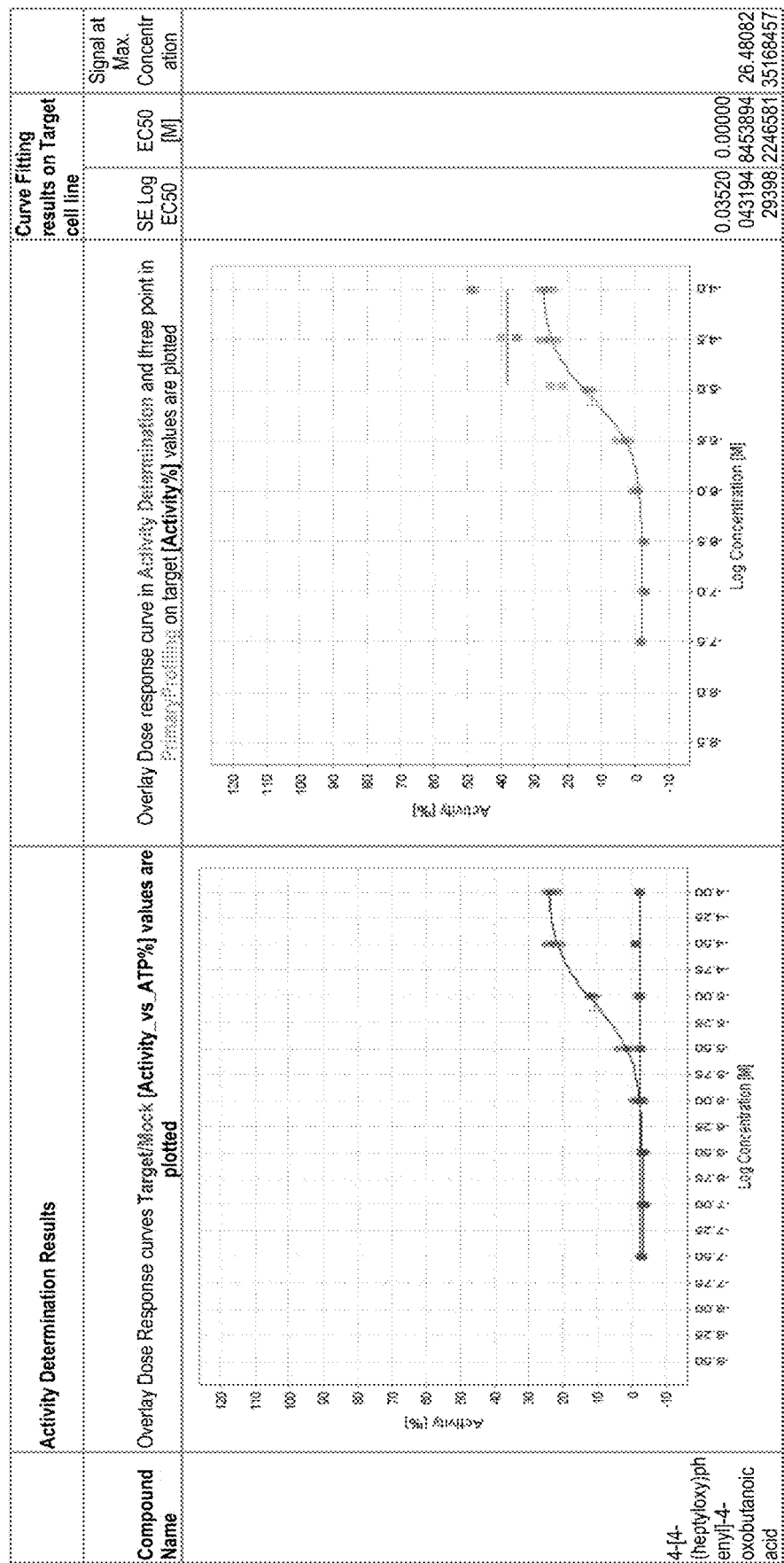
Figure 2U:
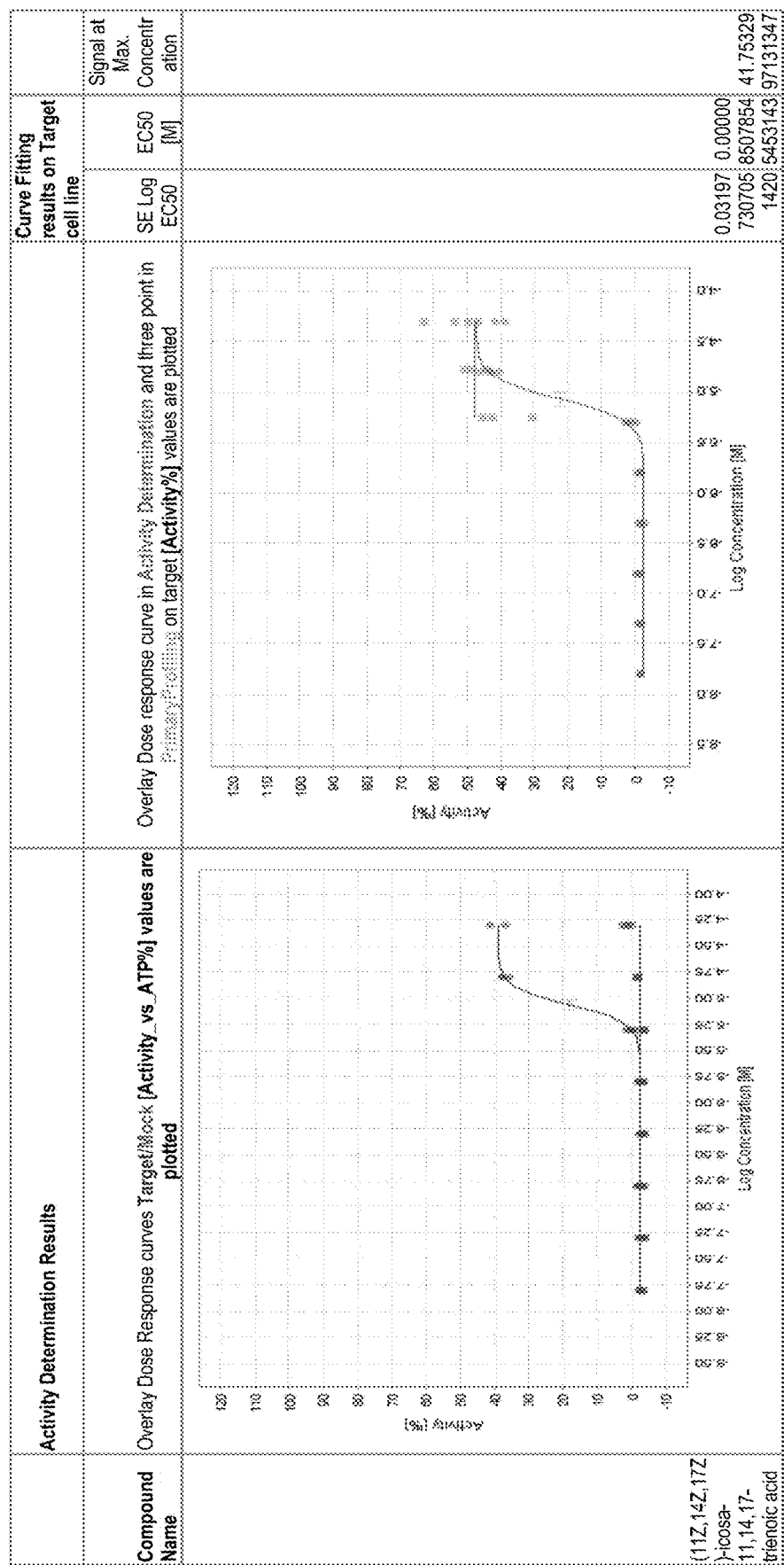
Figure 2V:
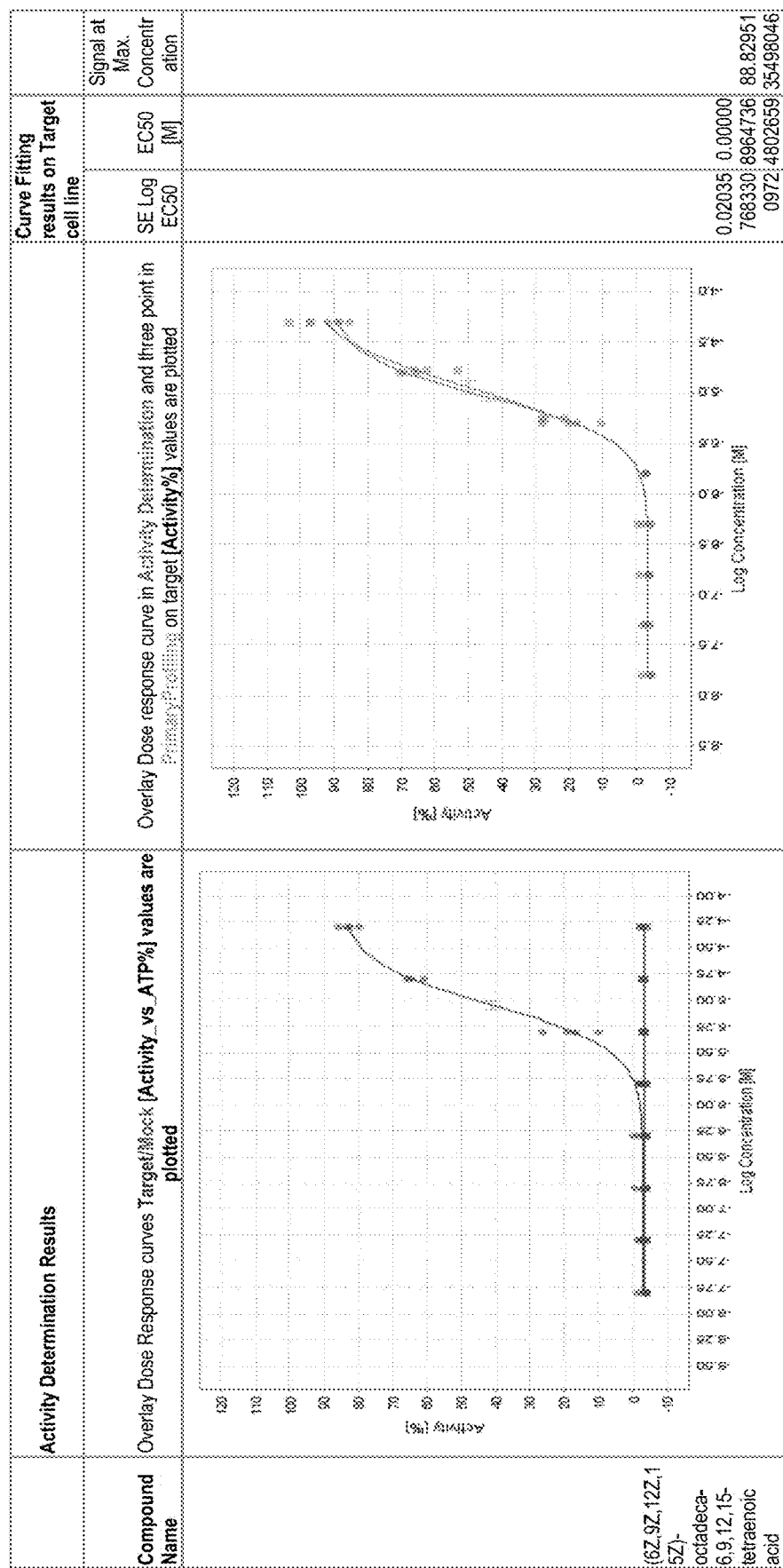
Figure 2W:
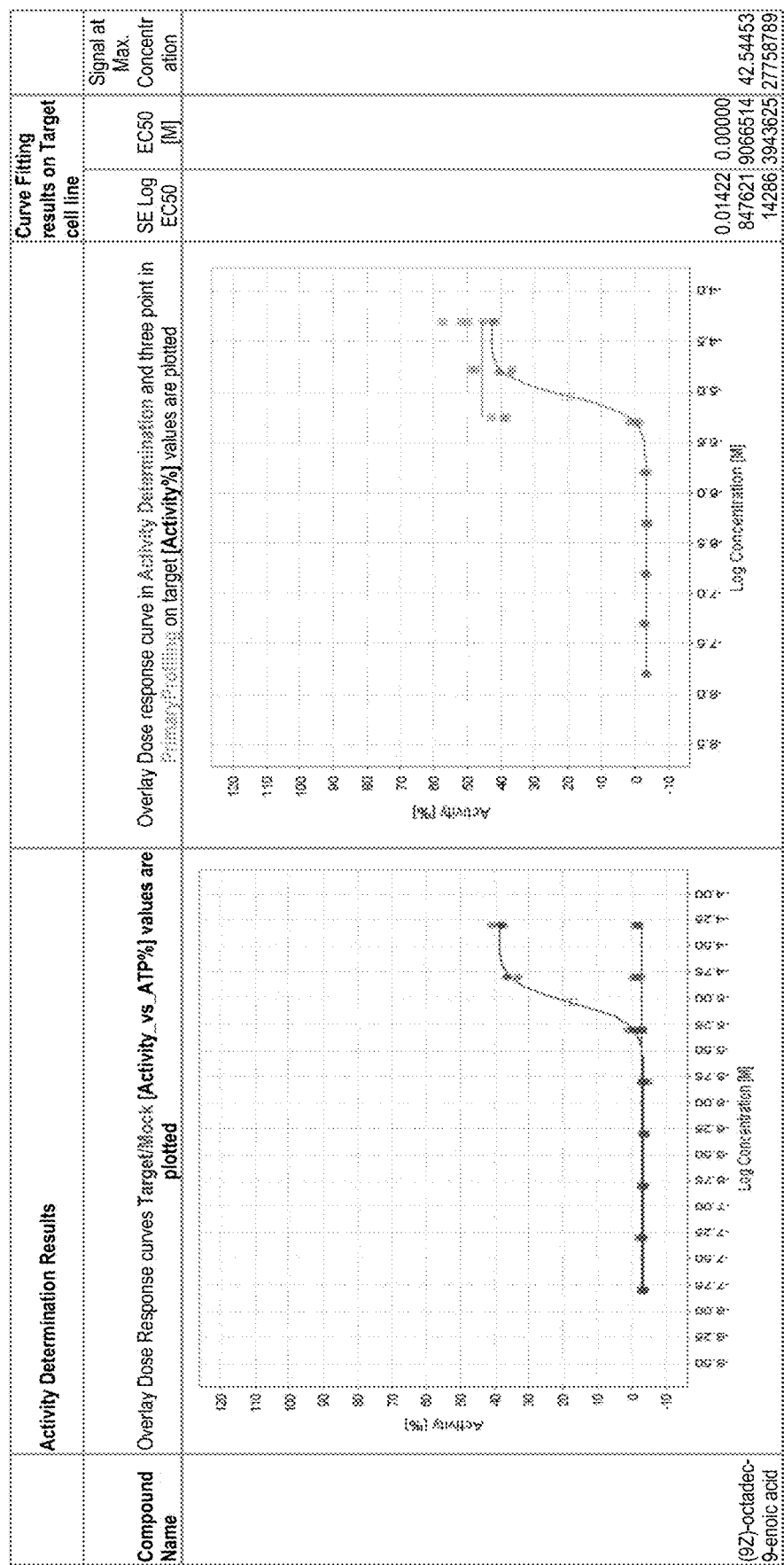
Figure 2X:
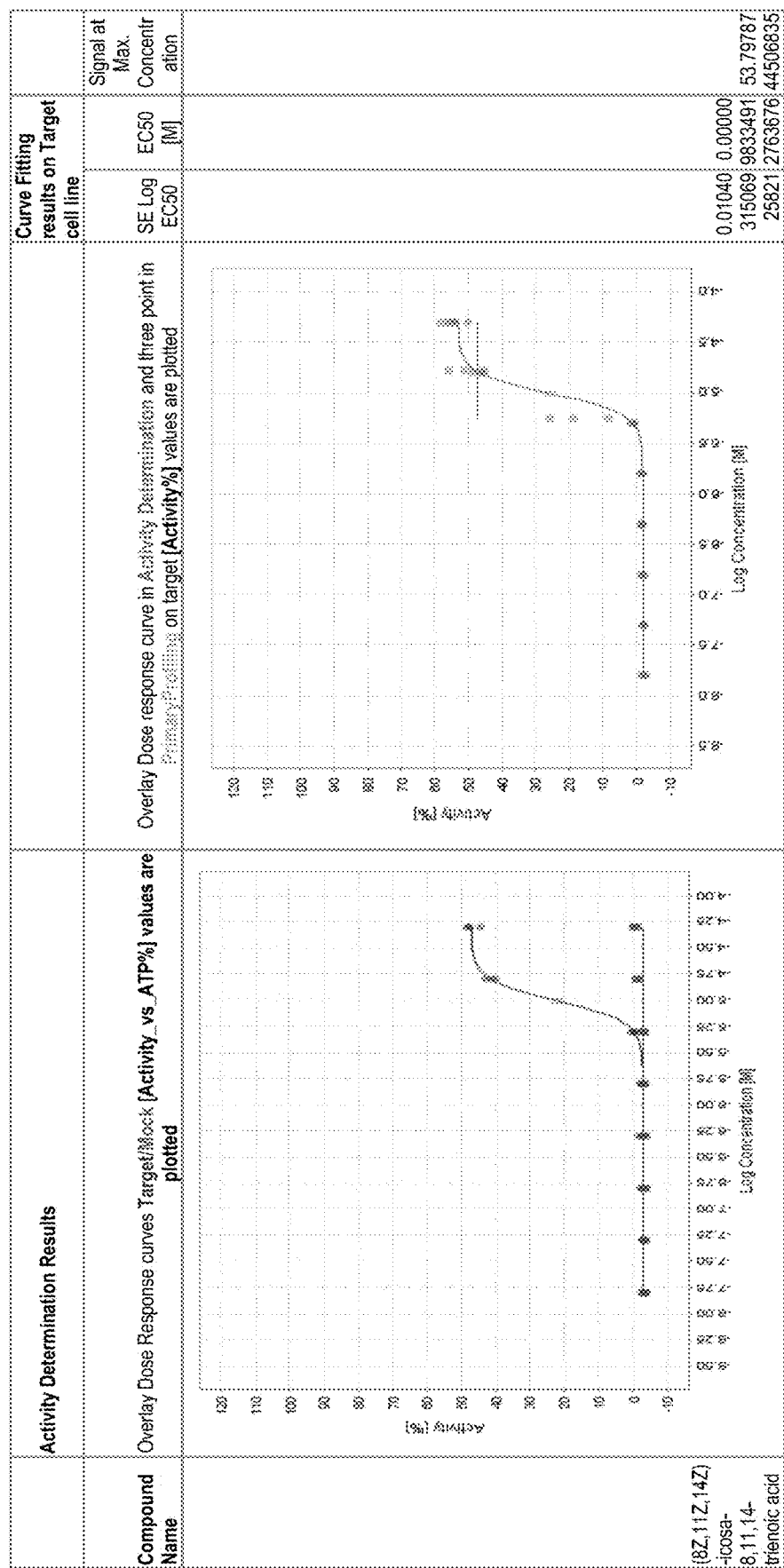
Figure 2Y:
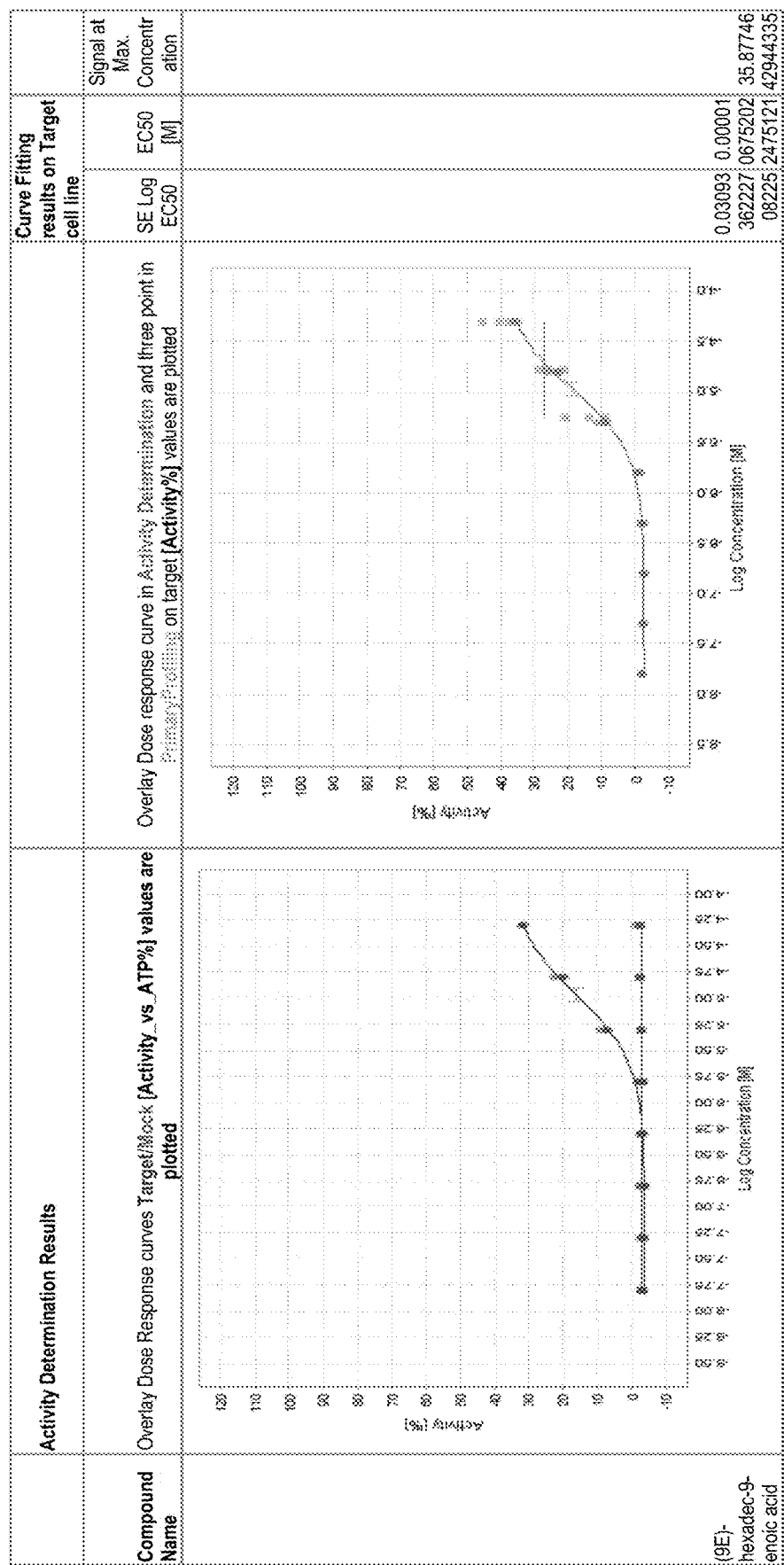
Figure 2Z:
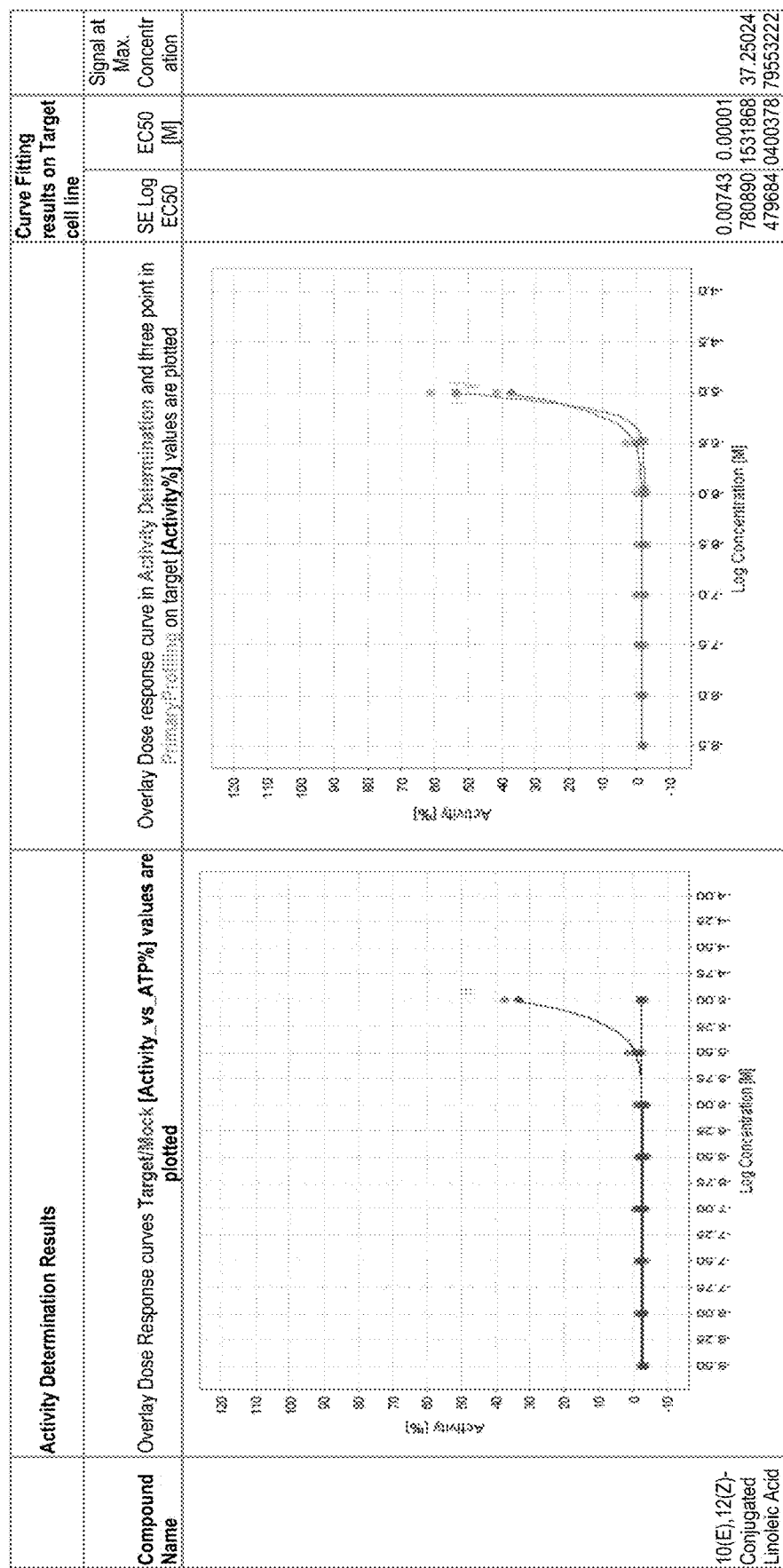
Figure 2A:
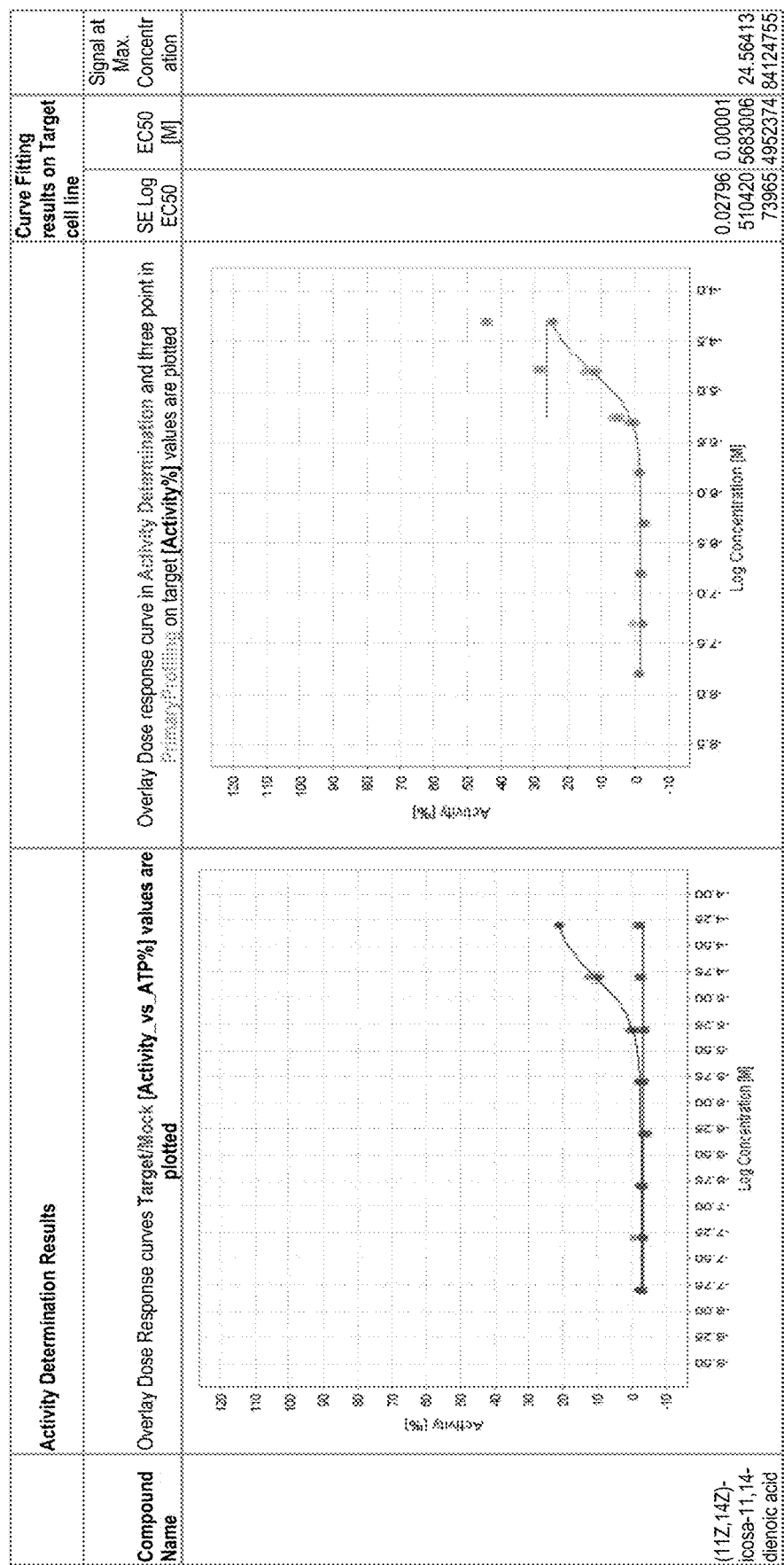
Figure 2A:
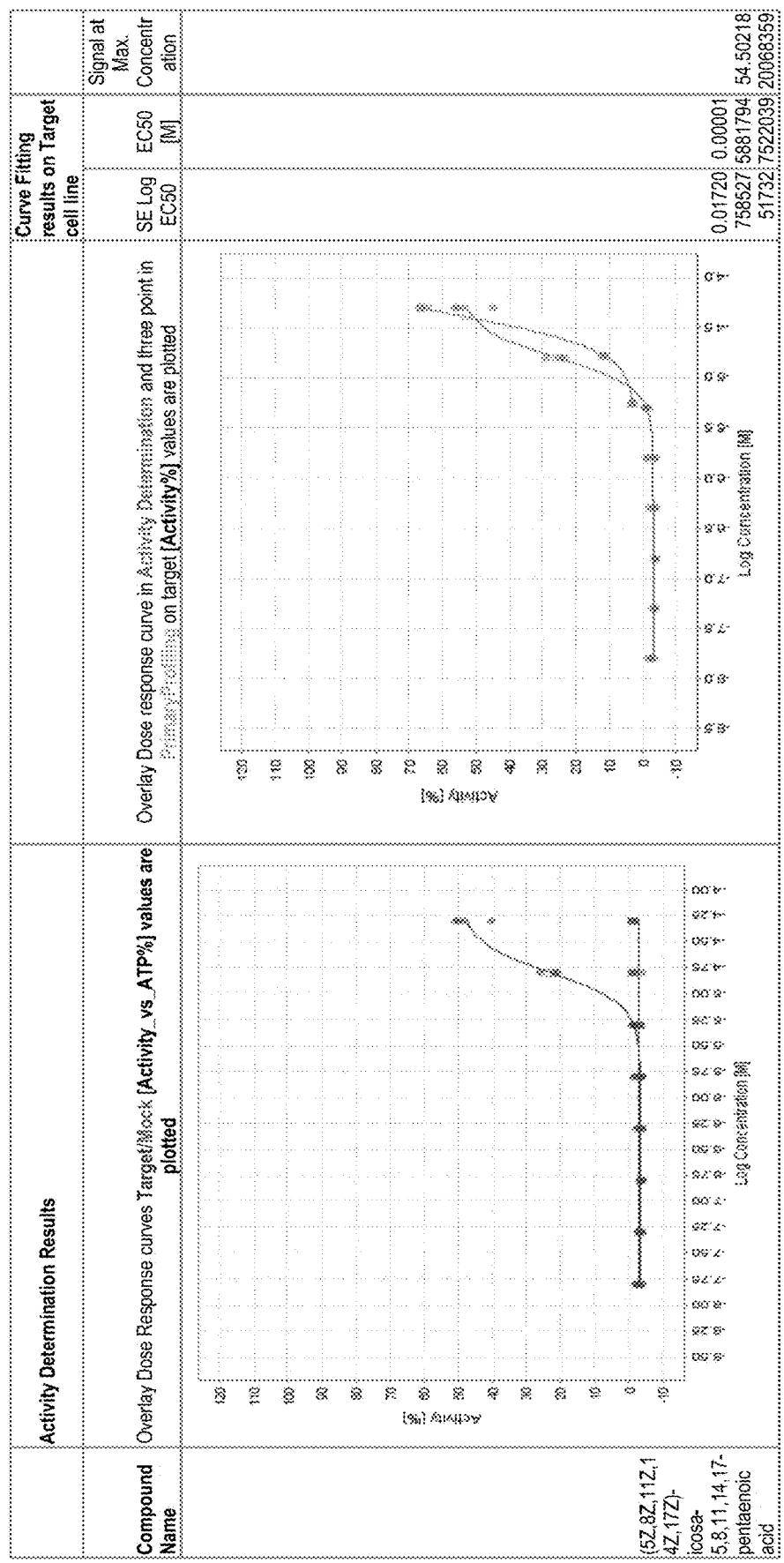
Figure 2A:
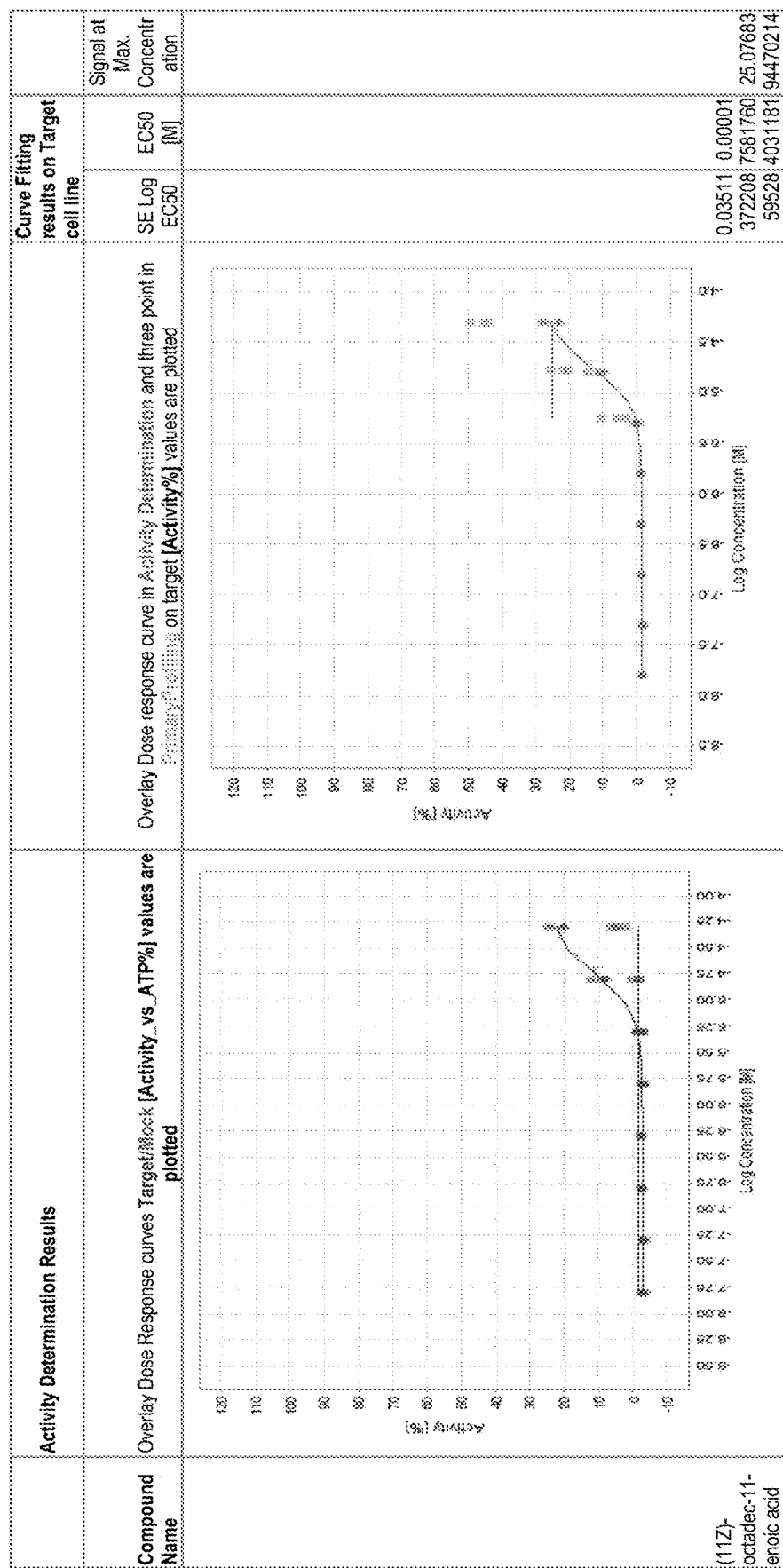
Figure 2A:
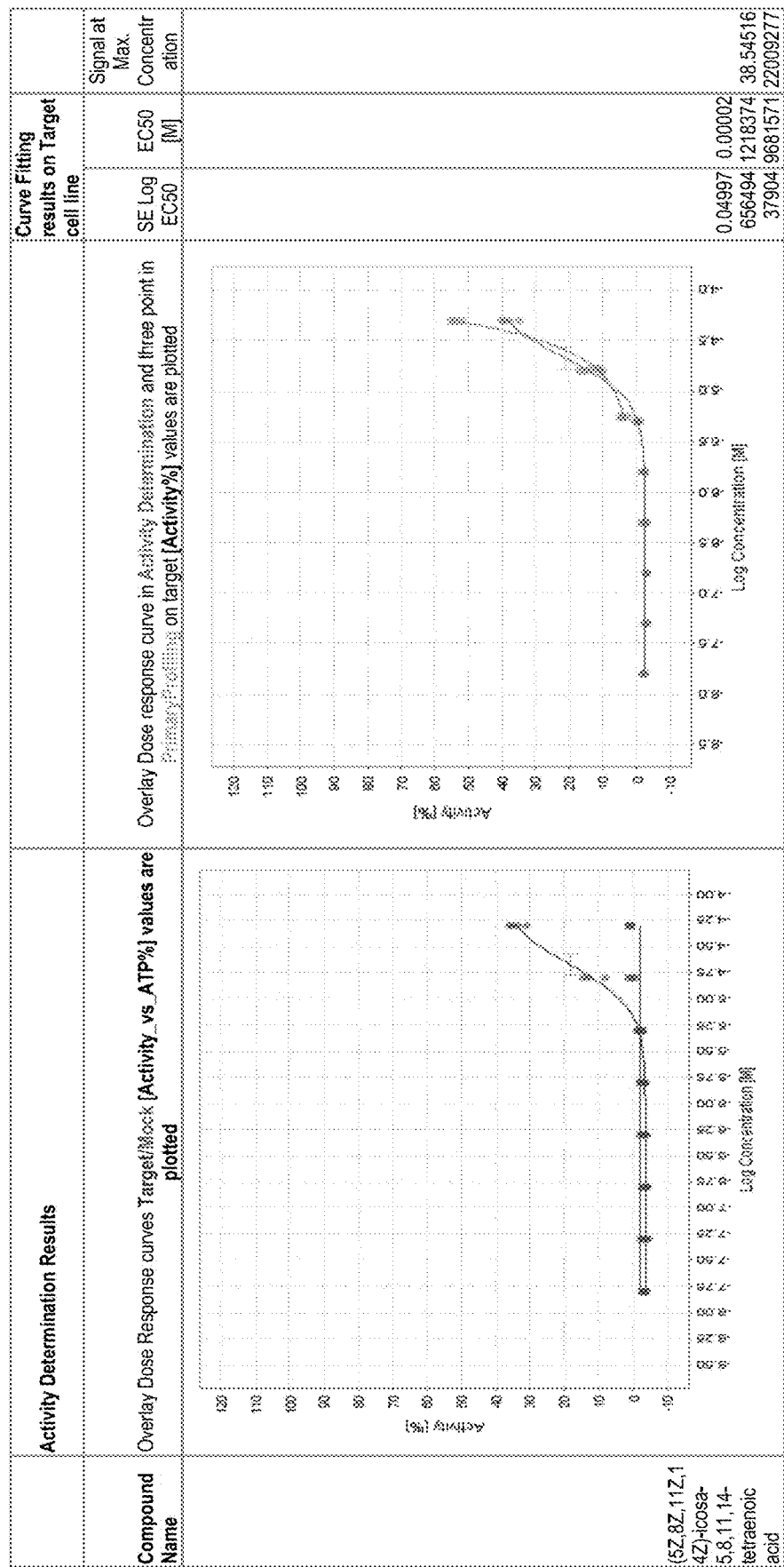
Figure 2A:
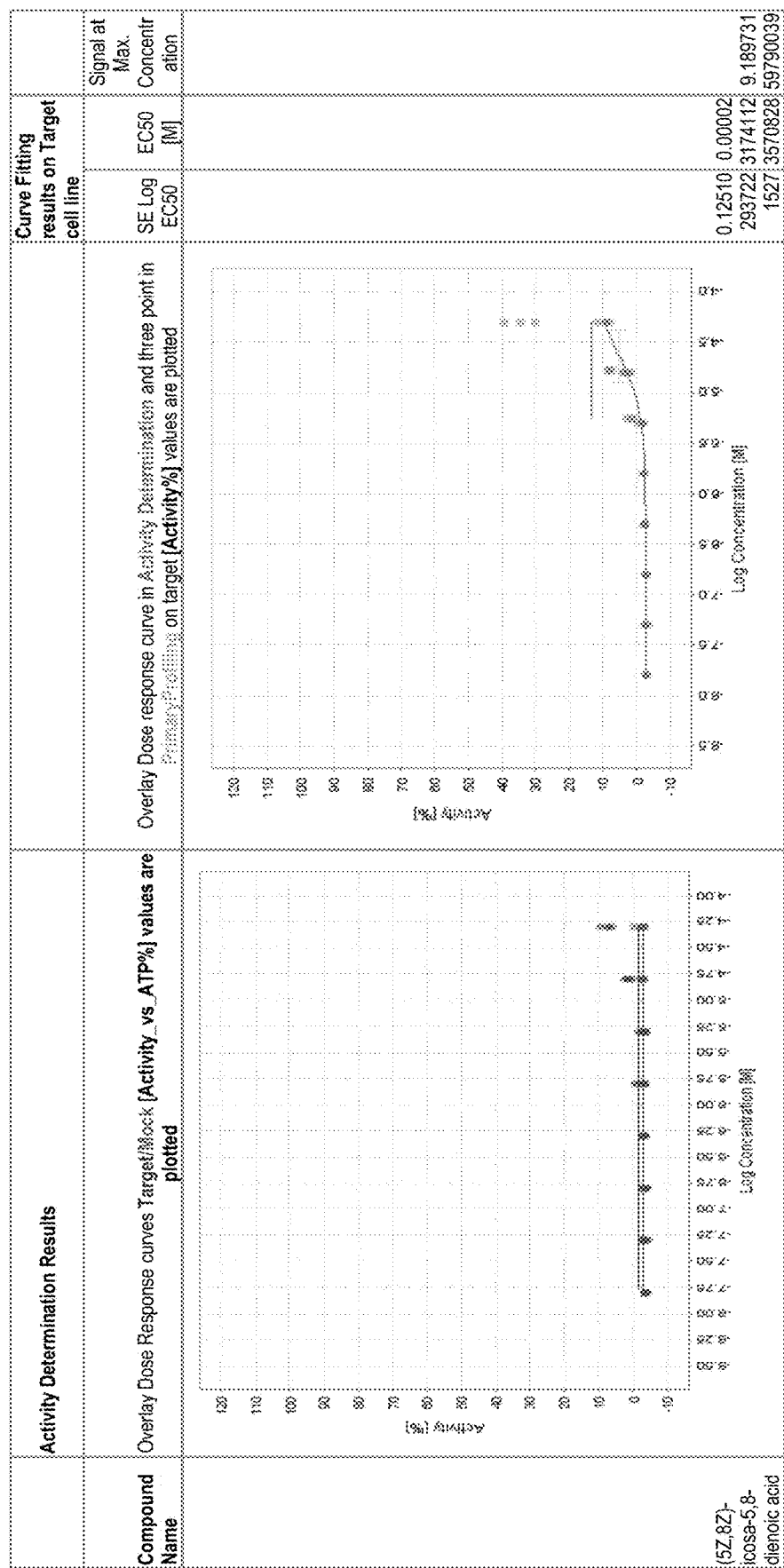
Figure 2A:
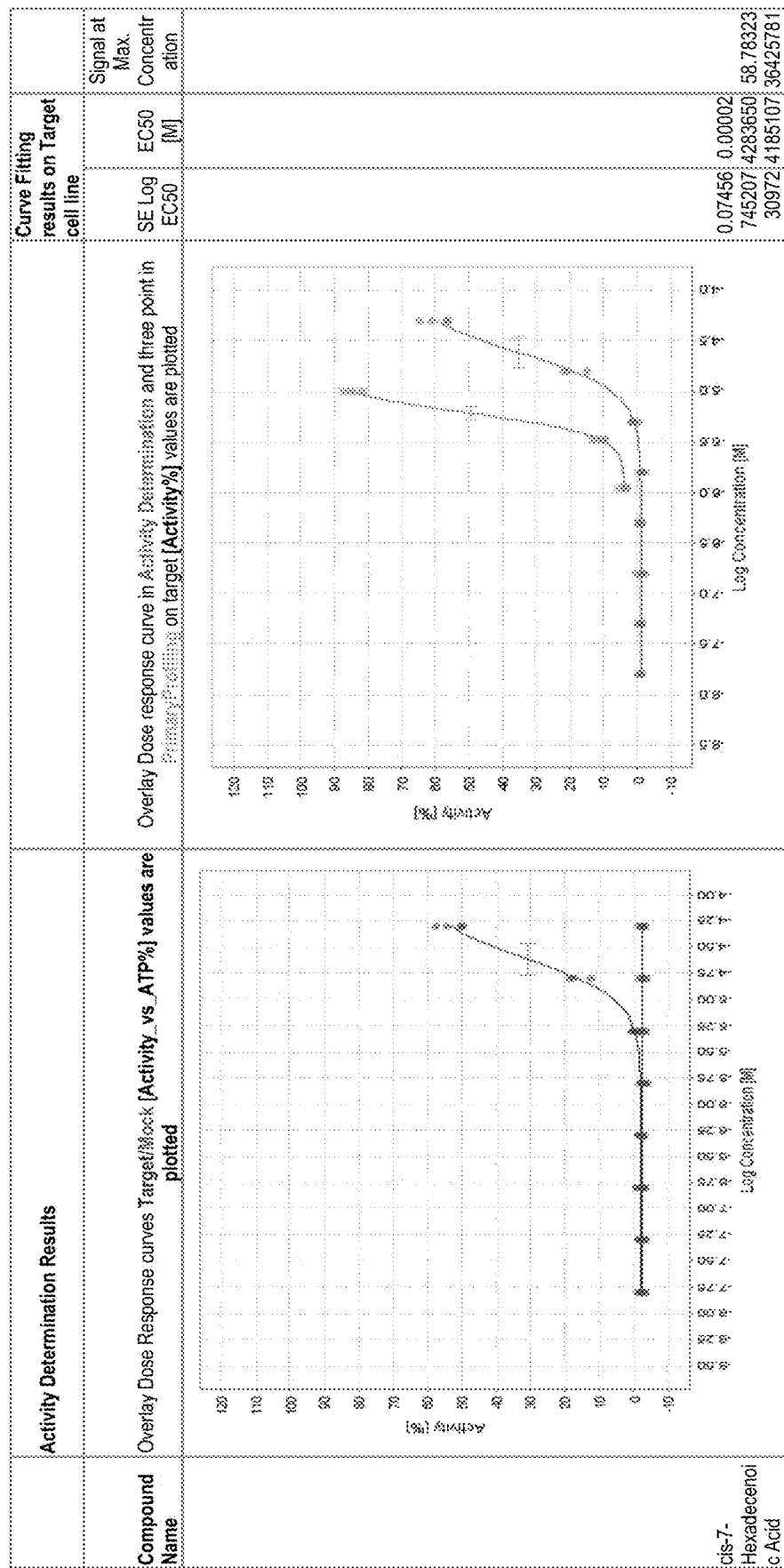
Figure 2A:
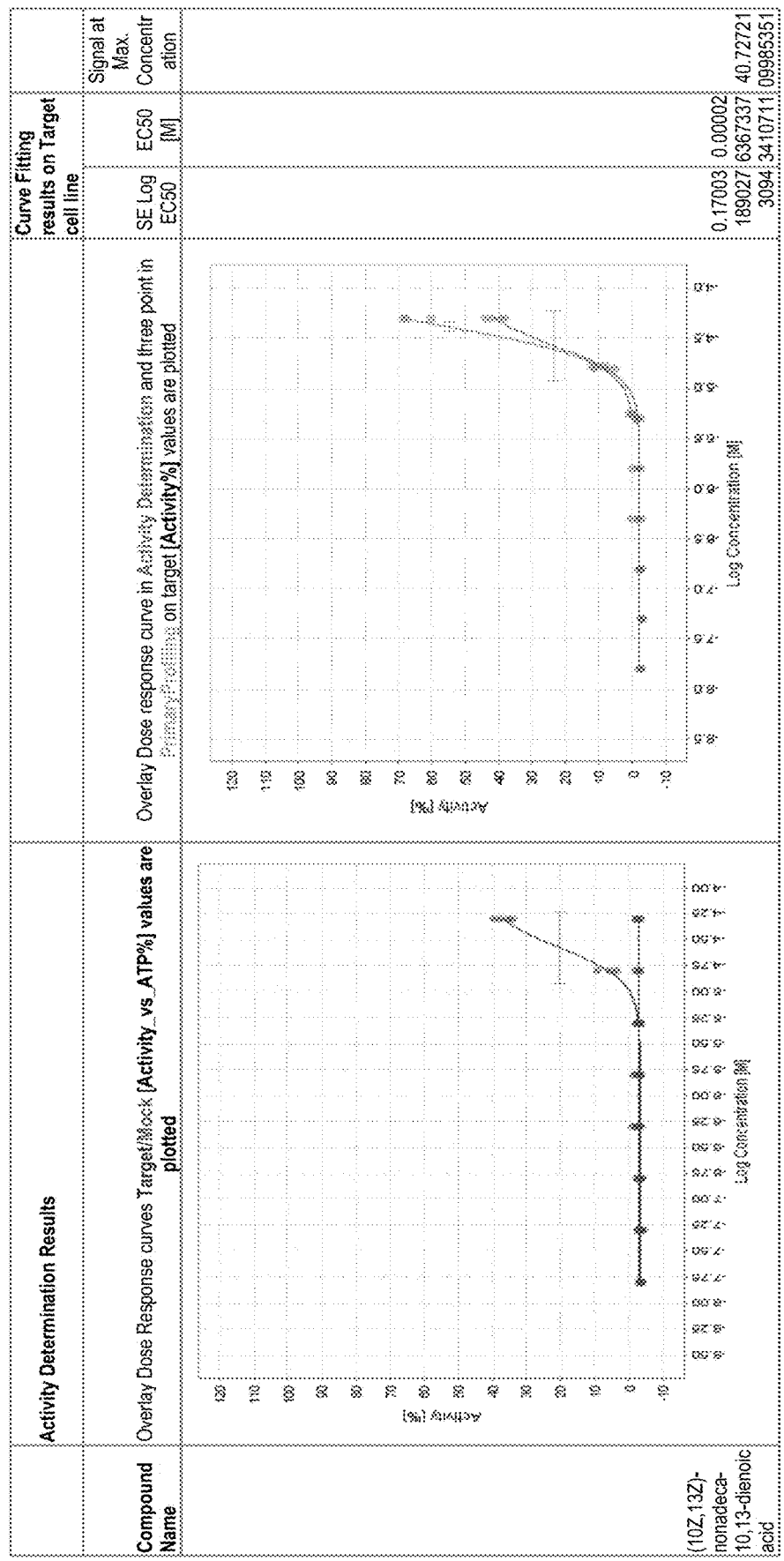
Figure 2A:
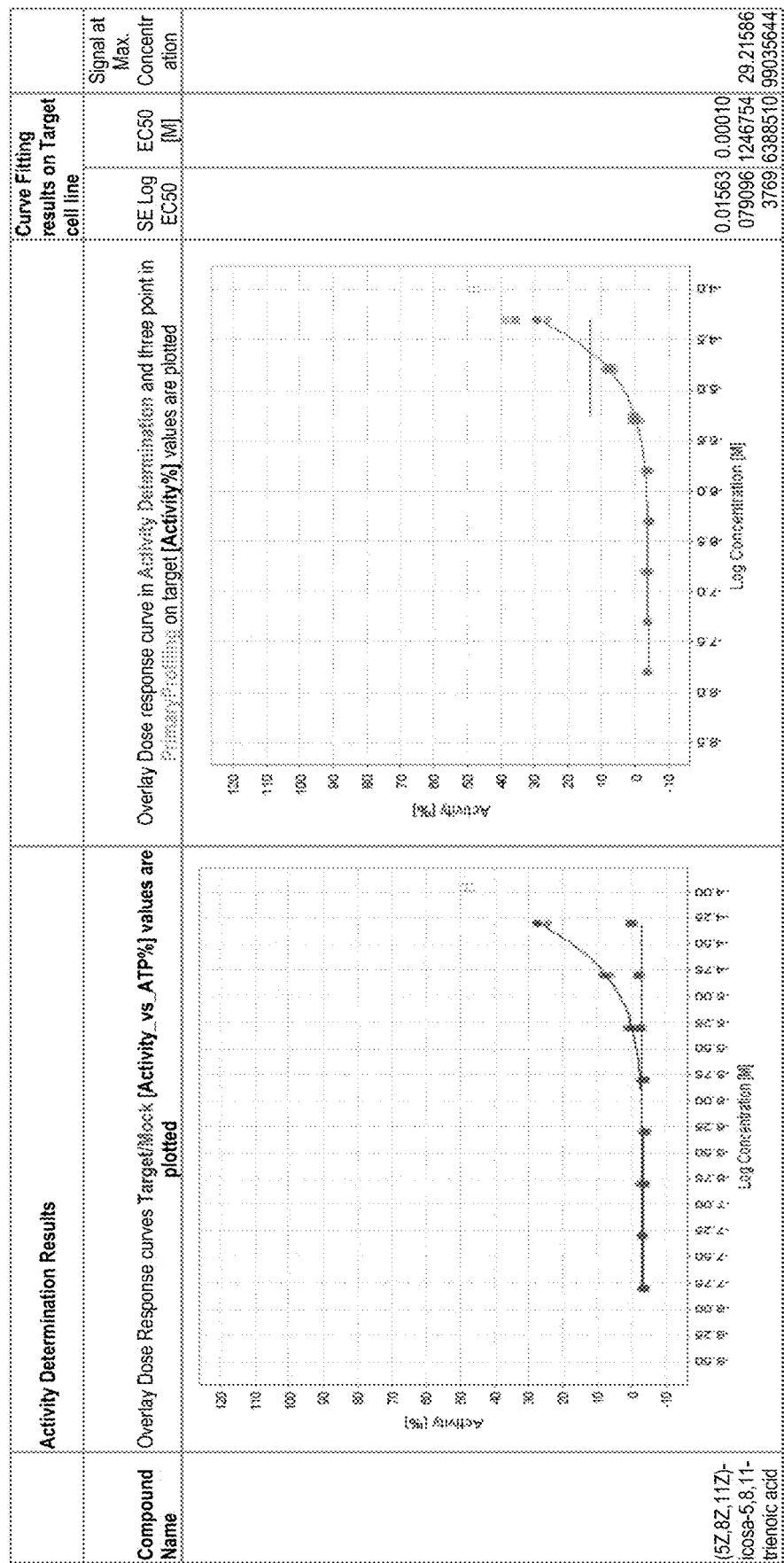
Figure 4A:
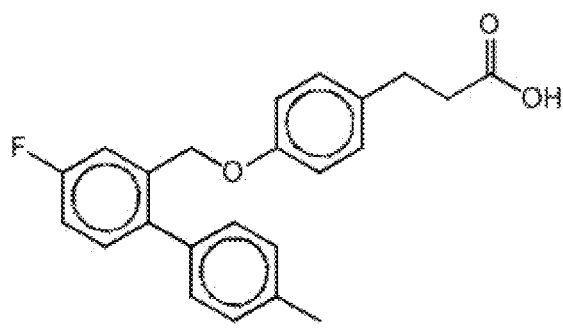
FIGS. 4A-4C show the in silico modeling of the binding of compound 3-(4-((4-fluoro-4'-methylbiphenyl-2-yl) methoxy)phenyl)propanoic acid (also known as TUG891) to fGPR120.
Figure 4B:
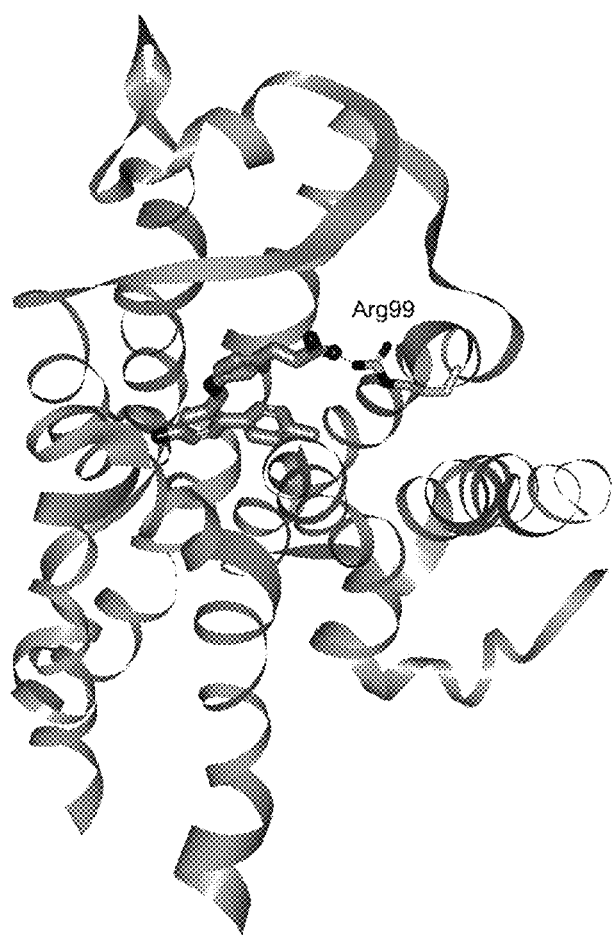
Figure 4C:
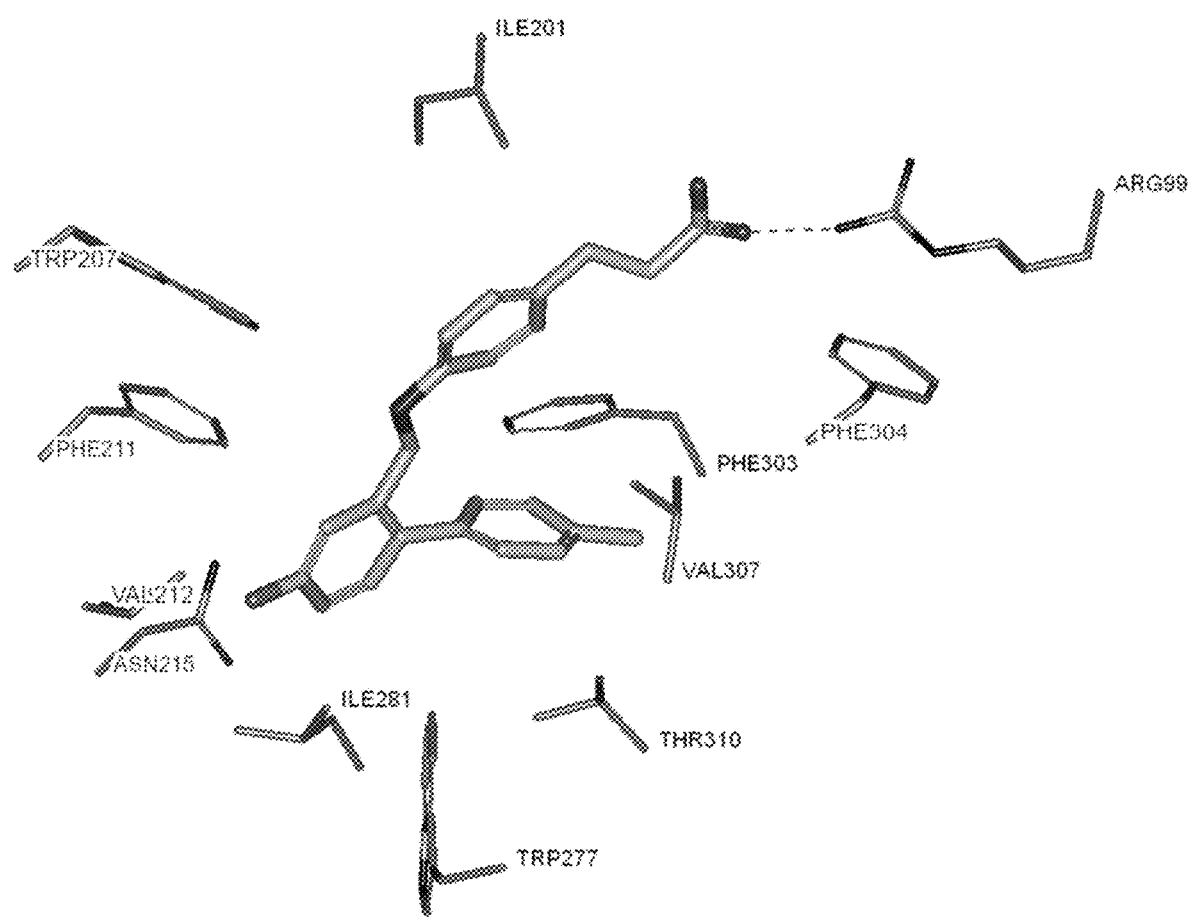
Figure 5A:
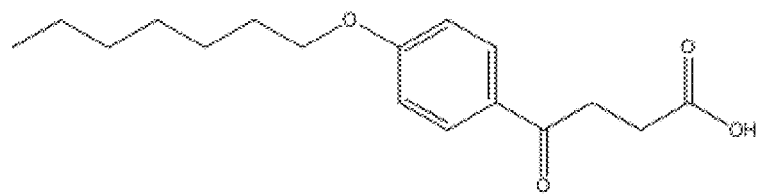
FIGS. 5A-5C show the in silico modeling of the binding of compound 4-[4-(heptyloxy)phenyl]-4-oxobutanoic acid to fGPR120.
Figure 5B:
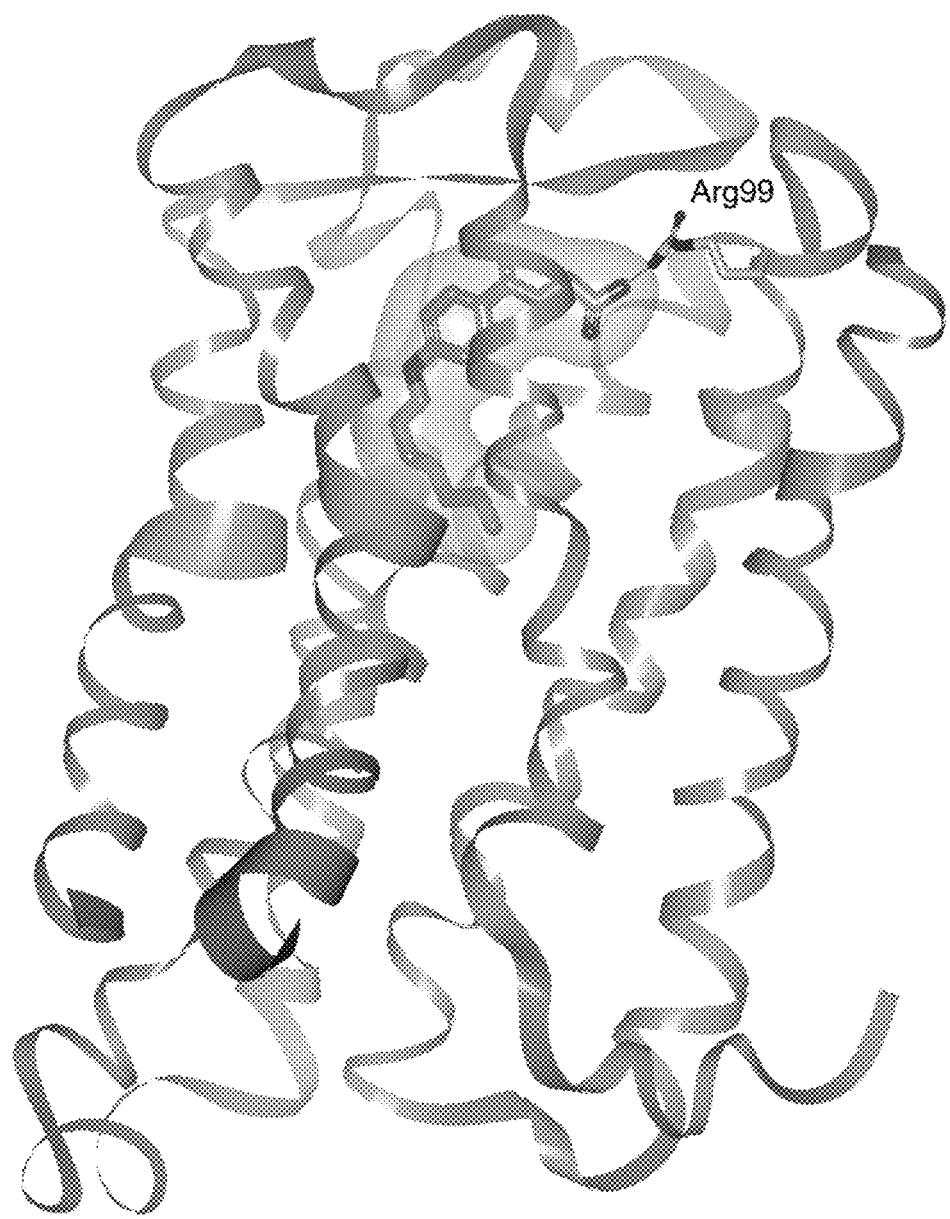
Figure 5C:
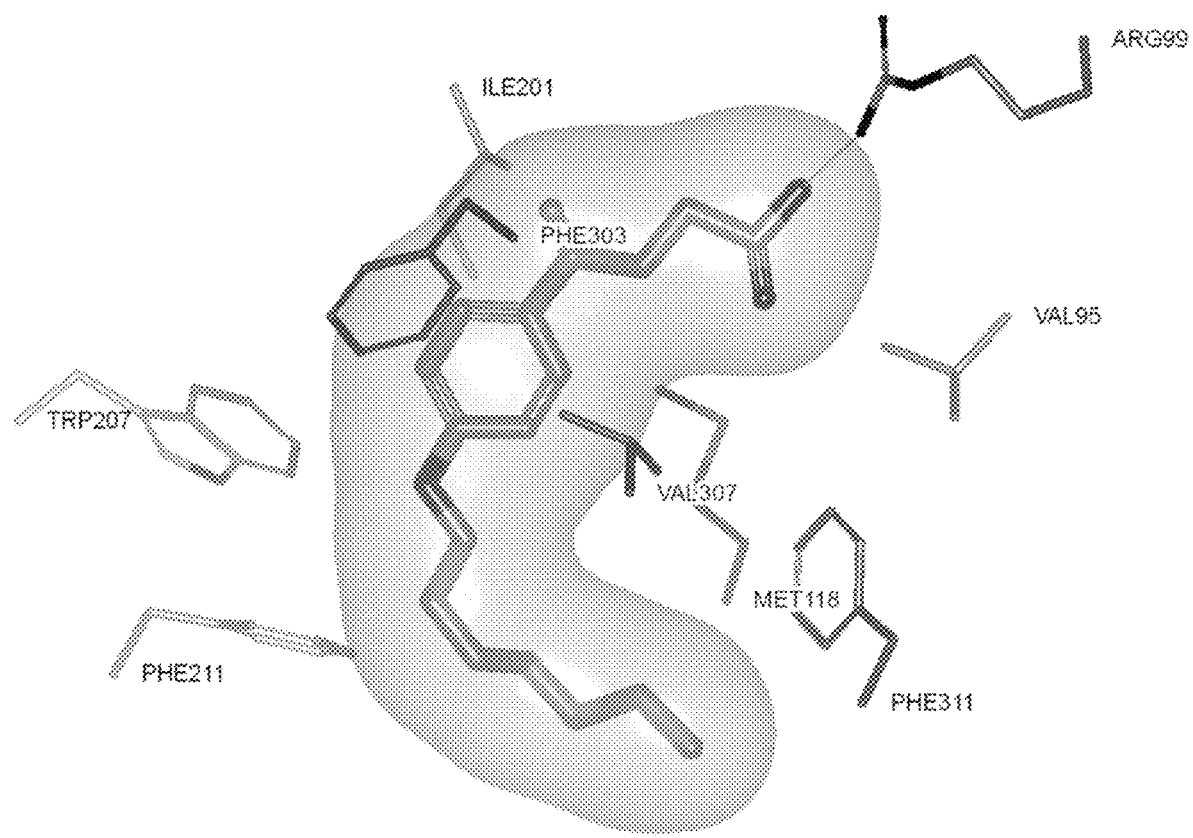
Figure 6A:
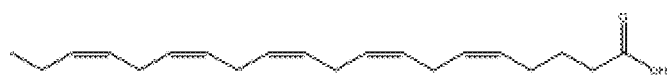
FIGS. 6A-6C show the in silico modeling of the binding of compound eicosapentanoic acid to fGPR120.
Figure 6B:
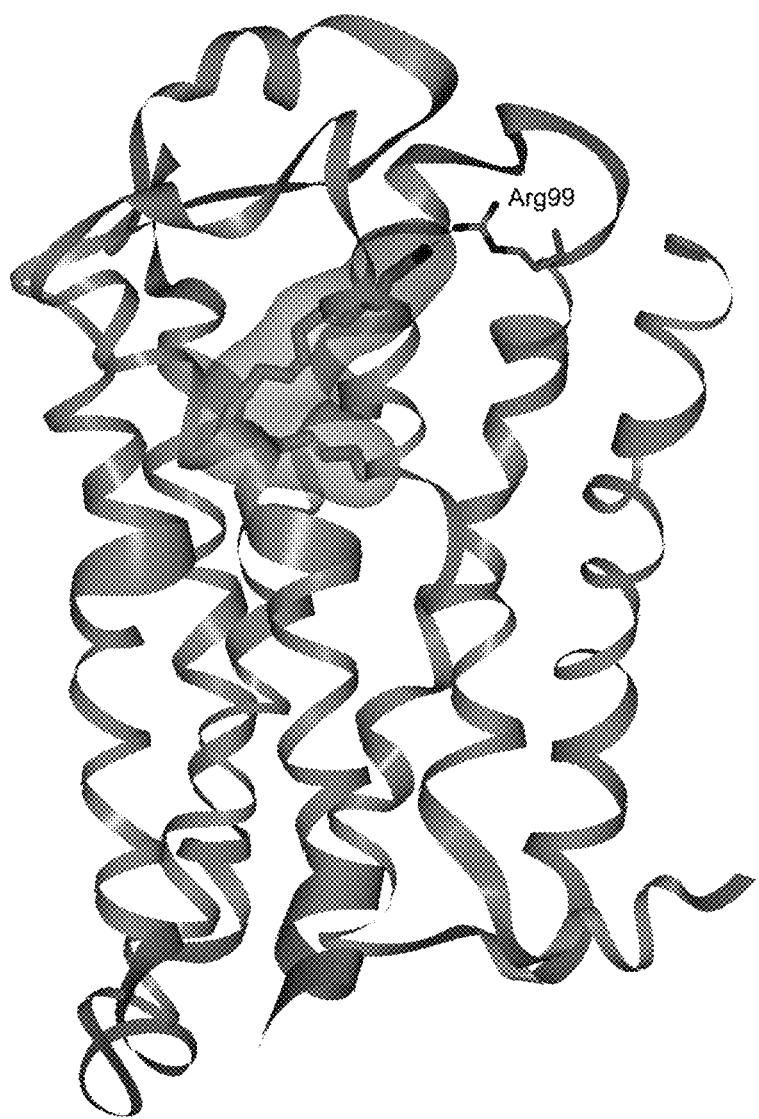
Figure 6C:
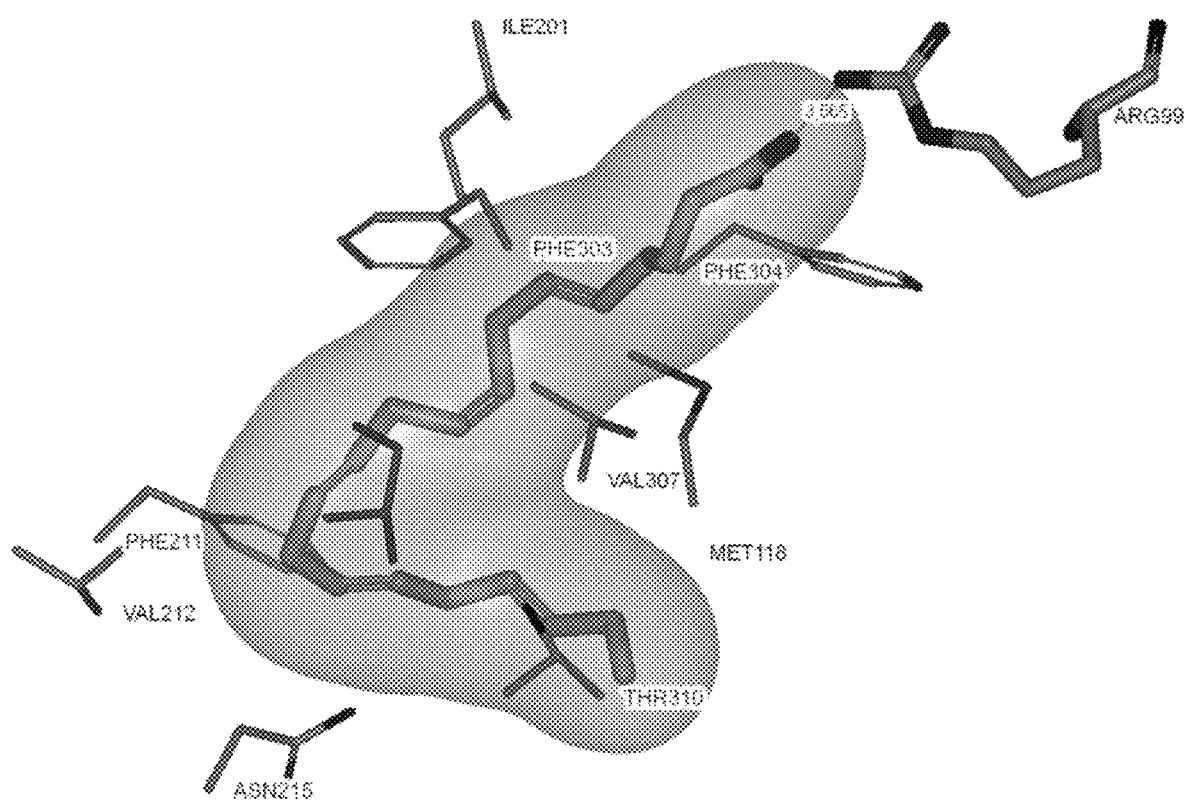
Figure 7:
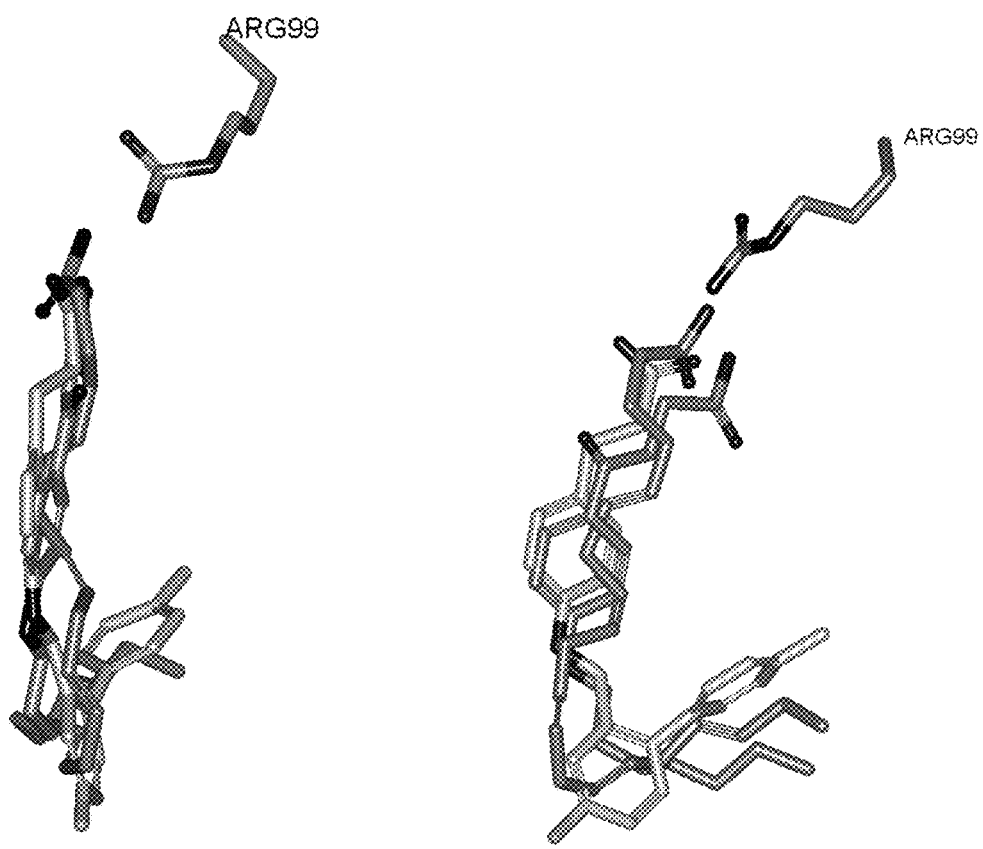
FIG. 7 shows an overlay of eicosapentaenoic acid, 3-(4-((4-fluoro-4'-methylbiphenyl-2-yl)methoxy)phenyl)propanoic acid, and 4-[4-(heptyloxy)phenyl]-4-oxobutanoic acid, showing the position of Arg99 of fGPR120 when the receptor is bound by the compounds.
Figure 9A:
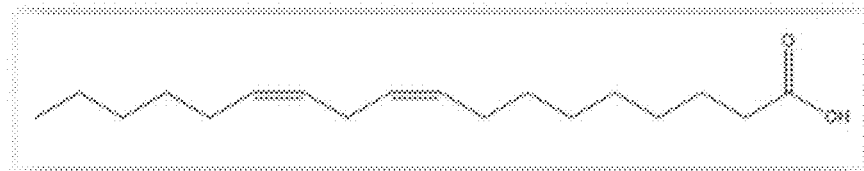
FIGS. 9A-9C show the in silico modeling of the binding of compound linoleic acid to fGPR120, wherein a salt bridge is formed between the carboxyl group of linoleic acid and Arg99 of fGPR120.
Figure 9B:
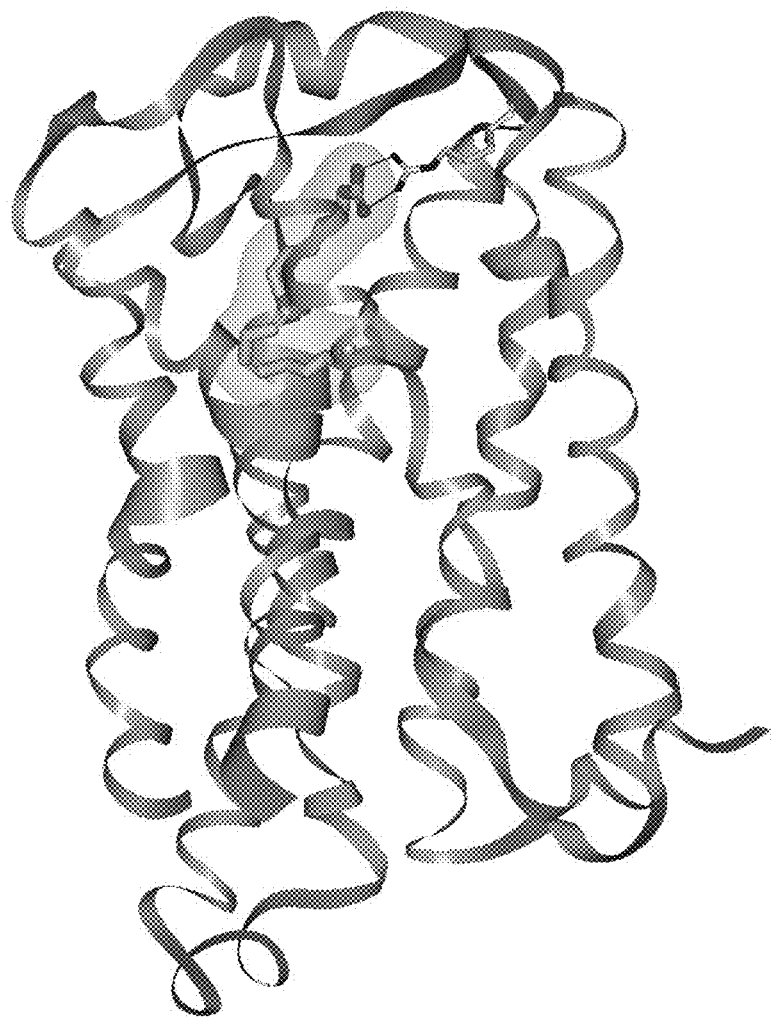
Figure 9C:
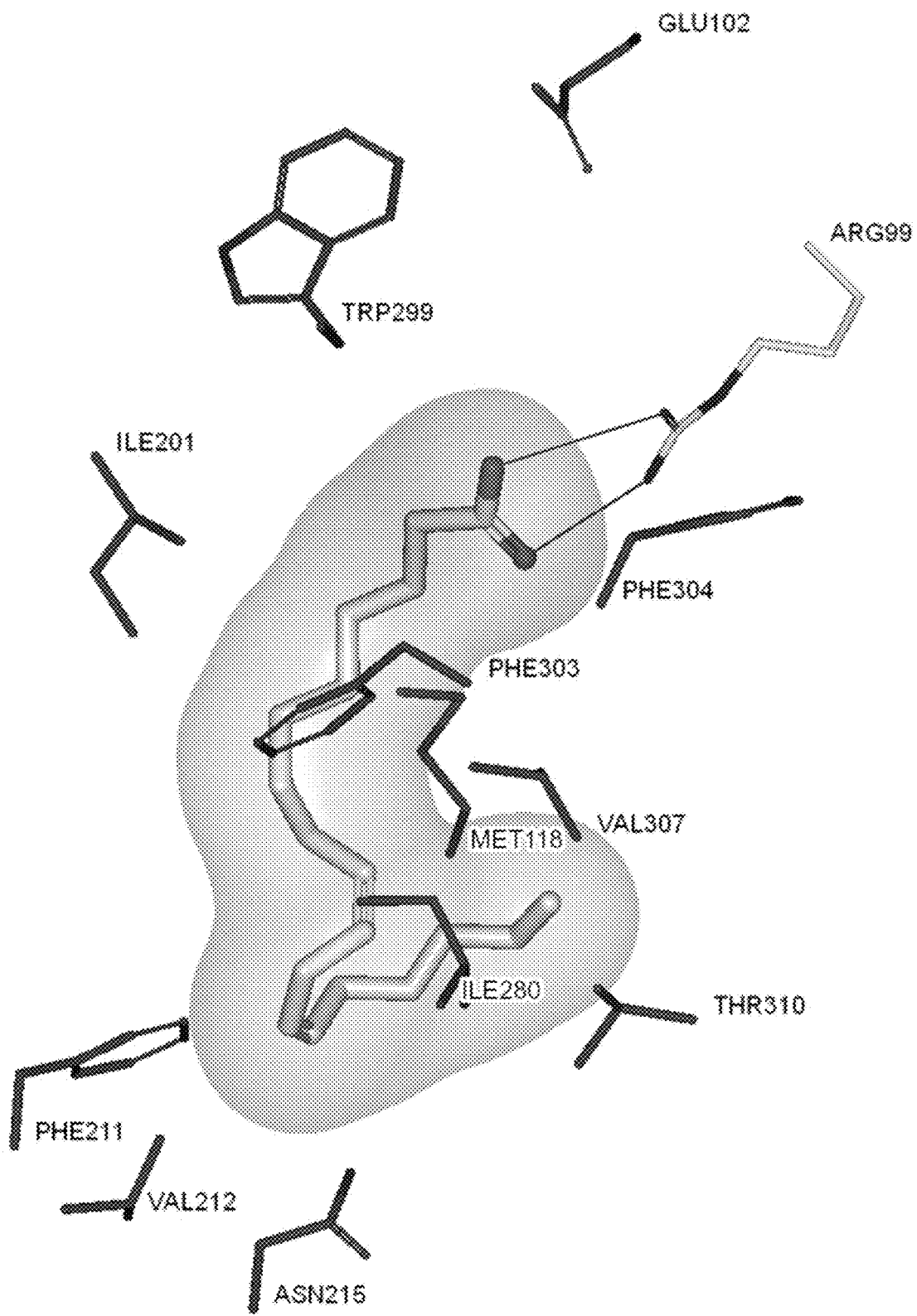

Each compound was first tested for its ability to activate fGPR120 at three different dose levels (10, 3 and 1 μM; 50, 16.7, and 5.6 μM; or 100, 30 and 10 μM) (FIGS. 1A-1AH). Dose response curves were then generated for each compound. (FIGS. 2A-2AH). The following properties were determined: percent increase in fGPR120 activity induced by the compounds compared to an fGPR120 agonist control (alpha-linolenic acid), percent increase in fGPR120 activity induced by the compounds compared to an ATP background control, and concentration of compound required to achieve EC50 (i.e., 50% of the maximal activity achieved).

Results: Changes in fGPR120 activity following treatment of CHO-K1 cells expressing fGPR120 receptors, or CHO-K1 cells not expressing fGPR120 (Mock control cells), with 34 active compounds that increased the activity of fGPR120 by at least 30% compared to control are shown in FIGS. 1A-1AH and 2A-2AH. Table 2 identifies the 34 compounds that increased the activity of fGPR120 by at least 30% compared to control.

TABLE 2

GPR120 binding compounds that increased the activity of GPR120 by at least 30% compared to control.

| No. | Compound |
| --- | --- |
| 1. | (5Z,8Z,11Z,14Z)-icosa-5,8,11,14-tetraenoic acid (also known as Arachidonic Acid) |
| 2. | (5Z,8Z)-icosa-5,8-dienoic acid |
| 3. | 4-[4-(heptyloxy)phenyl]-4-oxobutanoic acid |
| 4. | (11Z)-octadec-11-enoic acid (also known as cis-Vaccenic acid) |
| 5. | (9E)-hexadec-9-enoic acid (also known as Palmitelaidic acid) |
| 6. | tridec-12-enoic acid (also known as 12-Tridecenoic acid) |
| 7. | S-Farnesyl Thioacetic Acid |
| 8. | (10Z)-pentadec-10-enoic acid (also known as (10Z)-10-Pentadecenoic acid) |
| 9. | 10(E),12(Z)-Conjugated Linoleic Acid (also known as (10Z,12Z)-10,12- Octadecadienoic acid) |
| 10. | (10Z,13Z)-nonadeca-10,13-dienoic acid |
| 11. | (9Z,11E)-octadeca-9,11-dienoic acid |
| 12. | cis-7-Hexadecenoic Acid |
| 13. | dodecanoic acid (also known as Lauric acid) |
| 14. | (9Z)-tetradec-9-enoic acid (also known as Myristoleic acid) |
| 15. | (11Z,14Z,17Z)-icosa-11,14,17-trienoic acid (also known as Dihomo-α-linolenic acid (20:3(n-3))) |
| 16. | (6Z,9Z,12Z)-octadeca-6,9,12-trienoic acid (also known as γ-Linolenic acid) |
| 17. | (11Z,14Z)-icosa-11,14-dienoic acid (also known as Dihomolinoleic acid (20:2(n-6))) |
| 18. | (9Z)-hexadec-9-enoic acid (also known as palmitoleate, (Z)-Palmitoleic acid) |
| 19. | 12-methoxydodecanoic acid |
| 20. | (8Z,11Z,14Z)-icosa-8,11,14-trienoic acid |
| 21. | (9Z,12Z)-octadeca-9,12-dienoic acid (also known as Linoleic acid) |
| 22. | (10Z)-heptadec-10-enoic acid |
| 23. | Pinolenic Acid |
| 24. | (9Z,12Z,15Z)-octadeca-9,12,15-trienoic acid (also known as α-Linolenic acid) |
| 25. | tridecanoic acid (also known as Tridecylic acid) |
| 26. | tetradecanoic acid (also known as Myristic acid) |
| 27. | (9Z)-octadec-9-enoic acid (also known as Oleic acid) |
| 28. | GW 9508 (also known as 4-[[(3-Phenoxyphenyl)methyl]amino]benzenepropanoic acid) |
| 29. | (5Z,8Z,11Z,14Z,17Z)-icosa-5,8,11,14,17-pentaenoic acid (also known as Eicosapentanoic acid) |
| 30. | 3-(4-((4-fluoro-4'-methylbiphenyl-2-yl)methoxy)phenyl)propanoic acid (also known as TUG 891 and 4-[(4-Fluoro-4'-methyl[1,1'-biphenyl]-2-yl)methoxy]-benzenepropanoic acid) |
| 31. | (10E)-pentadec-10-enoic acid |
| 32. | (9E)-tetradec-9-enoic acid (also known as Myristoleate) |
| 33. | (6Z,9Z,12Z,15Z)-octadeca-6,9,12,15-tetraenoic acid |
| 34. | (5Z,8Z,11Z)-icosa-5,8,11-trienoic acid (also known as Mead acid) |

Example 2—Identification of GPR120 Agonists Using in Silico Screening

Site-directed mutagenesis has been used to identify amino acid residues of human GPR120 that interact with GPR120 binding compounds (Hudson et al.). However, the present example describes the computational modeling of the feline and canine GPR120 that was conducted to identify putative compound agonists of the GPR120 receptor. GPR120 belongs to the G-Protein Coupled Receptor (GPCR) group A family of receptors. The feline GPR120 exhibits 96% sequence identity to the canine GPR120, and 89% sequence identity to human GPR120. (See, for example, International Publication No. WO 2014/199114, published Dec. 18, 2014, which is incorporated by reference in its entirety).

Computational approaches were used to analyze the three-dimensional structure of the GPR120 receptor to identify polypeptide regions that can be exploited to selectively activate the receptor. A structural homology model of the GPR120 receptor was generated based on the structures of class A GPCRs. The homology models were built in SWISS-MODEL and GPCR-I-TASSER web based environments and further refined in the Discovery Studio (DS) suite of programs from Accelrys (BIOVIA, Dassault Systèmes). Modeller program from DS was used for model refinement (see Eswar et al., Current Protocols in Bioinformatics, Supplement 15:5.6.1-5.6.30 (2006), which is incorporated by reference herein in its entirety). "In silico" screening was used to identify compounds that interact with the GPR120.

The GPCR group A family of proteins includes numerous solved crystal structures. Homology models of feline and canine GPR120 transmembrane domain was generated based on the crystal structures of GPCR Group A from Protein Data Bank (PDB): 4DJH (human kappa opioid receptor (Wu, H. et al.)), 3OE6 (CXCR4 chemokine receptor (Wu, B. et al.)) and 3SN6 (beta2 adrenergic receptor (Rasmussen et al.)). The docking program, BioDock, from Bio-Predict was used to dock the compounds 3-(4-((4-fluoro-4'-methylbiphenyl-2-yl)methoxy)phenyl)propanoic acid (also known as TUG891) (FIGS. 4A-4C); 4-[4-(heptyloxy)phenyl]-4-oxobutanoic acid (FIGS. 5A-5C); eicosapentanoic acid (FIGS. 6A-6C); oleic acid (FIGS. 8A and 8B); and linoleic acid (FIGS. 9A-9C) into the active site of the transmembrane domain of the feline GPR120, in silico. These compounds were also docked into the active site of the transmembrane domain of the canine GPR120, in silico. Active sites of the human, feline and canine GPCR are similar in structure.

Based on the in silico binding models, the compounds were observed to have the following potential interactions with the amino acids of the transmembrane domain of the feline GPR120:

PHE88, VAL95, VAL98 and ARG99 on Helix 2;
PHE115, MET118, SER119, GLY122, SER123 on Helix 3;
TRP207, PHE211, VAL212, ASN215 on Helix 5;
TRP277, ILE280, ILE281, ILE284 on Helix 6;
TRP299, PHE303, PHE304, VAL307, THR310, PHE311 on Helix 7.

Many of the interactions between the compounds and the feline GPR120 active site involve GPR120 hydrophobic residues. Additionally, there is a salt bridge and hydrogen bond between the carboxyl groups of the compounds and ARG99.

REFERENCES

1. Rasmussen, S. G. et al., "Crystal structure of the beta2 adrenergic receptor-Gs protein complex." (2011) Nature 477: 549-555.
2. Wu, B. et al., "Structures of the CXCR4 chemokine GPCR with small-molecule and cyclic peptide antagonists." (2010) Science 330: 1066-1071.
3. Wu, H. et al., "Structure of the human kappa-opioid receptor in complex with JDTic." (2012) Nature 485: 327-332.
4. Brian D. Hudson et al., "The Molecular Basis of Ligand Interaction at Free Fatty Acid Receptor 4 (FFA4/GPR120)." The Journal of Biological Chemistry, 2014 Jul. 18; 289(29):20345-58.
5. Arnold K, Bordoli L, Kopp J, and Schwede T., "The SWISS-MODEL Workspace: A web-based environment for protein structure homology modelling." (2006) *Bioinformatics.*, 22, 195-201.
6. Zhang, J Yang, R Jang, Y Zhang., "GPCR-I-TASSER: A hybrid approach to G protein-coupled receptor structure modeling and the application to the human genome." Structure, 23: 1538-1549, 2015 20345-20358, Jul. 18, 2014.

Example 3—Identification of Dodecyl Dihydrogen Phosphate as a Positive Allosteric Modulator of GPR120 Using In Vitro Screening The present example describes an in vitro assay for measuring the activity of dodecyl dihydrogen phosphate as a GPR120 agonists and positive allosteric modulator (PAM).

Methods: CHO cells that stably express fGPR120 were used to assay dodecyl dihydrogen phosphate for activity as an fGPR120 agonist or PAM.

CHO/NatClytin/fGpr120+Gα16 (fGpr120) cells and CHO/NatClytin/mock+Gα16 (mock) cells were seeded at 5,000 cells/well. 24 hours after cell seeding, cells were loaded with 0.5×Fluo8-NW dye in standard tyrode buffer (20 µl/well) for 1 h at room temperature. The ability of dodecyl dihydrogen phosphate to activate fGPR120 expressed by the CHO cells was determined by measuring fluorescence using a FLIPR® Tetra screening system after contacting the cells with the compound in agonist mode and PAM mode according to the following protocol:

1. Agonist mode: injection of 3× dodecyl dihydrogen phosphate (10 µl/well), wherein fluorescence (i.e., agonist activity) was measured for 3 minutes.
2. PAM mode: injection of 3× dodecyl dihydrogen phosphate (10 µl/well), wherein fluorescence was measured for 3 min. After about 1 additional minute, injection of 3× fGPR120 agonist at a concentration corresponding to the agonist's $EC_{20}$ (15 µl/well), wherein fluorescence (i.e., PAM activity) was measured for 3 min. The fGPR120 agonist was 1.5 µM α-linolenic acid. For mock controls, 0.2µ ATP was used as the agonist.

The maximum of ΔF/F values measured using the FLIPR® Tetra system were exported and used for data analysis. For PAM data analysis, data were normalized onto $EC_{100}$ (as 100% activity) and $EC_{20}$ (as 0% activity) values.

The compounds used in the experiments were dissolved 6× in 0.01% BSA (fatty acid-free) and then pre-mixed on compound plates with buffer. The final BSA concentration of the cells was 0.00167%.

Figure 12A:
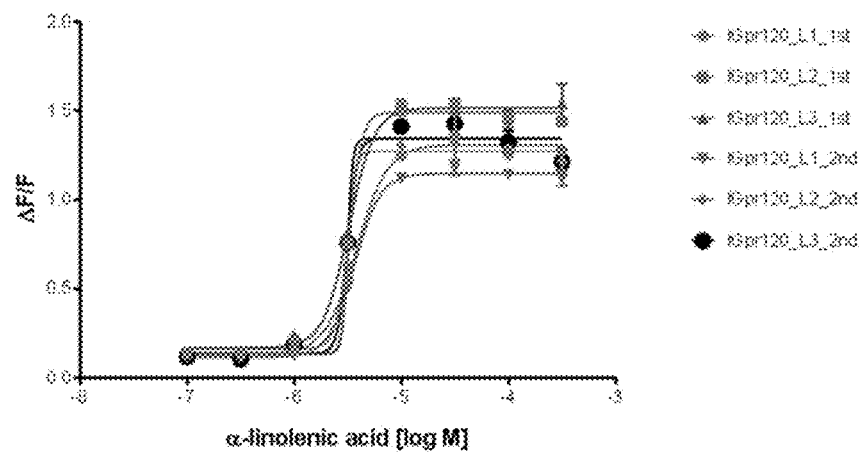
FIGS. 12A and 12B show the dose response curves for the controls α-linolenic acid and ATP in the in vitro cellular assay for activation of fGPR120, as described by Example 3.
Figure 12B:
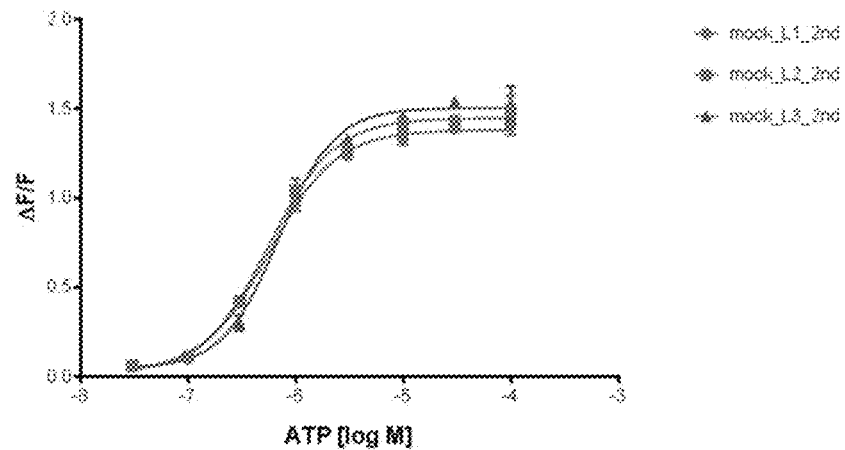

Controls for agonist mode experiments—dose response curves of α-linolenic acid (FIGS. 12A and 12B): 100 µM α-linolenic acid (fGpr120 max signal), 30 µM ATP (max signal), buffer (min signal), buffer+0.01% BSA (min signal).

Controls for PAM mode experiments—dose response curves of α-linolenic acid (fGpr120) or ATP (mock) (FIGS. 12A and 12B): 100 µM α-linolenic acid (max signal for Gpr120), 1.5 µM α-linolenic acid ($EC_{20}$, min signal for Gpr120), 30 µM ATP (max signal), 0.2 µM ATP ($EC_{20}$, min signal).

Figure 11A:
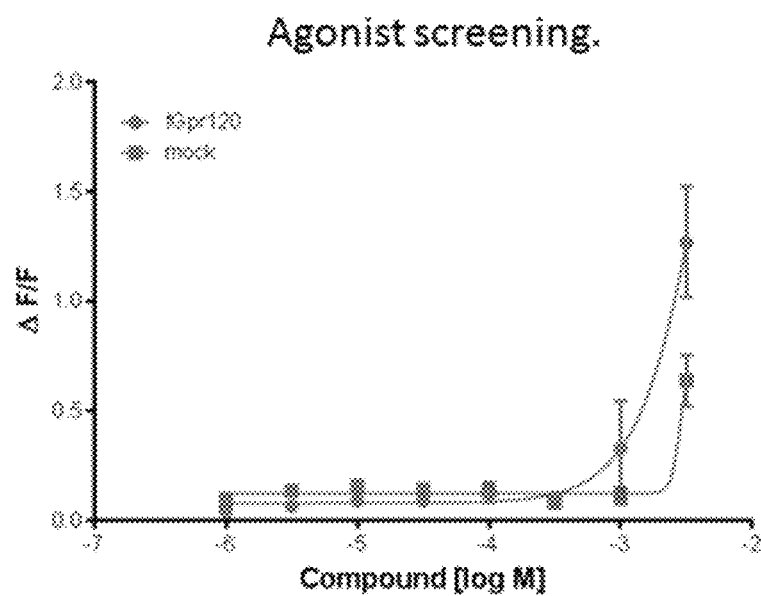
FIGS. 11A and 11B show dose response curves for dodecyl dihydrogen phosphate determined in an in vitro cellular assay for activation of fGPR120 by the ligand in agonist and PAM modes.
Figure 11B:
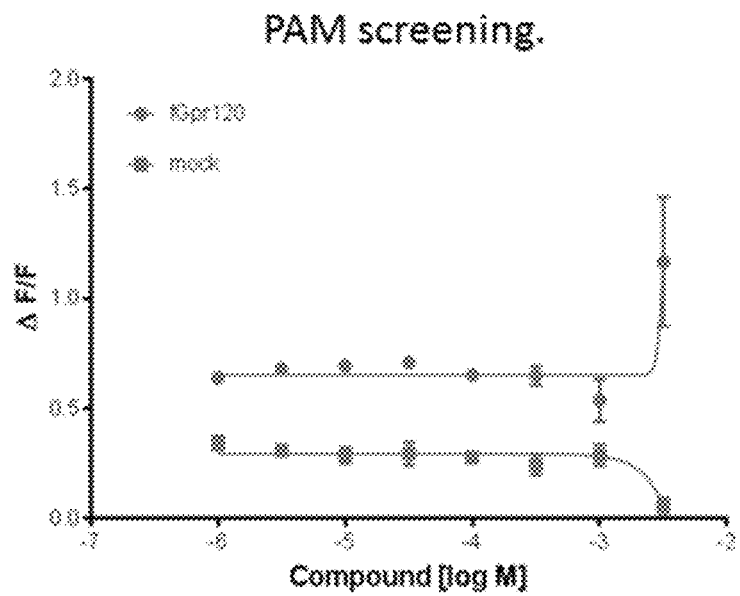

Results: As shown in FIGS. 11A and 11B, dodecyl dihydrogen phosphate modulated the activity of fGPR120 as a PAM in the presence of an fGPR120 agonist.

Although the presently disclosed subject matter and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the presently disclosed subject matter, processes, machines, manufacture, compositions of matter, means, methods, or steps, presently existing or later to be developed that perform substantially the same function or achieve substantially the same result as the corresponding embodiments described herein may be utilized according to the presently disclosed subject matter. Accordingly, the appended claims are intended to include within their scope such processes, machines, manufacture, compositions of matter, means, methods, or steps.

Patents, patent applications, publications, product descriptions and protocols are cited throughout this application the disclosures of which are incorporated herein by reference in their entireties for all purposes.

We claim:

1. A flavor composition comprising a compound of Formula III comprising the structure

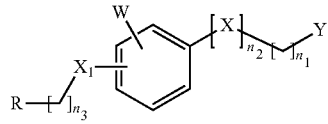

wherein
X is O, S, C(O), or a chemical bond;
$X_1$ is O or S;
Y is COOH, $SO_3H$, $-OP(O)(OH)_2$, or tetrazole;
W is halogen, COOH, COOMe, CN, CHO, aryl, OH, H, —S-aryl, —O-aryl, —N-aryl, $CF_3$, $OCH_3$, $CH_3$, $NO_2$, or OEt;
R is $CH_3$;
$n_1$ is 0-4;
$n_2$ is 0-2; and
$n_3$ is 1-12 or branched or unbranched $C_2$-$C_{20}$
wherein the compound is present in the flavor composition at a concentration of from about 0.001 μM to about 1 mM and wherein the compound is a GPR120 agonist.

2. The flavor composition of claim 1, wherein the compound is 4-[4-(heptyloxy)phenyl]-4-oxobutanoic acid.

3. A food product comprising the flavor composition of claim 1, wherein the flavor composition is present in an amount effective to increase a fatty acid taste or the palatability of the food product as determined by a panel of taste testers.

4. The food product of claim 3, wherein the flavor composition is present at a concentration of from about 10 pM to about 1 M, from about 0.01 ppm to 1,000 ppm, or from about 0.01% to about 10% w/w in the food product.

5. The food product of claim 3, wherein the food product comprises a pet food product.

6. The food product of claim 5, wherein the pet food product is a feline pet food product or a canine pet food product.

7. The food product of claim 6, wherein the pet food product is a wet pet food product.

8. The food product of claim 6, wherein the pet food product is a dry pet food product.

9. A method of increasing a fatty acid taste intensity in a food product comprising admixing a food product with the flavor composition of claim 1, wherein the flavor composition is present in an amount effective to increase a fatty acid taste of the food product as determined by a panel of taste testers.

10. The method of claim 9, wherein the flavor composition is present at a concentration of from about 10 pM to about 1 M, of from about 0.01 ppm to 1,000 ppm, or from about 0.01% to about 10% w/w in the admixture.

* * * * *